US009296573B2

(12) United States Patent
Daniel, III et al.

(10) Patent No.: US 9,296,573 B2
(45) Date of Patent: Mar. 29, 2016

(54) APPARATUS, METHOD, AND SYSTEM FOR LOADING CURRENCY BILLS INTO A CURRENCY PROCESSING DEVICE

(71) Applicant: Cummins-Allison Corp., Mt. Prospect, IL (US)

(72) Inventors: John H. Daniel, III, Batavia, IL (US); Roy C. Schoon, Glenview, IL (US); Charles P. Jenrick, Palatine, IL (US); Curtis W. Hallowell, Palatine, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 14/601,985

(22) Filed: Jan. 21, 2015

(65) Prior Publication Data

US 2015/0183593 A1 Jul. 2, 2015

Related U.S. Application Data

(63) Continuation of application No. 13/842,772, filed on Mar. 15, 2013, now Pat. No. 8,973,817.

(51) Int. Cl.
*G06Q 40/00* (2012.01)
*G07D 11/00* (2006.01)
(Continued)

(52) U.S. Cl.
CPC ................ *B65H 1/027* (2013.01); *B65H 1/022* (2013.01); *B65H 1/08* (2013.01); *B65H 1/263* (2013.01);
(Continued)

(58) Field of Classification Search
CPC ... G06Q 40/00; G07D 11/00; G07D 11/0018; G07D 11/0054; G07D 11/0084; G07F 19/00; G07F 17/00; G07F 19/202; G07F 19/20; G07F 7/04; G07F 7/00
USPC .......... 235/379, 375; 194/206, 205, 207, 217, 194/302, 305; 271/157-158, 180-181
See application file for complete search history.

(56) References Cited

U.S. PATENT DOCUMENTS 5,163,672 A 11/1992 Mennie
5,207,788 A 5/1993 Geib
(Continued)

FOREIGN PATENT DOCUMENTS

CA 2 624 638 A1 12/2007
CA 2 684 159 A1 4/2010
(Continued)

*Primary Examiner* — Edwyn Labaze
(74) *Attorney, Agent, or Firm* — Nixon Peabody LLP

(57) ABSTRACT

An apparatus for feeding a plurality of stacked currency bills into a currency handling device. The apparatus may comprise an input receptacle being configured to receive a plurality of stacked currency bills, the receptacle having a first side and a second opposing side, a front end, and an opposing back end. The apparatus further may comprise a first paddle rail disposed adjacent the first side and a first paddle assembly slidably coupled to the first paddle rail, the first paddle assembly having a portion configured to contact a stack of a plurality of bills residing in the input receptacle. The apparatus further may comprise a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped. The apparatus further may comprise a first damping mechanism configured to slow the unrestrained, average rate of speed the first paddle assembly from the first average rate of speed to a second average rate of speed which is less the first average rate of speed.

18 Claims, 28 Drawing Sheets

(51) Int. Cl.

| | |
|---|---|
| ***G07F 17/00*** | (2006.01) |
| ***B65H 1/02*** | (2006.01) |
| ***G07F 19/00*** | (2006.01) |
| ***B65H 1/08*** | (2006.01) |
| ***B65H 1/26*** | (2006.01) |
| ***B65H 1/30*** | (2006.01) |

(52) U.S. Cl.

CPC ................ *B65H 1/30* (2013.01); *G07F 19/202* (2013.01); *B65H 2402/53* (2013.01); *B65H 2403/55* (2013.01); *B65H 2403/60* (2013.01); *B65H 2405/212* (2013.01); *B65H 2701/1912* (2013.01)

(56) References Cited

U.S. PATENT DOCUMENTS

| | | | |
|---|---|---|---|
| 5,295,196 | A | 3/1994 | Raterman |
| 5,467,405 | A | 11/1995 | Raterman |
| 5,467,406 | A | 11/1995 | Graves |
| D369,984 | S | 5/1996 | Larsen |
| 5,633,949 | A | 5/1997 | Graves |
| 5,640,463 | A | 6/1997 | Csulits |
| 5,652,802 | A | 7/1997 | Graves |
| 5,687,963 | A | 11/1997 | Mennie |
| 5,692,067 | A | 11/1997 | Raterman |
| 5,704,491 | A | 1/1998 | Graves |
| 5,724,438 | A | 3/1998 | Graves |
| 5,751,840 | A | 5/1998 | Raterman |
| 5,790,693 | A | 8/1998 | Graves |
| 5,790,697 | A | 8/1998 | Munro |
| 5,806,650 | A | 9/1998 | Mennie |
| 5,815,592 | A | 9/1998 | Mennie |
| 5,822,448 | A | 10/1998 | Graves |
| 5,832,104 | A | 11/1998 | Graves |
| 5,867,589 | A | 2/1999 | Graves |
| 5,870,487 | A | 2/1999 | Graves |
| 5,871,209 | A | 2/1999 | Orchard |
| 5,875,259 | A | 2/1999 | Mennie |
| 5,905,810 | A | 5/1999 | Jones |
| 5,909,502 | A | 6/1999 | Mazur |
| 5,909,503 | A | 6/1999 | Graves |
| 5,912,982 | A | 6/1999 | Munro |
| 5,938,044 | A | 8/1999 | Weggesser |
| 5,943,655 | A | 8/1999 | Jacobson |
| 5,960,103 | A | 9/1999 | Graves |
| 5,966,456 | A | 10/1999 | Jones |
| 5,982,918 | A | 11/1999 | Mennie |
| 5,992,601 | A | 11/1999 | Mennie |
| 6,012,565 | A | 1/2000 | Mazur |
| 6,021,883 | A | 2/2000 | Casanova |
| 6,026,175 | A | 2/2000 | Munro |
| 6,028,951 | A | 2/2000 | Raterman |
| 6,068,194 | A | 5/2000 | Mazur |
| 6,072,896 | A | 6/2000 | Graves |
| 6,073,744 | A | 6/2000 | Raterman |
| 6,074,334 | A | 6/2000 | Mennie |
| 6,128,402 | A | 10/2000 | Jones et al. |
| 6,220,419 | B1 | 4/2001 | Mennie |
| 6,237,739 | B1 | 5/2001 | Mazur |
| 6,241,069 | B1 | 6/2001 | Mazur |
| 6,256,407 | B1 | 7/2001 | Mennie |
| 6,278,795 | B1 | 8/2001 | Anderson |
| 6,311,819 | B1 | 11/2001 | Stromme |
| 6,318,537 | B1 | 11/2001 | Jones |
| 6,351,551 | B1 | 2/2002 | Munro |
| 6,363,164 | B1 | 3/2002 | Jones |
| 6,371,303 | B1 | 4/2002 | Klein |
| 6,378,683 | B2 | 4/2002 | Mennie |
| 6,381,354 | B1 | 4/2002 | Mennie |
| 6,398,000 | B1 | 6/2002 | Jenrick et al. |
| 6,459,806 | B1 | 10/2002 | Raterman |
| 6,460,705 | B1 | 10/2002 | Hallowell |
| 6,493,461 | B1 | 12/2002 | Mennie |
| 6,539,104 | B1 | 3/2003 | Raterman |
| 6,560,355 | B2 | 5/2003 | Graves |
| 6,588,569 | B1 | 7/2003 | Hallowell |
| 6,601,687 | B1 | 8/2003 | Jenrick |
| 6,603,872 | B2 | 8/2003 | Jones |
| 6,621,919 | B2 | 9/2003 | Mennie |
| 6,628,816 | B2 | 9/2003 | Mennie |
| 6,636,624 | B2 | 10/2003 | Raterman |
| 6,647,136 | B2 | 11/2003 | Jones |
| 6,650,767 | B2 | 11/2003 | Jones |
| 6,654,486 | B2 | 11/2003 | Jones |
| 6,661,910 | B2 | 12/2003 | Jones |
| 6,665,431 | B2 | 12/2003 | Jones |
| 6,678,401 | B2 | 1/2004 | Jones |
| 6,678,402 | B2 | 1/2004 | Jones |
| 6,705,470 | B2 | 3/2004 | Klein |
| 6,721,442 | B1 | 4/2004 | Mennie |
| 6,724,926 | B2 | 4/2004 | Jones |
| 6,724,927 | B2 | 4/2004 | Jones |
| 6,731,785 | B1 | 5/2004 | Mennie |
| 6,731,786 | B2 | 5/2004 | Jones |
| 6,748,101 | B1 | 6/2004 | Jones |
| 6,778,693 | B2 | 8/2004 | Munro |
| 6,798,899 | B2 | 9/2004 | Mennie |
| 6,810,137 | B2 | 10/2004 | Jones |
| 6,843,418 | B2 | 1/2005 | Jones |
| 6,860,375 | B2 | 3/2005 | Hallowell |
| 6,866,134 | B2 | 3/2005 | Stromme |
| 6,868,954 | B2 | 3/2005 | Stromme |
| 6,880,692 | B1 | 4/2005 | Mazur |
| 6,913,130 | B1 | 7/2005 | Mazur |
| 6,913,260 | B2 | 7/2005 | Maier |
| 6,915,893 | B2 | 7/2005 | Mennie |
| 6,929,109 | B1 | 8/2005 | Klein |
| 6,955,253 | B1 | 10/2005 | Mazur |
| 6,957,733 | B2 | 10/2005 | Mazur |
| 6,959,800 | B1 | 11/2005 | Mazur |
| 6,962,247 | B2 | 11/2005 | Maier |
| 6,980,684 | B1 | 12/2005 | Munro |
| 6,994,200 | B2 | 2/2006 | Jenrick |
| 6,996,263 | B2 | 2/2006 | Jones |
| 7,000,828 | B2 | 2/2006 | Jones |
| 7,016,767 | B2 | 3/2006 | Jones |
| 7,036,651 | B2 | 5/2006 | Tam |
| 7,082,216 | B2 | 7/2006 | Jones |
| 7,092,560 | B2 | 8/2006 | Jones |
| 7,103,206 | B2 | 9/2006 | Graves |
| 7,103,438 | B2 | 9/2006 | Hallowell |
| 7,146,245 | B2 | 12/2006 | Jones |
| 7,149,336 | B2 | 12/2006 | Jones |
| 7,158,662 | B2 | 1/2007 | Chiles |
| 7,171,032 | B2 | 1/2007 | Jones |
| 7,187,795 | B2 | 3/2007 | Jones |
| 7,191,657 | B2 | 3/2007 | Maier |
| 7,197,173 | B2 | 3/2007 | Jones |
| 7,200,255 | B2 | 4/2007 | Jones |
| 7,201,320 | B2 | 4/2007 | Csulits |
| 7,232,024 | B2 | 6/2007 | Mazur |
| 7,248,731 | B2 | 7/2007 | Raterman |
| 7,256,874 | B2 | 8/2007 | Csulits |
| 7,269,279 | B2 | 9/2007 | Chiles |
| 7,349,566 | B2 | 3/2008 | Jones |
| 7,362,891 | B2 | 4/2008 | Jones |
| 7,366,338 | B2 | 4/2008 | Jones |
| 7,391,897 | B2 | 6/2008 | Jones |
| 7,413,189 | B2 | 8/2008 | Graef |
| 7,505,831 | B2 | 3/2009 | Jones |
| 7,536,046 | B2 | 5/2009 | Raterman |
| 7,542,598 | B2 | 6/2009 | Jones |
| 7,551,764 | B2 | 6/2009 | Chiles |
| 7,590,274 | B2 | 9/2009 | Raterman |
| 7,591,428 | B2 | 9/2009 | Freeman |
| 7,599,543 | B2 | 10/2009 | Jones |
| 7,600,626 | B2 | 10/2009 | Hallowell |
| 7,602,956 | B2 | 10/2009 | Jones |
| 5,909,503 | C1 | 11/2009 | Graves |
| 7,619,721 | B2 | 11/2009 | Jones |
| 7,620,231 | B2 | 11/2009 | Jones |
| 5,966,456 | C1 | 12/2009 | Jones |
| 6,381,354 | C1 | 12/2009 | Mennie |

(56) References Cited

U.S. PATENT DOCUMENTS

| | | | |
|---|---|---|---|
| 7,628,326 | B2 | 12/2009 | Freeman |
| 7,635,082 | B2 | 12/2009 | Jones |
| 7,647,275 | B2 | 1/2010 | Jones |
| 7,650,980 | B2 | 1/2010 | Jenrick |
| 7,672,499 | B2 | 3/2010 | Raterman |
| 7,686,151 | B2 | 3/2010 | Renz |
| 7,726,457 | B2 | 6/2010 | Maier |
| 7,735,621 | B2 | 6/2010 | Hallowell |
| 7,753,189 | B2 | 7/2010 | Maier |
| 7,762,380 | B2 | 7/2010 | Freeman |
| 7,778,456 | B2 | 8/2010 | Jones |
| 7,779,982 | B2 | 8/2010 | Fitzgerald |
| 7,817,842 | B2 | 10/2010 | Mennie |
| 7,849,994 | B2 | 12/2010 | Klein |
| 7,873,576 | B2 | 1/2011 | Jones |
| 7,881,519 | B2 | 2/2011 | Jones |
| 7,882,000 | B2 | 2/2011 | Jones |
| 7,903,863 | B2 | 3/2011 | Jones |
| 7,929,749 | B1 | 4/2011 | Jones |
| 7,938,245 | B2 | 5/2011 | Jenrick |
| 7,949,582 | B2 | 5/2011 | Mennie |
| 8,023,715 | B2 | 9/2011 | Jones |
| 8,041,098 | B2 | 10/2011 | Jones |
| 8,103,084 | B2 | 1/2012 | Jones |
| 8,125,624 | B2 | 2/2012 | Jones |
| 8,126,793 | B2 | 2/2012 | Jones |
| 8,162,125 | B1 | 4/2012 | Csulits |
| 8,169,602 | B2 | 5/2012 | Jones |
| 8,204,293 | B2 | 6/2012 | Csulits |
| 8,297,428 | B2 | 10/2012 | Renz |
| 8,322,505 | B2 | 12/2012 | Freeman |
| 8,331,643 | B2 | 12/2012 | Yacoubian |
| 8,339,589 | B2 | 12/2012 | Jones |
| 8,346,610 | B2 | 1/2013 | Mennie |
| 8,352,322 | B2 | 1/2013 | Mennie |
| 8,380,573 | B2 | 2/2013 | Jones |
| 8,391,583 | B1 | 3/2013 | Mennie |
| 8,396,278 | B2 | 3/2013 | Jones |
| 8,396,586 | B2 | 3/2013 | Klein |
| 8,401,268 | B1 | 3/2013 | Yacoubian |
| 5,692,067 | C1 | 4/2013 | Raterman |
| 8,413,888 | B2 | 4/2013 | Jones |
| 8,417,017 | B1 | 4/2013 | Beutel |
| 8,428,332 | B1 | 4/2013 | Csulits |
| 8,433,123 | B1 | 4/2013 | Csulits |
| 8,433,126 | B2 | 4/2013 | Jones |
| 8,437,528 | B1 | 5/2013 | Csulits |
| 8,437,529 | B1 | 5/2013 | Mennie |
| 8,437,530 | B1 | 5/2013 | Mennie |
| 8,437,531 | B2 | 5/2013 | Jones |
| 8,437,532 | B1 | 5/2013 | Jones |
| 8,442,296 | B2 | 5/2013 | Jones |
| 8,453,820 | B2 | 6/2013 | Hallowell |
| 8,459,436 | B2 | 6/2013 | Jenrick |
| 8,467,591 | B1 | 6/2013 | Csulits |
| 8,478,019 | B1 | 7/2013 | Csulits |
| 8,478,020 | B1 | 7/2013 | Jones |
| 8,514,379 | B2 | 8/2013 | Jones |
| 8,538,123 | B1 | 9/2013 | Csulits |
| 8,542,904 | B1 | 9/2013 | Beutel |
| 8,544,656 | B2 | 10/2013 | Mennie |
| 8,559,694 | B2 | 10/2013 | Jenrick |
| 8,559,695 | B1 | 10/2013 | Csulits |
| 8,594,414 | B1 | 11/2013 | Jones |
| 8,625,875 | B2 | 1/2014 | Csulits |
| 8,627,939 | B1 | 1/2014 | Jones |
| 8,639,015 | B1 | 1/2014 | Mennie |
| 8,644,583 | B1 | 2/2014 | Mennie |
| 8,644,584 | B1 | 2/2014 | Mennie |
| 8,644,585 | B1 | 2/2014 | Mennie |
| 8,655,045 | B2 | 2/2014 | Jones |
| 8,655,046 | B1 | 2/2014 | Csulits |
| 8,684,157 | B2 | 4/2014 | Freeman |
| 8,701,857 | B2 | 4/2014 | Jenrick |
| 7,672,499 | C2 | 5/2014 | Raterman |
| 8,714,335 | B2 | 5/2014 | Hallowell |
| 8,714,336 | B2 | 5/2014 | Csulits |
| 8,725,289 | B2 | 5/2014 | Klein |
| 8,781,206 | B1 | 7/2014 | Yacoubian |
| 8,787,652 | B1 | 7/2014 | Jones |
| 8,929,640 | B1 | 1/2015 | Mennie |
| 2001/0006556 | A1 | 7/2001 | Graves |
| 2001/0006557 | A1 | 7/2001 | Mennie |
| 2001/0015311 | A1 | 8/2001 | Mennie |
| 2001/0019624 | A1 | 9/2001 | Raterman |
| 2001/0035603 | A1 | 11/2001 | Graves |
| 2002/0001393 | A1 | 1/2002 | Jones |
| 2002/0020603 | A1 | 2/2002 | Jones |
| 2002/0056605 | A1 | 5/2002 | Mazur |
| 2002/0085245 | A1 | 7/2002 | Mennie |
| 2002/0085745 | A1 | 7/2002 | Jones |
| 2002/0103757 | A1 | 8/2002 | Jones |
| 2002/0104785 | A1 | 8/2002 | Klein |
| 2002/0107801 | A1 | 8/2002 | Jones |
| 2002/0118871 | A1 | 8/2002 | Jones |
| 2002/0122580 | A1 | 9/2002 | Jones |
| 2002/0126885 | A1 | 9/2002 | Mennie |
| 2002/0126886 | A1 | 9/2002 | Jones |
| 2002/0131630 | A1 | 9/2002 | Jones |
| 2002/0136442 | A1 | 9/2002 | Jones |
| 2002/0145035 | A1 | 10/2002 | Jones |
| 2002/0154804 | A1 | 10/2002 | Jones |
| 2002/0154805 | A1 | 10/2002 | Jones |
| 2002/0154806 | A1 | 10/2002 | Jones |
| 2002/0154807 | A1 | 10/2002 | Jones |
| 2002/0154808 | A1 | 10/2002 | Jones |
| 2002/0186876 | A1 | 12/2002 | Jones |
| 2003/0009420 | A1 | 1/2003 | Jones |
| 2003/0015395 | A1 | 1/2003 | Hallowell |
| 2003/0015396 | A1 | 1/2003 | Mennie |
| 2003/0059098 | A1 | 3/2003 | Jones |
| 2003/0062242 | A1 | 4/2003 | Hallowell |
| 2003/0081824 | A1 | 5/2003 | Mennie |
| 2003/0108233 | A1 | 6/2003 | Raterman |
| 2003/0121752 | A1 | 7/2003 | Stromme |
| 2003/0121753 | A1 | 7/2003 | Stromme |
| 2003/0132281 | A1 | 7/2003 | Jones |
| 2003/0139994 | A1 | 7/2003 | Jones |
| 2003/0168308 | A1 | 9/2003 | Maier |
| 2003/0174874 | A1 | 9/2003 | Raterman |
| 2003/0182217 | A1 | 9/2003 | Chiles |
| 2003/0198373 | A1 | 10/2003 | Raterman |
| 2003/0202690 | A1 | 10/2003 | Jones |
| 2004/0003980 | A1 | 1/2004 | Hallowell |
| 2004/0016621 | A1 | 1/2004 | Jenrick |
| 2004/0016797 | A1 | 1/2004 | Jones |
| 2004/0028266 | A1 | 2/2004 | Jones |
| 2004/0083149 | A1 | 4/2004 | Jones |
| 2004/0145726 | A1 | 7/2004 | Csulits |
| 2004/0149538 | A1 | 8/2004 | Sakowski |
| 2004/0153408 | A1 | 8/2004 | Jones |
| 2004/0154964 | A1 | 8/2004 | Jones |
| 2004/0173432 | A1 | 9/2004 | Jones |
| 2004/0182675 | A1 | 9/2004 | Long |
| 2004/0251110 | A1 | 12/2004 | Jenrick |
| 2005/0029168 | A1 | 2/2005 | Jones |
| 2005/0035034 | A1 | 2/2005 | Long |
| 2005/0040225 | A1 | 2/2005 | Csulits |
| 2005/0047642 | A1 | 3/2005 | Jones |
| 2005/0060055 | A1 | 3/2005 | Hallowell |
| 2005/0060059 | A1 | 3/2005 | Klein |
| 2005/0060061 | A1 | 3/2005 | Jones |
| 2005/0077142 | A1 | 4/2005 | Tam |
| 2005/0086271 | A1 | 4/2005 | Jones |
| 2005/0087422 | A1 | 4/2005 | Maier |
| 2005/0108165 | A1 | 5/2005 | Jones |
| 2005/0117791 | A2 | 6/2005 | Raterman |
| 2005/0117792 | A2 | 6/2005 | Graves |
| 2005/0150738 | A1 | 7/2005 | Hallowell |
| 2005/0163361 | A1 | 7/2005 | Jones |
| 2005/0163362 | A1 | 7/2005 | Jones |
| 2005/0169511 | A1 | 8/2005 | Jones |
| 2005/0173221 | A1 | 8/2005 | Maier |
| 2005/0183928 | A1 | 8/2005 | Jones |

(56) References Cited

U.S. PATENT DOCUMENTS

| | | | |
|---|---|---|---|
| 2005/0207634 | A1 | 9/2005 | Jones |
| 2005/0213803 | A1 | 9/2005 | Mennie |
| 2005/0241909 | A1 | 11/2005 | Mazur |
| 2005/0249394 | A1 | 11/2005 | Jones |
| 2005/0265591 | A1 | 12/2005 | Jones |
| 2005/0276458 | A1 | 12/2005 | Jones |
| 2005/0278239 | A1 | 12/2005 | Jones |
| 2006/0010071 | A1 | 1/2006 | Jones |
| 2006/0078186 | A1 | 4/2006 | Freeman |
| 2006/0182330 | A1 | 8/2006 | Chiles |
| 2006/0195567 | A1 | 8/2006 | Mody |
| 2006/0210137 | A1 | 9/2006 | Raterman |
| 2006/0274929 | A1 | 12/2006 | Jones |
| 2007/0071302 | A1 | 3/2007 | Jones |
| 2007/0076939 | A1 | 4/2007 | Jones |
| 2007/0078560 | A1 | 4/2007 | Jones |
| 2007/0095630 | A1 | 5/2007 | Mennie |
| 2007/0112674 | A1 | 5/2007 | Jones |
| 2007/0122023 | A1 | 5/2007 | Jenrick |
| 2007/0172107 | A1 | 7/2007 | Jones |
| 2007/0209904 | A1 | 9/2007 | Freeman |
| 2007/0221470 | A1 | 9/2007 | Mennie |
| 2007/0237381 | A1 | 10/2007 | Mennie |
| 2007/0258633 | A1 | 11/2007 | Jones |
| 2007/0269097 | A1 | 11/2007 | Chiles |
| 2007/0278064 | A1 | 12/2007 | Hallowell |
| 2008/0006505 | A1 | 1/2008 | Renz |
| 2008/0033829 | A1 | 2/2008 | Mennie |
| 2008/0044077 | A1 | 2/2008 | Mennie |
| 2008/0060906 | A1 | 3/2008 | Fitzgerald |
| 2008/0123932 | A1 | 5/2008 | Jones |
| 2008/0133411 | A1 | 6/2008 | Jones |
| 2008/0177420 | A1 | 7/2008 | Klein |
| 2008/0219543 | A1 | 9/2008 | Csulits |
| 2008/0285838 | A1 | 11/2008 | Jones |
| 2009/0001661 | A1 | 1/2009 | Klein |
| 2009/0022390 | A1 | 1/2009 | Yacoubian |
| 2009/0087076 | A1 | 4/2009 | Jenrick |
| 2009/0090779 | A1 | 4/2009 | Freeman |
| 2009/0310188 | A1 | 12/2009 | Jones |
| 2009/0313159 | A1 | 12/2009 | Jones |
| 2010/0034454 | A1 | 2/2010 | Jones |
| 2010/0051687 | A1 | 3/2010 | Jones |
| 2010/0057617 | A1 | 3/2010 | Jones |
| 2010/0063916 | A1 | 3/2010 | Jones |
| 2010/0092065 | A1 | 4/2010 | Jones |
| 2010/0108463 | A1 | 5/2010 | Renz |
| 2010/0116619 | A1 | 5/2010 | Jones |
| 2010/0163366 | A1 | 7/2010 | Jenrick |
| 2010/0236892 | A1 | 9/2010 | Jones |
| 2010/0263984 | A1 | 10/2010 | Freeman |
| 2010/0276485 | A1 | 11/2010 | Jones |
| 2010/0288600 | A1 * | 11/2010 | Robinson ...................... 194/206 |
| 2011/0087599 | A1 | 4/2011 | Jones |
| 2011/0099105 | A1 | 4/2011 | Mennie |
| 2011/0206267 | A1 | 8/2011 | Jones |
| 2011/0215034 | A1 | 9/2011 | Mennie |
| 2011/0220717 | A1 | 9/2011 | Jones |
| 2011/0255767 | A1 | 10/2011 | Jenrick |
| 2011/0258113 | A1 | 10/2011 | Jones |
| 2012/0008131 | A1 | 1/2012 | Jones |
| 2012/0008850 | A1 | 1/2012 | Jones |
| 2012/0013891 | A1 | 1/2012 | Jones |
| 2012/0013892 | A1 | 1/2012 | Jones |
| 2012/0150745 | A1 | 6/2012 | Csulits |
| 2012/0185083 | A1 | 7/2012 | Klein |
| 2012/0189186 | A1 | 7/2012 | Csulits |
| 2012/0215689 | A1 | 8/2012 | Jones |
| 2012/0321170 | A2 | 12/2012 | Jones |
| 2013/0068585 | A1 | 3/2013 | Freeman |
| 2013/0098992 | A1 | 4/2013 | Jenrick |
| 2013/0148874 | A1 | 6/2013 | Jones |
| 2013/0193205 | A1 | 8/2013 | Jones |
| 2013/0213864 | A1 | 8/2013 | Mennie |
| 2013/0327686 | A1 | 12/2013 | Mennie |
| 2014/0175173 | A1 | 6/2014 | Jenrick |

FOREIGN PATENT DOCUMENTS

| | | | |
|---|---|---|---|
| GB | 2 464 826 | A | 5/2010 |
| WO | WO 91/11778 | A1 | 8/1991 |
| WO | WO 92/17394 | A1 | 10/1992 |
| WO | WO 93/23824 | A1 | 11/1993 |
| WO | WO 95/24691 | A1 | 9/1995 |
| WO | WO 96/10800 | A1 | 4/1996 |
| WO | WO 96/36933 | A1 | 11/1996 |
| WO | WO 97/30422 | A1 | 8/1997 |
| WO | WO 97/43734 | A1 | 11/1997 |
| WO | WO 97/45810 | A1 | 12/1997 |
| WO | WO 98/12662 | A1 | 3/1998 |
| WO | WO 98/13785 | A1 | 4/1998 |
| WO | WO 98/24052 | A1 | 6/1998 |
| WO | WO 98/24067 | A1 | 6/1998 |
| WO | WO 98/35323 | A2 | 8/1998 |
| WO | WO 98/40839 | A2 | 9/1998 |
| WO | WO 98/47100 | A1 | 10/1998 |
| WO | WO 98/50892 | A1 | 11/1998 |
| WO | WO 99/09511 | A1 | 2/1999 |
| WO | WO 99/14668 | A1 | 3/1999 |
| WO | WO 99/23601 | A1 | 5/1999 |
| WO | WO 99/41695 | A1 | 8/1999 |
| WO | WO 99/48040 | A1 | 9/1999 |
| WO | WO 99/48042 | A1 | 9/1999 |
| WO | WO 00/24572 | A1 | 5/2000 |
| WO | WO 00/65546 | A1 | 11/2000 |
| WO | WO 01/08108 | A2 | 2/2001 |
| WO | WO 01/59685 | A2 | 8/2001 |
| WO | WO 01/59723 | A1 | 8/2001 |
| WO | WO 02/29735 | A2 | 4/2002 |
| WO | WO 02/054360 | A2 | 7/2002 |
| WO | WO 03/005312 | A1 | 1/2003 |
| WO | WO 03/028361 | A2 | 4/2003 |
| WO | WO 03/029913 | A2 | 4/2003 |
| WO | WO 03/030113 | A1 | 4/2003 |
| WO | WO 03/067532 | A1 | 8/2003 |
| WO | WO 03/107282 | A2 | 12/2003 |
| WO | WO 2004/010367 | A1 | 1/2004 |
| WO | WO 2004/027717 | A2 | 4/2004 |
| WO | WO 2004/036508 | A2 | 4/2004 |
| WO | WO 2004/038631 | A2 | 5/2004 |
| WO | WO 2004/068422 | A1 | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/041134 | A2 | 5/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |
| WO | WO 2007/044570 | A2 | 4/2007 |
| WO | WO 2007/120825 | A2 | 10/2007 |
| WO | WO 2007/143128 | A2 | 12/2007 |
| WO | WO 2008/030356 | A1 | 3/2008 |
| WO | WO 2008/112132 | A1 | 9/2008 |
| WO | WO 2011/109569 | A1 | 9/2011 |

* cited by examiner

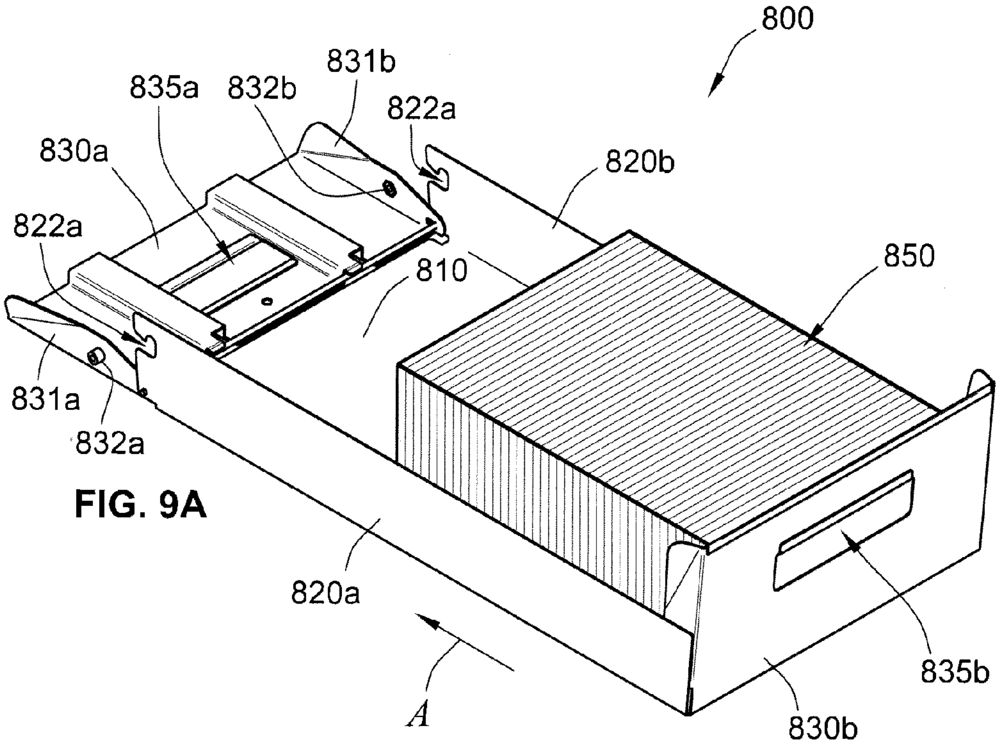
FIG. 9A
FIG. 9
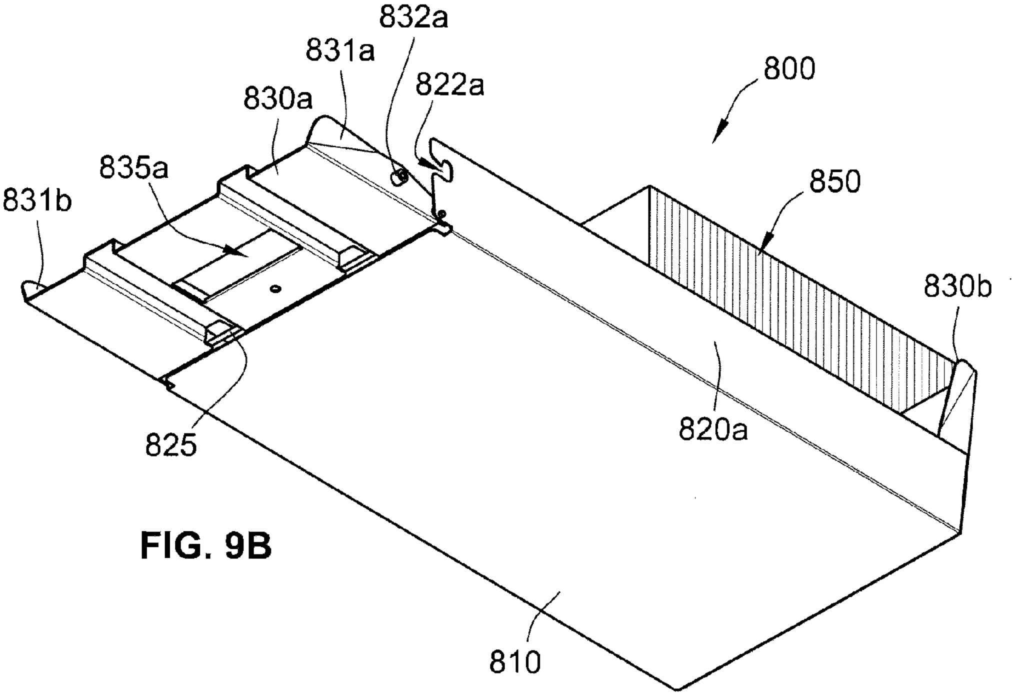
FIG. 9B

APPARATUS, METHOD, AND SYSTEM FOR LOADING CURRENCY BILLS INTO A CURRENCY PROCESSING DEVICE

This application is a continuation of prior U.S. patent application Ser. No. 13/842,772, filed Mar. 15, 2013, now allowed, which is hereby incorporated by reference herein in its entirety.

FIELD OF THE INVENTION

The field of the invention relates generally to currency processing devices and apparatuses, systems, and methods for loading currency bills into the same.

BACKGROUND

Previous currency processing devices have various shortcomings.

SUMMARY

According to some embodiments, an apparatus for feeding a plurality of stacked currency bills into a currency handling device is provided. The apparatus may comprise an input receptacle being configured to receive a plurality of stacked currency bills, the receptacle having a first side and a second opposing side, a front end, and an opposing back end. The apparatus further may comprise a first paddle rail disposed adjacent the first side and a first paddle assembly slidably coupled to the first paddle rail, the first paddle assembly having a portion configured to contact a stack of a plurality of bills residing in the input receptacle. The apparatus further may comprise a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped. The apparatus further may comprise a first damping mechanism configured to slow the unrestrained, average rate of speed the first paddle assembly from the first average rate of speed to a second average rate of speed which is less the first average rate of speed.

According to some embodiments, a method of loading currency bills into an input receptacle of a currency processing device is provided. The method comprises the act of positioning a tray in an input receptacle of the currency processing device, the tray being preloaded with a plurality of currency bills therein, the tray having a bottom, two opposing sides, and two opposing ends, a first one of the ends being adjacent to a feeding mechanism of the currency processing device and being movable between a closed position and an open position. The method further comprises the act of moving the first end of the tray from the closed position to the open position. The method further comprises the act of removing the tray from the input receptacle by sliding the tray in a tray-removal direction, wherein in response to the sliding the tray, the tail gate automatically moves from the closed position to the open position.

According to some embodiments, a method of loading currency bills into an input receptacle of a currency processing device is provided. The currency processing device includes an input receptacle, a feeder mechanism, a first paddle rail, a second paddle rail, a first paddle assembly, a second paddle assembly, a first resilient member, and a second resilient member. The input receptacle has a first side and a second opposing side, a front end and an opposing back end, and a floor. The feeder mechanism is disposed adjacent the front end of the input receptacle and is configured to transfer currency bills from the input receptacle. The first paddle rail is disposed adjacent to the first side of the input receptacle and the second paddle rail is disposed adjacent to the second side of the input receptacle. The first paddle assembly is pivotally and slidably coupled to the first paddle rail and the second paddle assembly is pivotally and slidably coupled to the second paddle rail. The first resilient member is coupled to the first paddle assembly and is configured to bias the first paddle assembly towards the front end of the input receptacle. The second resilient member is coupled to the second paddle assembly and is configured to bias the second paddle assembly towards the front end of the input receptacle. The method comprises the act of positioning a first tray in the input receptacle. The first tray is preloaded with a first plurality of first currency bills therein. The first tray has a bottom, two opposing lateral sides, and a back side and an opposing front side. The front and back sides of the first tray are generally perpendicular to the two opposing lateral sides of the first tray. The front side of the first tray is movable between a closed position and an open position. The first tray is positioned within the input receptacle such that the two opposing lateral sides of the first tray are generally parallel with the two opposing sides of the input receptacle and the front side of the first tray is oriented towards the front end of the input receptacle. The first currency bill in the first tray positioned closest to the front side of the first tray being a leading first currency bill and the first currency bill in the first tray positioned closest to the back side of the first tray being a trailing first currency bill. The method further comprises the act of positioning the first paddle assembly in an operational position within the first tray such that the first paddle assembly engages the first plurality of currency bills in the first tray with a front side of the first paddle of the first paddle assembly such that the front side of the first paddle abuts the trailing first currency bill. The method further comprises the act of moving the front side of the first tray from the closed position to the open position whereby the first paddle of the first paddle assembly moves the first currency bills in the first tray in a feed direction towards the front end of the input receptacle such that the leading first currency bill is moved out of the first tray and engages the feeder mechanism.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 9A is a top, front perspective view of the loading tray of FIG. 8A having the movable gate positioned in a down or open position according to some embodiments of the present disclosure;

FIG. 9B is a bottom, front perspective view of the loading tray of FIG. 9A;

Figure 1:
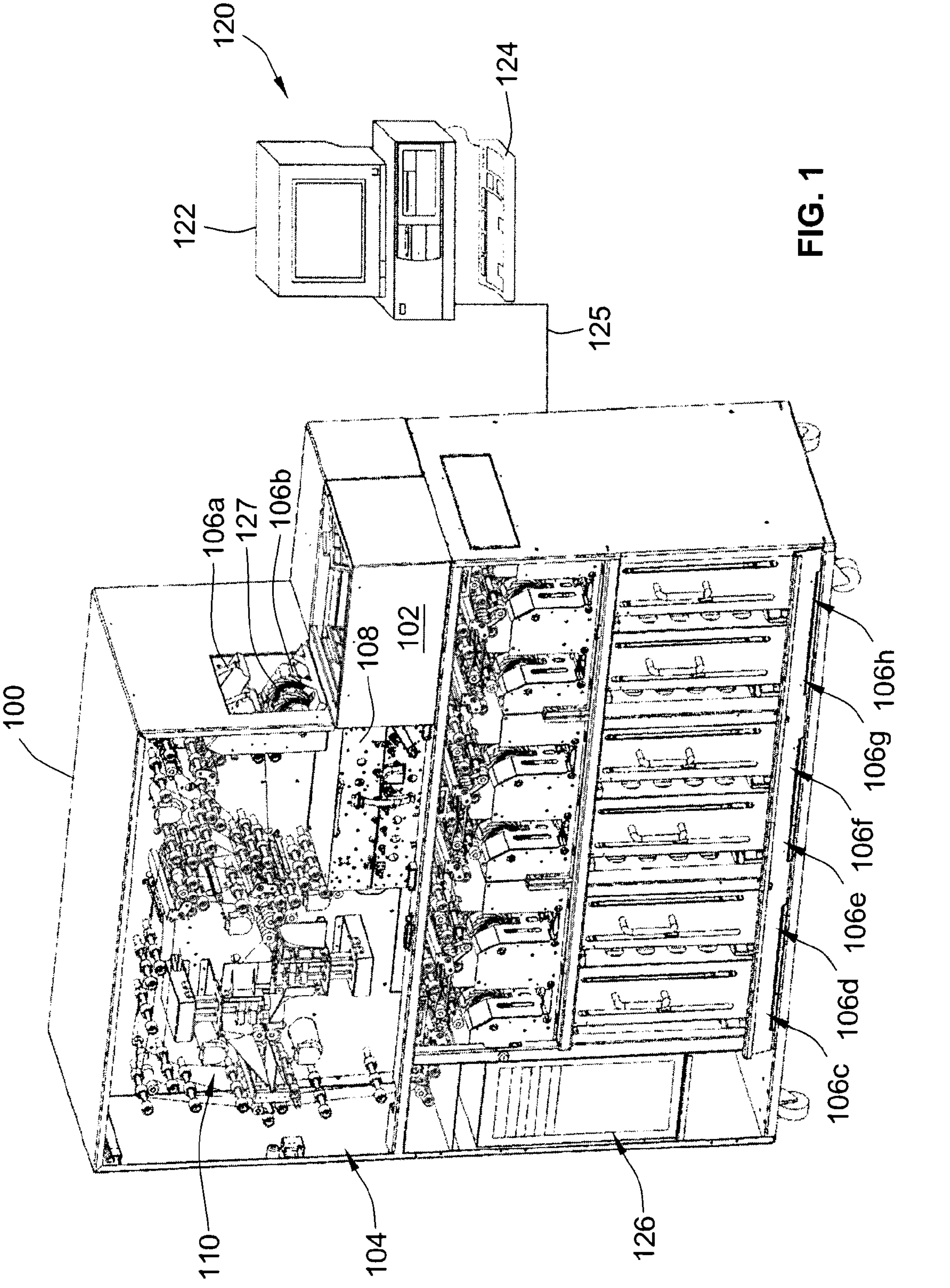
FIG. 1 is a perspective view of a document processing or handling device according to some embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATIVE EMBODIMENTS

All of the following listed U.S. patent applications and U.S. patents are hereby incorporated by reference herein in their entireties:

U.S. patent application Ser. No. 09/502,666, filed Feb. 11, 2000, now U.S. Pat. No. 6,398,000, entitled "Currency Handling System Having Multiple Output Receptacles";

U.S. patent application Ser. No. 10/903,745, filed Jul. 30, 2004, now U.S. Pat. No. 7,726,457, entitled "Currency Processing Device, Method and System";

U.S. patent application Ser. No. 11/036,686, filed Jan. 14, 2005, now U.S. Pat. No. 7,753,189, entitled "Currency Processing Device, Method and System"; and U.S. patent application Ser. No. 11/809,621, filed Jun. 1, 2007, now U.S. Pat. No. 7,686,151, entitled "Angled Currency Processing System";

U.S. patent application Ser. No. 13/039,296, filed Mar. 2, 2011, now pending, published as U.S. Published Application No. 2011-0215034, entitled "Currency Bill Processing Device and Method";

U.S. patent application Ser. No. 13/774,974, filed Feb. 22, 2013, now pending, entitled "Apparatus and System for Processing Currency Bills and Financial Documents and Method for Using the Same"; and U.S. patent application Ser. No. 12/758,876, filed Apr. 13, 2010, now U.S. Pat. No. 8,162,125, entitled "Apparatus and System for Imaging Currency Bills and Financial Documents and Method for Using The Same".

As stated above, all of the above mentioned U.S. patent applications and U.S. patents are hereby incorporated by reference herein in their entireties.

I. Definitions

When describing various embodiments, the term "currency bills" refers to official currency bills including both U.S. currency bills, such as a $1, $2, $5, $10, $20, $50, or $100 bills, and foreign currency bills. Foreign currency bills are notes issued by a non-U.S. governmental agency as legal tender, such as a euro, Japanese yen, pound sterling (e.g., British pound), Canadian dollar, Australian dollar bill, Mexican Peso, or Turkish lira.

"Substitute currency notes" are sheet-like documents similar to currency bills, but are issued by non-governmental agencies such as casinos and amusement parks and include, for example, casino script and Disney Dollars. Substitute currency notes each have a denomination and an issuing entity associated therewith such as, for example, a $5 Disney Dollar, a $10 Disney Dollar, a $20 ABC Casino note, and a $100 ABC Casino note.

"Currency notes" consist of currency bills and substitute currency notes.

"Substitute currency media" are documents that represent a value by some marking or characteristic such as a bar code, color, size, graphic, or text. Examples of "substitute currency media" include without limitation: casino cashout tickets (also variously called cashout vouchers or coupons) such as, for example, "EZ Pay" tickets issued by International Gaming Technology or "Quicket" tickets issued by Casino Data Systems; casino script; promotional media such as, for example, Disney Dollars or Toys 'R Us "Geoffrey Dollars"; or retailer coupons, gift certificates, gift cards, or food stamps. Accordingly, substitute currency media includes, but is not limited to, substitute currency notes. Substitute currency media may or may not be issued by a governmental body.

The term "currency documents" includes both currency bills and "substitute currency media." The terms "financial documents" and "documents" are used throughout the specification to generally refer to any of currency bills, substitute currency notes, currency notes, substitute currency media, and currency documents.

The term "deposit document" includes deposit slips, cash-in tickets, and cash-out tickets. A deposit document is generally associated with a deposit of currency bills and/or checks into, for example, a bank by a bank customer. A deposit slip can include information such as, for example, a customer financial account number, a total deposit amount, a total currency bill deposit amount, a number of deposited currency bills broken down by denomination, a total check deposit amount, a number of deposited checks broken down by on-us checks and transit checks, a total on-us check deposit amount, a total transit check deposit amount, a total cashout amount, or combinations thereof.

"Deposit transaction documents" consist of currency bills, checks, deposit slips, deposit transaction separator cards such as header cards or trailer cards.

Every day, businesses and people unknowingly accept counterfeit currency documents as genuine. A counterfeit currency document is a currency document which is not issued by an authorized maker and/or a currency document which has been altered, for example, a $1 bill which has been altered to appear to be a $20 bill. For example, in the case of U.S. currency bills, a counterfeit currency bill would be a document printed to look like a genuine U.S. bill but not printed by the U.S. Treasury Department's Bureau of Engraving and Printing or one that has been tampered with or altered. As another example, in the case of casino script, a counterfeit currency document would be a script that is not issued by the corresponding casino or one that has been tampered with or altered.

The term "financial institution" as used herein includes, but is not limited to, banks, such as, brick and mortar banks, internet/online banks, casinos, brokers, investment banks, and armored carriers. Armored carriers can be stand-alone financial institutions and/or agents of another financial institution.

Throughout this disclosure, the term "operator" is used to refer to a person or persons operating a document processing device or system under normal operating conditions such as, for example, a store clerk, a store manager, a bank employee, a bank teller, or a bank customer.

Throughout this disclosure, the term "batch" is used to refer to a set of documents that is associated with a transaction. A batch of documents can include one or more deposit documents, one or more currency bills, one or more checks, a header card, a trailer card, or any combination thereof. For example, a batch of documents associated with a first transaction between a store and a bank can include ten documents, the ten documents including one deposit slip, eight currency bills, and one check. For another example, a batch of documents associated with a second transaction between an individual and a bank can include twenty-five documents, the twenty-five documents including one deposit slip, twenty currency bills, and four checks. For another example, a batch of documents associated with a third transaction can include one hundred and one documents including one hundred currency bills and one trailer card.

The disclosure refers to at least two types of batches of documents, which include a "sorted batch of documents" and an "intermingled or commingled batch of documents." A sorted batch of documents is a batch of documents wherein the order of different types of documents, such as, for example, currency bills, checks, and deposit documents, is arranged by groups, wherein each batch consists of at most only one group for each type of document. For example, for a batch consisting of ten checks and ten currency bills, a sorted batch of documents would include one group of the ten checks preceding or following a group of the ten currency bills. For another example, for a batch consisting of one deposit slip, five checks, and five currency bills, a sorted batch of documents would include the deposit slip and one group of the five checks preceding or following a group of the five currency bills. It is contemplated that the deposit slip can precede or follow either of the two groups of documents.

An intermingled batch of documents is a batch of documents wherein the order of different types of documents, such as, for example, currency bills, checks, and deposit documents, is mixed or random. For example, a batch consisting of ten checks and ten currency bills would be an intermingled batch of documents if the batch consisted of, in order, two bills, then three checks, then one bill, then seven checks, and finally seven bills. For another example, a batch consisting of one deposit slip, one cash-out ticket, ten currency bills, and twenty checks would be an intermingled batch of documents if the batch consisted of, in order, the deposit slip, five currency bills, ten checks, the cash-out ticket, five checks, five currency bills, and finally five checks.

A batch of documents including currency bills, checks, and/or deposit documents can be processed in a document processing device or system according to several modes of operation, such as, for example, a sorted-group mode, an ordered-batch mode, and an intermingled-batch mode. According to some embodiments, sorted batches of documents can be processed according to the sorted-group mode or the ordered-batch mode. According to some embodiments, intermingled batches of documents can be processed according to the intermingled-batch mode.

In the sorted-group mode, the currency bills are processed in separate groups from the checks. For example, for a batch of documents that includes one hundred currency bills and twenty-five checks, the one hundred currency bills are input into an input receptacle of the document processing device and processed as a first group of documents. Subsequently, the twenty-five checks are input into an input receptacle of the document processing device and processed separately as a second group of documents. That is, the currency bills and the checks of the batch of documents are processed in separate groups of documents by the same device.

In the ordered-batch mode, the currency bills are sorted from the checks into separate groups of documents, but the currency bills and the checks are input into an input receptacle of the document processing device together as a single batch of documents such that the document processing device can process the currency bills and then process the checks as a batch of documents associated with a transaction. For example, for a batch of documents that includes three hundred and fifty-five currency bills and six hundred checks, according to some embodiments, the three hundred and fifty-five currency bills are input into the input receptacle of the document processing device and the six hundred checks are positioned on top of the currency bills such that the currency bills are transported and processed first, and then the checks are transported and processed second. That is, the currency bills and the checks of the batch of documents are processed together, one after the other. For another example, for a sorted batch of documents that includes five currency bills and ten checks, according to some embodiments, the ten checks are input into the input receptacle of the document processing device and the five currency bills are positioned on top of the checks such that the checks are transported and processed first, and then the currency bills are transported and processed second.

In the intermingled-batch mode, the currency bills are mixed with the checks and input into the input receptacle of the document processing device together as a single intermingled or commingled batch of documents. For example, for a batch of documents that includes ten currency bills and ten checks, where the documents are ordered from one to twenty, the batch can be ordered such that the first five documents in the batch are currency bills, the second five documents in the batch are checks, then three currency bills, then two checks, then two currency bills, followed by three checks. In the intermingled-batch mode, the document processing device is configured to process the mixed currency bills and checks of the intermingled or commingled batch of documents together. Furthermore, in the intermingled-batch mode, the order of the documents does not matter and the processing device does not expect or require the documents in a batch to be in any particular order. Thus, a sorted batch of documents can be processed in the intermingled-batch mode.

Throughout this disclosure, the term "stack" or stack of documents is used to refer to a set of documents that is received in an input receptacle of a document processing device or system. A stack of documents can include a group of currency bills only; a group of checks only; a batch of documents including currency bills, checks, and/or other documents, such as deposit documents; one or more batches of documents; one or more sub-batches of documents, one or more ordered batches of documents; an intermingled batch of documents; one or more deposit documents; one or more header cards and/or trailer cards; or any combination thereof.

II. Introduction

Many individuals have a need to handle, count, sort, and otherwise process currency documents such as currency bills and other financial documents such as checks, deposit slips, etc.

III. Exemplary Types of Devices

The present disclosure describes various embodiments of input receptacles and loading trays. According to some embodiments, the input receptacles and loading trays described herein can be used with various kinds of currency and/or document handling and processing devices for processing currency bills and/or other financial documents such as, for example, note counters, currency bill denominating devices, document imaging devices, currency bill and/or document strapping devices, automatic teller machines (ATMs), merchant teller machines (MTs), recycler devices (RCs), Personal Teller Machines (PTMs), Automated Employee Bank Machines (AEBMs), Employee Safes (ESs), and Cashier Balancing Machines (CBMs), and other devices.

A note counter counts the number of documents or currency bills in a stack of documents. A note counter, however, does not have the capacity to process a stack of currency bills having a plurality of denominations and determine the denominations of currency bills and total the value of bills in a stack of bills having mixed denominations. Rather, note counters are designed to process stacks of bills that all have the same denomination. An example of a note counter is the JetCount® note counter manufactured by Cummins-Allison Corp. of Mt. Prospect, Ill.

A currency bill denominating device comprises one or more sensors configured to retrieve information from currency bills used by the device to determine the denomination of processed currency bills. A currency bill denominating device is configured to determine the denominations of currency bills including currency bills of a plurality of denominations, count and total the value of all the bills in a stack of bills (including the capacity to total the value of bills of mixed denominations) processed by the currency bill denominating device. According to some embodiments, currency bill denominating devices are configured to denominate bills using data from one or more sensors which do not generate visually readable images of the bills. Examples of currency bill denominating devices are the JetScan™ currency bill denominators manufactured by Cummins-Allison Corp. of Mt. Prospect, Ill. such as described in U.S. Pat. Nos. 5,295,196; 5,815,592; and 6,311,819, each of which is incorporated herein by reference in its entirety.

Document imaging devices obtain a visually readable image of one or both surfaces of processed documents and/or portions of one or both surfaces of processed documents. According to some embodiments, document imaging devices are configured to determine the denominations of currency bills, including currency bills of a plurality of denominations, count and total the value of all bills in a stack of bills processed by the document imaging devices. According to some embodiments, documents imaging devices are configured to denominate bills using data from one or more image scanners and/or from one or more non-image scanning sensors. According to some embodiments, document imaging devices are configured to process other documents such as checks, deposit slips, and/or other documents as described herein and as described in U.S. Pat. No. 8,162,125, which is hereby incorporated by reference herein in its entirety. Examples of document imaging devices include the JetScan™ iFX™ scanners manufactured by Cummins-Allison Corp. of Mt. Prospect, Ill.

Examples of ATMs include ATMs manufactured by NCR (e.g., NCR SelfServ 14), Diebold (e.g., Diebold 720—Advanced-function Lobby ATM), Wincor Nixdorf (e.g., Wincor Nixdorf CINEO C2060), Nautilus Hyosung (e.g., Nautilus Hyosung NH-1800), and Tidel (e.g., Tidel 3400).

Examples of recyclers include recyclers manufactured by CTS Cashpro (e.g., CTS Cashpro CM18), Hitachi (e.g., Hitachi SR7500), Wincor Nixdorf (e.g., Wincor Nixdorf CINEO C4040), and Cima s.p.a. (e.g., Cima s.p.a. AST 7000 NT).

Details of multiple output receptacles and systems/devices (MPS) are described in International Publication No. WO 97/45810 and U.S. Pat. No. 6,311,819, entitled "Method and Apparatus for Document Processing"; U.S. Pat. No. 7,600, 626, entitled "Currency Processing and Strapping Systems and Methods"; published U.S. Patent Application No. 2008/ 0060906 A1, entitled "Currency Processing and Strapping System and Methods"; U.S. Pat. No. 6,860,375, entitled "Multiple Pocket Currency Processing Device and Method"; U.S. Pat. No. 6,588,569, entitled "Currency Handling System Having Multiple Output Receptacles"; U.S. Pat. No. 6,601, 687, entitled "Currency Handling System Having Multiple Output Receptacles"; and published U.S. Patent Application No. 2008/0006505 A1, entitled "Angled Currency Processing System", each of which is hereby incorporated by reference herein in its entirety. Additional details of imaging multiple output receptacle systems/devices (imaging MPS) are described in published U.S. Patent Application No. 2005/ 0029168 A1, entitled "Currency Processing Device, Method and System" and published U.S. Patent Application No. 2005/0183928 A1, entitled "Currency Processing Device, Method and System", each of which is hereby incorporated by reference herein in its entirety. It is contemplated that any of the MPS devices/systems described in the aforementioned patent applications can be modified or otherwise altered to include image scanners and input receptacles as described throughout the present disclosure and otherwise can be modified to operate in the various manners described in the present disclosure.

IV. Additional Description of an Exemplary Document Processing Device

FIG. 1 is a perspective view of a document processing or handling device 100 according to some embodiments of the present disclosure. According to some embodiments, the device 100 is similar to that described in U.S. patent application Ser. No. 09/502,666, filed Feb. 11, 2000, now U.S. Pat. No. 6,398,000, entitled "Currency Handling System Having Multiple Output Receptacles".

Documents to be processed by the device 100 such as currency bills; substitute currency notes; currency notes; substitute currency media; tickets such as bar-coded tickets; currency documents; financial documents; deposit document such as deposit slips, cash-in tickets, and/or cash-out tickets; and/or deposit transaction documents such as currency bills, checks, deposit slips, deposit transaction separator cards such as header cards or trailer cards and received in an input receptacle 102.

Documents are fed, one by one, from a stack of documents placed in the input receptacle 102 into a transport mechanism 104. The transport mechanism 104 guides documents such as, for example, currency bills to one of a plurality of output receptacles 106*a*-106*h*, which may include upper output receptacles 106*a*, 106*b*, as well as lower output receptacles 106*c*-106*h*. Before reaching an output receptacle 106 the transport mechanism 104 guides documents through an evaluation region 108 where a document can be, for example, analyzed, authenticated, denominated, counted, imaged, and/ or otherwise processed. In alternative embodiments of the currency handling device 100 of the present disclosure, the evaluation region 108 can determine document orientation, size, or whether documents are stacked upon one another or whether adjacent documents overlap. The results of the above process or processes may be used to determine to which output receptacle 106 a document is directed.

In some embodiments, documents such as currency bills are transported, imaged, denominated, authenticated and/or otherwise processed at a rate equal to or greater than 600 bills per minute. In other embodiments, documents such as currency bills are transported, imaged, denominated, authenticated, and/or otherwise processed at a rate equal to or greater than 800 bills per minute. In other embodiments, documents such as currency bills are transported, imaged, denominated, authenticated and/or otherwise processed at a rate equal to or greater than 1000 bills per minute. In still other embodiments, documents such as currency bills are transported, imaged, denominated, authenticated, and/or otherwise processed at a rate equal to or greater than 1200 bills per minute. In still other embodiments, documents such as currency bills are transported, imaged, denominated, authenticated, and/or otherwise processed at a rate equal to or greater than 1500 bills per minute.

In the illustrated embodiment, interposed in the transport mechanism 104, intermediate the evaluation region 108 and the lower output receptacles 106*c*-106*h* is a facing mechanism designated generally by reference numeral 110. The bill facing mechanism is capable of rotating a document such as a currency bill 180° so that the face position of the document is reversed. For example, if a U.S. bill is initially presented with the surface bearing a portrait of a president facing down, it may be directed to the facing mechanism 110, whereupon it will be rotated 180° so that the surface with the portrait faces up. According to some embodiments, the leading edge of the document remains constant while the bill is being rotated 180° by the facing mechanism 110. The decision may be taken to send a document to the facing mechanism 110 when a selected mode of operation or other operator instructions call for maintaining a given face orientation of documents after documents have been processed by the document handling device 100. For example, it may be desirable in certain circumstances for all of the U.S. bills ultimately delivered to the lower output receptacles 106*c*-106*h* to have the bill surface bearing the portrait of the president facing up. In such embodiments of the document handling device 100, the evaluation region 108 is capable of determining the face orientation of a bill, such that a bill not having the desired face orientation can first be directed to the facing mechanism 110 before being delivered to the appropriate output receptacle 106. Further details of a facing mechanism which may be utilized for this purpose are disclosed in commonly-owned, U.S. Pat. No. 6,074,334, incorporated herein by reference in its entirety, which may be employed in conjunction with the present disclosure such as the device illustrated in FIG. 1. Other alternative embodiments of the document handling device 100 do not include the facing mechanism 110.

The document handling device 100 in FIG. 1 may be controlled from a separate controller or control unit 120 which has a display/user-interface 122, which may incorporate a touch panel display in one embodiment of the present disclosure, which displays information, including "functional" keys when appropriate. The display/user-interface 122 may be a full graphics display. Alternatively, additional physical keys or buttons, such as a keyboard 124, may be employed. The control unit 120 may be a self-contained desktop or laptop computer which communicates with the currency handling device 100 such as, for example, via a cable 125 or wirelessly. The currency handling device 100 may have a suitable communications port (not shown) for this purpose. In embodiments in which the control unit 120 is a desktop computer wherein the display/user-interface 122 and the desktop computer are physically separable, the desktop computer may be stored within a compartment 126 of the currency handling device 100. In other alternative embodiments, the control unit 120 is integrated into the currency handling device 100 so the control unit 120 is contained within the device 100.

The operator can control the operation of the document or currency handling device 100 through the control unit 120. Through the control unit 120 the operator can direct the documents such as bills into specific output receptacles 106*a*-106*h* by selecting various user defined modes. In alternative embodiments, the user can select pre-programmed user defined modes or create new user defined modes based on the particular requirements of the application. For example, the operator may select a user defined mode which instructs the document or currency handling device 100 to sort bills by denomination. For example, according to some embodiments, the evaluation region 108 would denominate the bills and direct one dollar bills into the first lower output receptacle 106*c*, five dollar bills into the second lower output receptacle 106*d*, ten dollar bills into the third lower output receptacle 106*e*, twenty dollar bills into the forth lower output receptacle 106*f*, fifty dollar bills into the fifth lower output receptacle 106*g*, and one-hundred dollar bills into the sixth lower output receptacle 106*h*. The operator may also instruct the document handling device 100 to deliver those bills whose denomination was not determined, no call bills, to the first upper output receptacle 106*a*. In such an embodiment, upper output receptacle 106*a* would function as a reject pocket. According to some embodiments, separator cards such as trailer cards may be directed to one of the upper output receptacles 106*a*, 106*b*. In some embodiments, the operator may instruct the document handling device 100 to also evaluate the authenticity of each bill. In some such embodiments, authentic bills may be directed to the appropriate lower output receptacle 106*c*-106*h*. Those bills that were determined not to be authentic, suspect bills, would be delivered to the second upper output receptacle 106*b*. A multitude of user defined modes are described in U.S. Pat. No. 6,278,795, incorporated herein by reference in its entirety, which may be employed in conjunction with the present disclosure such as the device illustrated in FIG. 1.

In the illustrated embodiment, with regard to the upper output receptacles 106*a*, 106*b*, the second upper output receptacle 106*b* is provided with a stacker wheel 127 for accumulating a number of documents, while the first upper output receptacle 106*a* is not provided with such a stacker wheel. In some embodiments, both the first and the second upper output receptacles 106*a*, 106*b* are equipped with a stacker wheel.

Additional descriptions of document or currency handling devices such as document or currency handling device 100, components thereof such as the evaluation region 108 and/or its operation may be found in the various patents and patent applications referenced above. For example, the characteristics of the evaluation region 108 may vary according to the particular application and needs of the user. The evaluation region 108 can accommodate a number and variety of different types of sensors depending on a number of variables. These variables are related to whether the machine is authenticating, counting, discriminating denominations, and/or imaging documents and what distinguishing characteristics are being examined, e.g. size, thickness, color, magnetism, reflectivity, absorbability, transmissivity, electrical conductivity, etc. The evaluation region 108 may employ a variety of detection means including, but not limited to, size detection and density sensor(s), a lower and an upper optical scan head, a single or multitude of magnetic sensors, a thread sensor, and an ultraviolet/fluorescent light scan head, and/or one or more image scanners. These detection means and a host of others are disclosed in the various patents and applications referenced above such as, for example, U.S. Pat. Nos. 6,278,795 and 8,162,125.

V. Exemplary Input Receptacles

Figure 2:
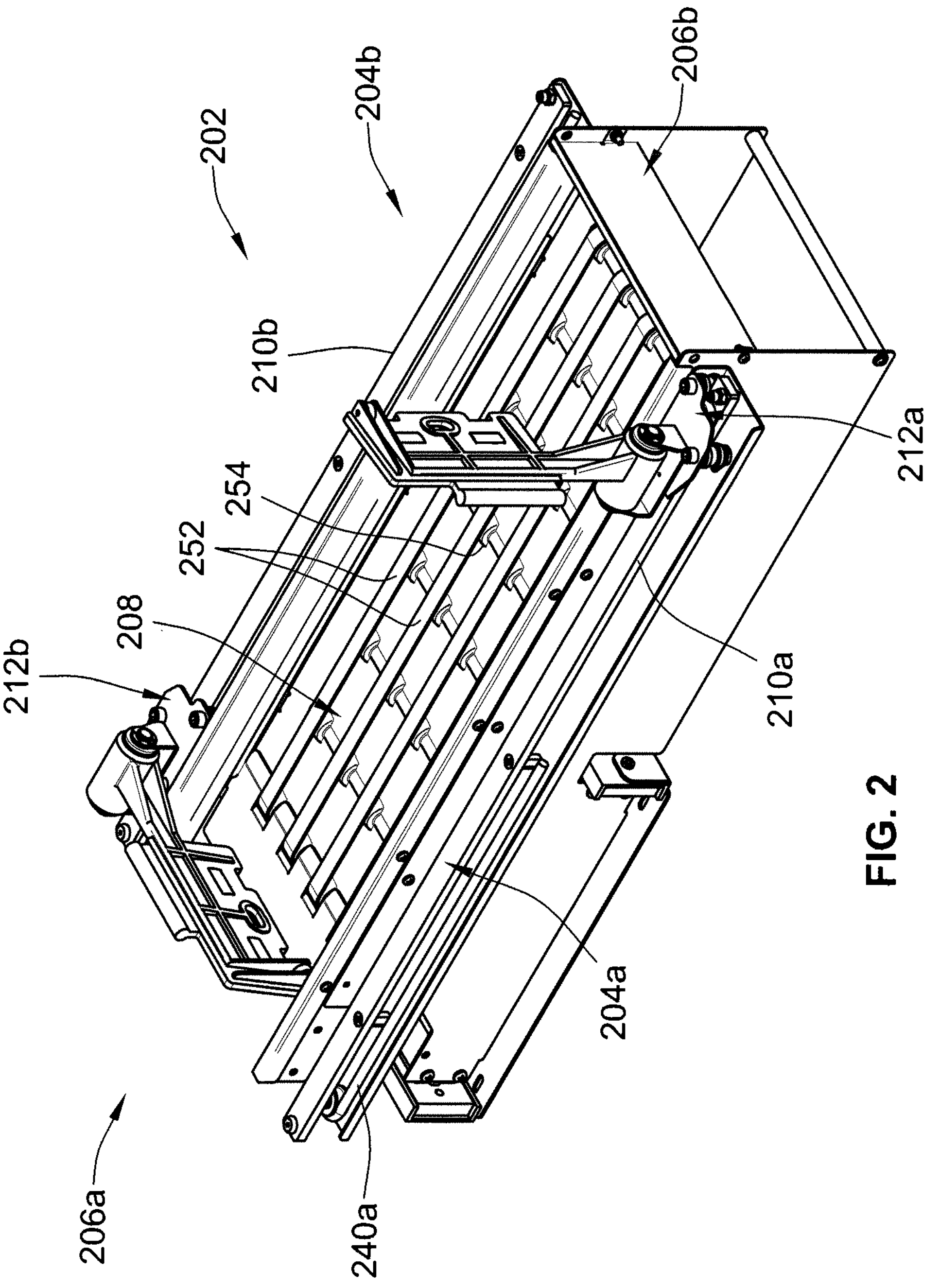
FIG. 2 is a perspective view of an input receptacle of a document handling device according to some embodiments of the present disclosure.
Figure 3:
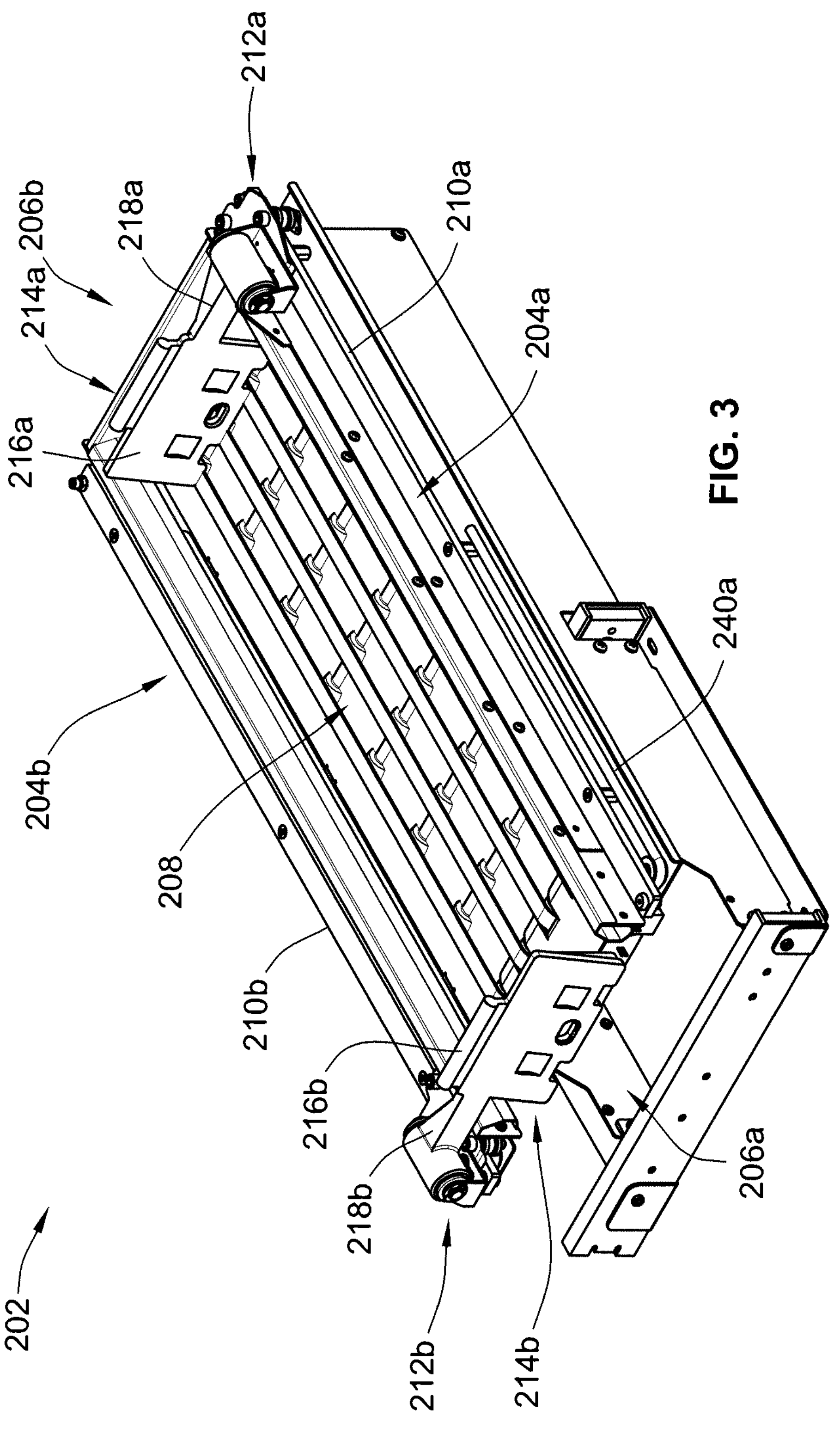
FIG. 3 is another perspective view of the input receptacle of FIG. 2 according to some embodiments of the present disclosure.
Figure 4:
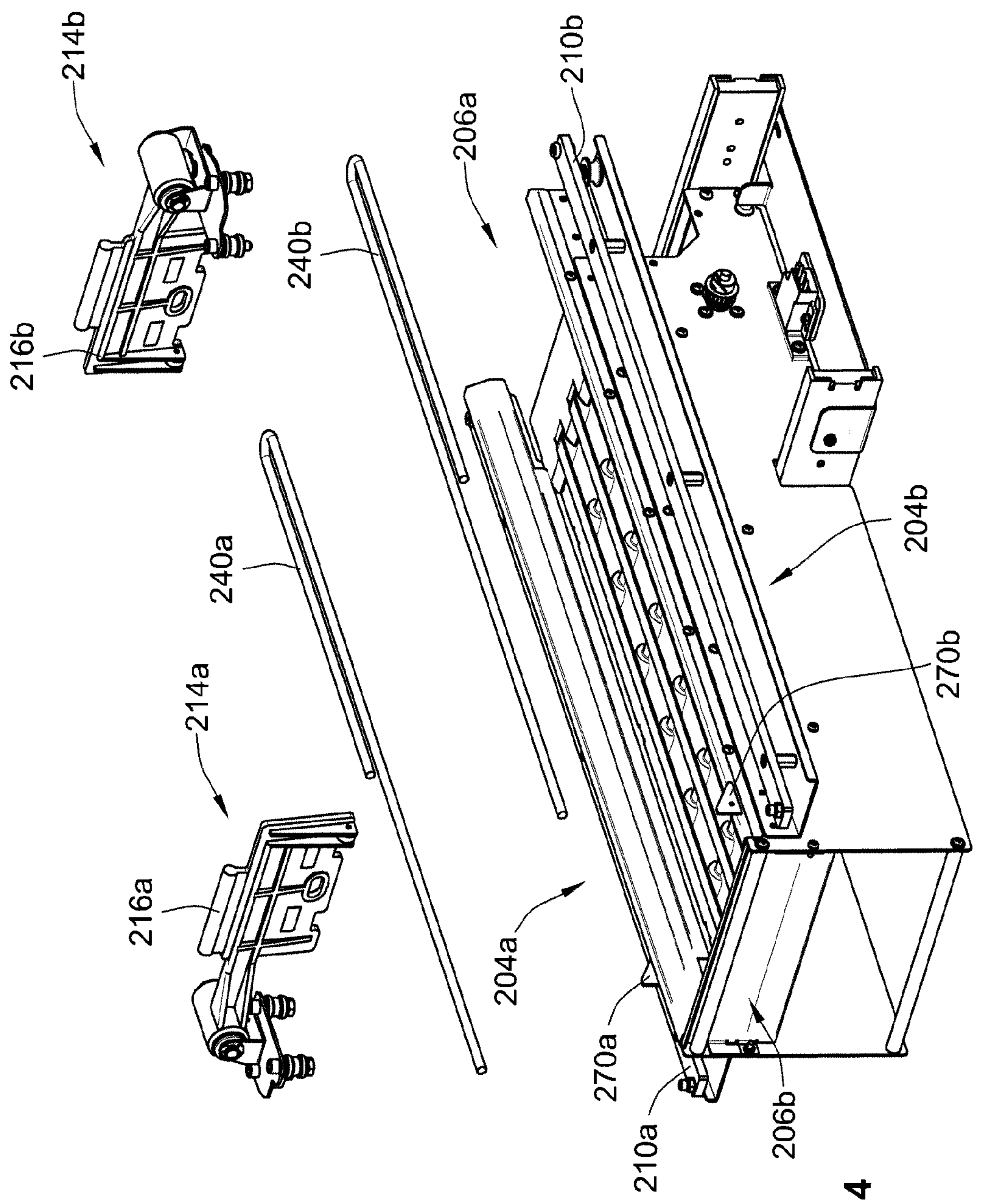
FIG. 4 is a partially exploded perspective view of the input receptacle of FIGS. 2 and 3 according to some embodiments of the present disclosure.
Figure 5:
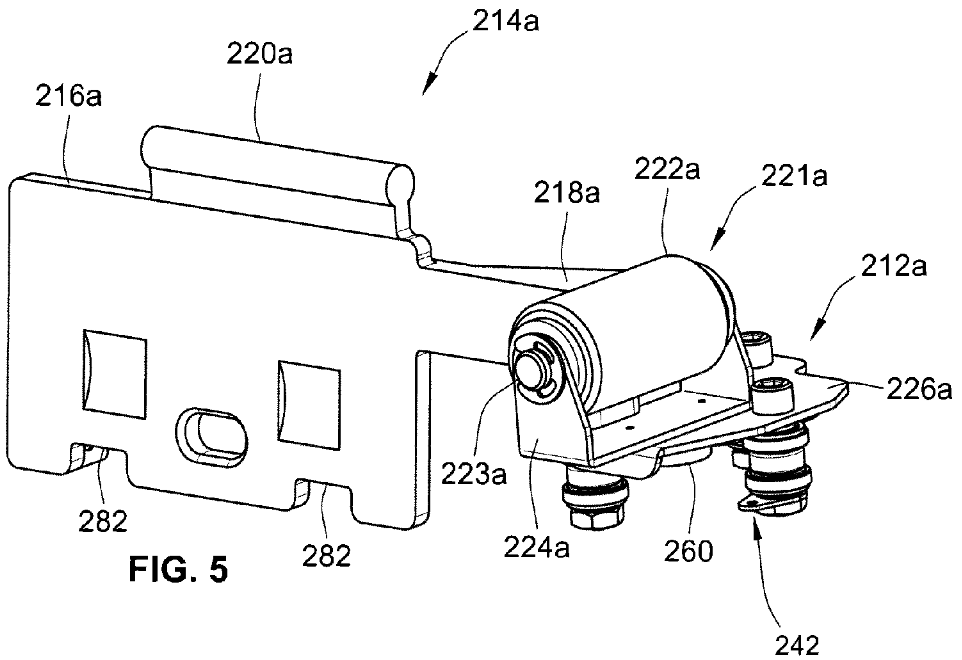
FIG. 5 is a front perspective view of a paddle assembly of the input receptacle of FIGS. 2 and 3 according to some embodiments of the present disclosure.
Figure 6:
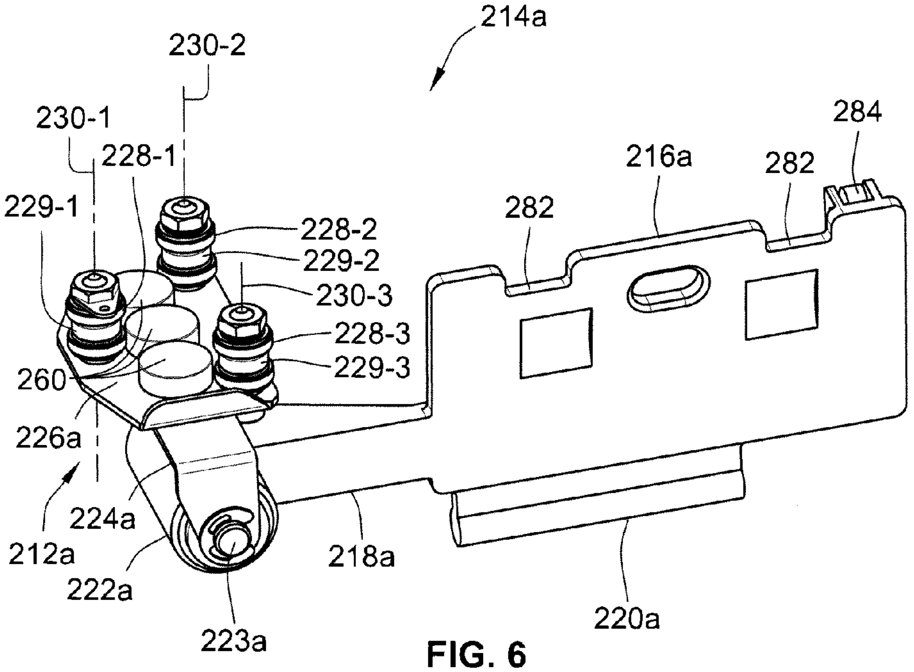
FIG. 6 is a bottom, front perspective view of a paddle assembly of the input receptacle of FIGS. 2 and 3 according to some embodiments of the present disclosure.

FIGS. 2 and 3 are perspective views of an input receptacle 202 of a document handling device according to some embodiments of the present disclosure. FIG. 4 is a partially exploded perspective view of the input receptacle 202 of FIGS. 2 and 3 according to some embodiments of the present disclosure. FIG. 5 is a front perspective view and FIG. 6 is a bottom, front perspective view of a first paddle assembly 214*a* of the input receptacle of FIGS. 2 and 3 according to some embodiments of the present disclosure.

According to some embodiments, the input receptacle 202 is incorporated into a document handling device such as, for example, the document or currency handling device 100 of FIG. 1 or one of the document or currency handling devices such as note counters, currency bill denominating devices, document imaging devices, ATMs described in the above mentioned patent applications and patent previously incorporated by reference in their entireties including, for example, U.S. Pat. Nos. 6,398,000; 7,726,457; 7,753,189; 7,686,151; and 8,162,125, and U.S. Published Application No. 2011-0215034 and U.S. patent application Ser. No. 13/774,974. According to some embodiments the input receptacle 202 is configured to receive a plurality of stacks or batches of documents such as currency bills.

Referring to FIGS. 2-4, the input receptacle 202 has a first side 204*a* and a second opposing side 204*b*, a front end 206*a* and a back end 206*b*, and a floor 208. A feeder mechanism (not shown, see e.g., FIGS. 7A-7D for an example of a feeder mechanism) is disposed adjacent the front end 206*a* of the input receptacle 202. The feeder mechanism is configured to transfer documents, one at a time, from the input receptacle 202 into a document handling device.

The input receptacle 202 comprises a first paddle rail 210*a* disposed along the first side 204*a*. According to some embodiments, the first paddle rail 210*a* serves as a first trolley guide for a first paddle trolley 212*a*. According to some embodiments, the first paddle rail 210*a* is an elongated bar positioned adjacent to and substantially parallel to the first side 204*a* of the input receptacle 202 and having a length generally extending from a location near the front end 206*a* to a location near the back end 206*b* of the input receptacle 202. According to some embodiments, the first paddle rail 210*a* has a generally rectangular cross-sectional shape as viewed in a cross-sectional view transverse to the length of the rail 210*a*.

According to some embodiments, the input receptacle 202 further comprises a first paddle assembly 214*a*. According to some embodiments and as may be seen more clearly in FIGS. 5-6, the first paddle assembly 214*a* comprises a first paddle 216*a*, a first paddle arm 218*a*, and a first paddle pivot assembly 221*a*. In the illustrated embodiment, the first paddle arm 218*a* extends from the first paddle 216*a* and couples the first paddle 216*a* to the first paddle pivot assembly 221*a*. According to some embodiments, the first paddle assembly 214*a* also comprises a first paddle handle 220*a* extending from the top of the first paddle 216*a*. According to some embodiments, the first paddle pivot assembly 221*a* comprises a pivot housing 222*a*, a pivot axle 223*a*, and a pivot axle holder 224*a*. The pivot housing 222*a* is configured to pivot about the pivot axle 223*a* and the pivot axle holder 224*a* is configured to hold the pivot axle 223*a*.

According to some embodiments, the first paddle assembly 214*a* is coupled to the first paddle trolley 212*a*. According to the embodiment illustrated in FIGS. 5-6, the first paddle assembly 214*a* is coupled to the first paddle trolley 212*a* by coupling the first pivot axle holder 224*a* to a first trolley plate 226*a* of the first paddle trolley 212*a*.

According to some embodiments, the first paddle trolley 212*a* has a plurality of first paddle rail couplers 228-1-228-3. In the illustrated embodiment, the first paddle rail couplers 228-1-228-3 extend downward from the first trolley plate 226*a*. In the illustrated embodiment, each of the first paddle rail couplers 228-1-228-3 is configured to rotate about coupler axes 230-1-230-3. According to some embodiments, the coupler axes 230-1-230-3 are substantially vertical axes when the first paddle trolley 212*a* is coupled to the first paddle rail 210*a*. According to some embodiments, the first paddle rail couplers 228-1-228-3 have sides which complement the shape of the first paddle rail 210*a*. For example, in the illustrated embodiment, the sides of first paddle rail couplers 228-1-228-3 have an indentation 229-1-229-3 configured to mate with sides of the first paddle rail 210*a*.

In operation, first paddle trolley 212*a* is mounted on the first paddle rail 210*a* which serves as a first trolley guide thereby permitting the first paddle trolley 212*a* to move in a linear manner adjacent and substantially parallel to the first side 204*a* of the input receptacle 202. As the first paddle trolley 212*a* moves along the first trolley rail 210*a*, the first paddle rail couplers 228-1-228-3 are free to rotate about respective axes 230-1-230-3 thereby facilitating a smooth motion while reducing frictional resistance to the movement of the first trolley 212*a* along the first trolley rail 210*a*. Likewise, the linear motion of the first paddle trolley 212*a* along the first trolley rail 210*a* translates into a liner motion of the first paddle 216*a* towards and away from the first end 206*a* of the input receptacle 206*a*. Furthermore, the first paddle pivot assembly 221*a* permits the first paddle 216*a* to transition between a first operational position within the input receptacle 202 as illustrated in FIG. 3 and at least a second non-operational position outside the input receptacle 202 such as illustrated in FIG. 2 by permitting the first paddle 216*a* to pivot about the first pivot axle 223*a*.

According to some embodiments, the first paddle 216*a* is biased toward the first end 206*a* of the input receptacle 202 toward a feeder mechanism. According to some embodiments, the biasing of the first paddle 216*a* is achieved by the use of a first resilient member. According to some embodiments, the first resilient member is a spring 240*a*. According to some embodiments, one end of the spring 240*a* is coupled to the first trolley 212*a* such as, for example, by having a portion of the spring 240*a* extending through a first resilient member aperture 242 illustrated in FIG. 5.

According to some embodiments, the input receptacle 202 additionally comprises a second paddle rail 210*b* disposed along the second side 204*b*. The second paddle rail 210*b* serves as a second trolley guide for a second paddle trolley 212*b*. In the embodiment illustrated, the second paddle rail 210*b* is an elongated bar positioned adjacent to and substantially parallel to the second side 204*b* of the input receptacle 202. According to some embodiments, the second paddle rail 210*b* and the second paddle trolley 212*b* are identical or substantially identical to the first paddle rail 210*a* and the first paddle trolley 212*a* and identically or substantially identically arranged with respect to each other as described above. According to some embodiments, the input receptacle 202 comprises a second paddle assembly 214*b* (FIGS. 3 and 4) comprising a second paddle 216*b*, a second paddle arm 218*b*, a second paddle pivot assembly 221*b*, and a second resilient member such as a spring 240*b* identical or substantially identical to the first paddle assembly 214*a*, the first paddle 216*a*, the first paddle arm 218*a*, the first paddle pivot assembly 221*a*, and the first resilient member such as spring 240*a*, respectively, and identically or substantially identically arranged with respect to each other.

Figure 7A:
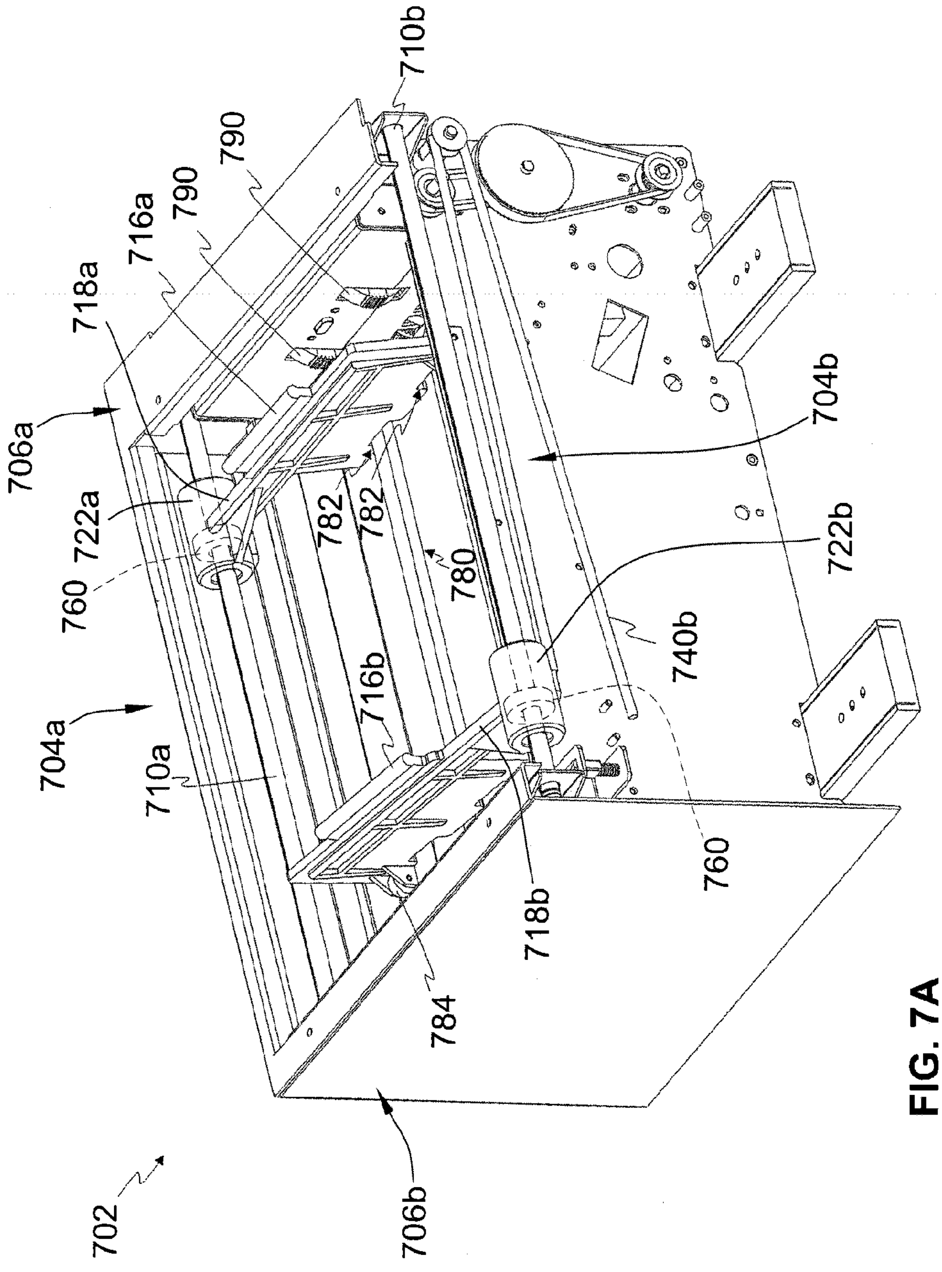
FIG. 7A is a perspective view of an input receptacle according to some alternate embodiments of the present disclosure.
Figure 7B:
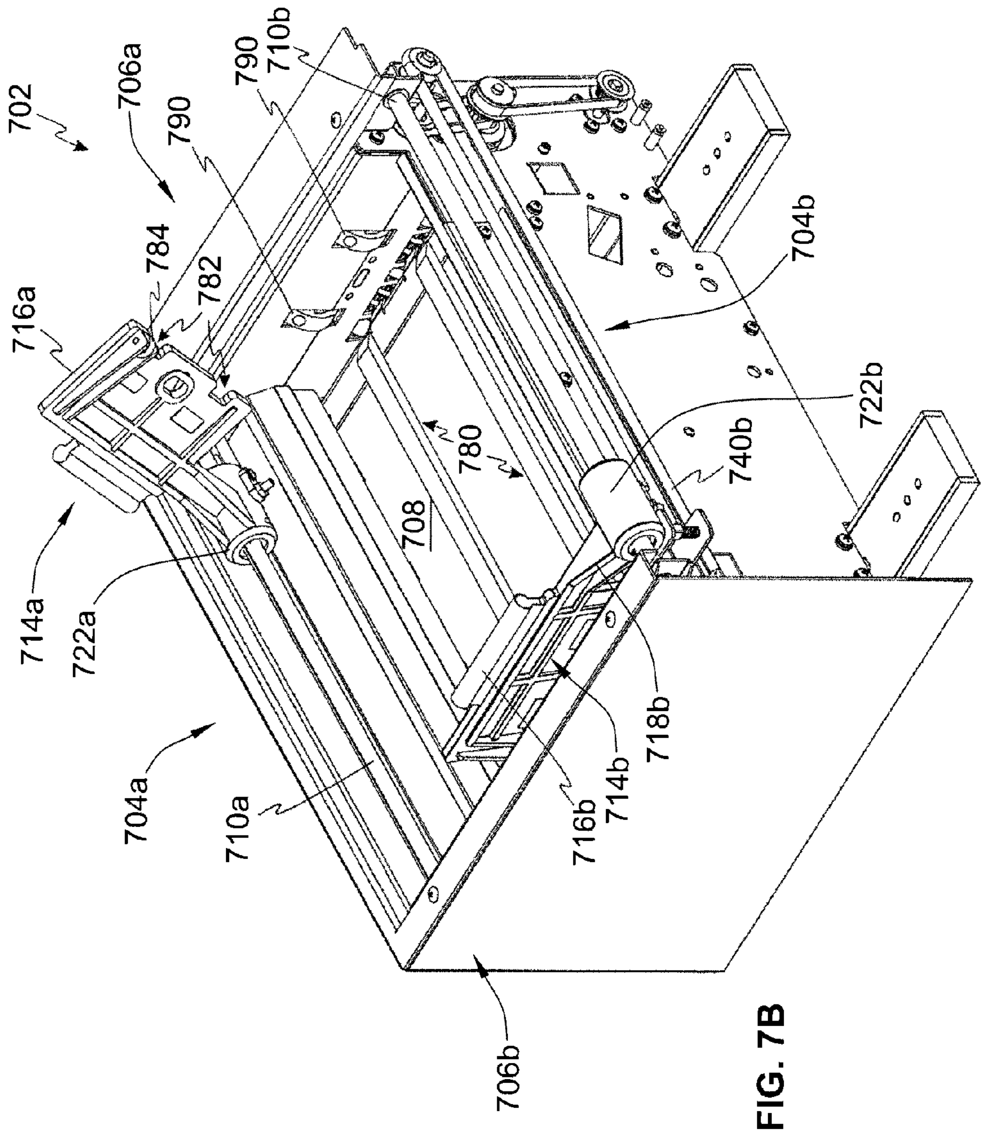
FIG. 7B is another perspective view of the input receptacle of FIG. 7A according to some embodiments of the present disclosure.
Figure 7C:
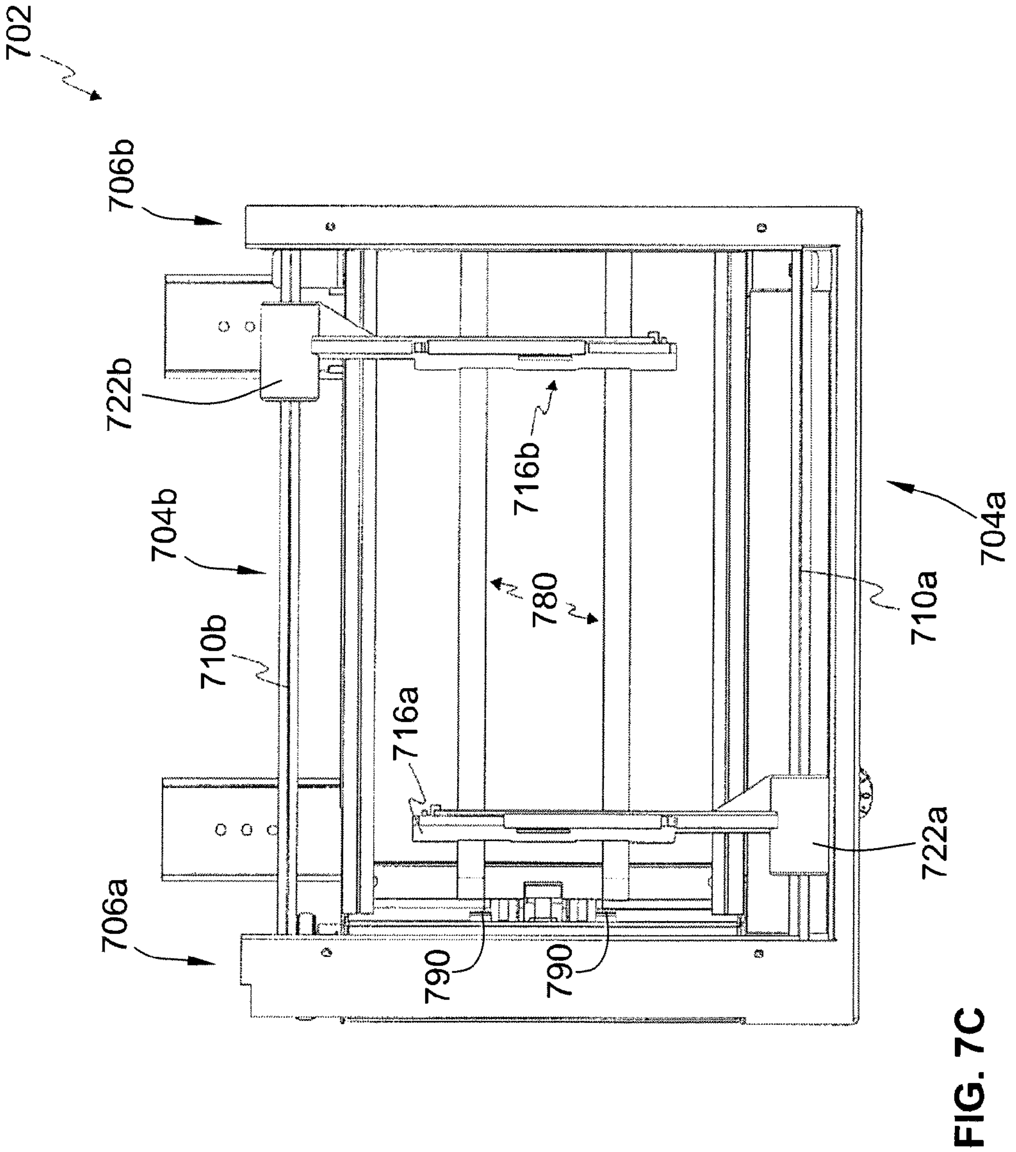
FIG. 7C is a top view of the input receptacle of FIG. 7A according to some embodiments of the present disclosure.

According to some embodiments, the input receptacle 202 comprises a plurality of belts 252 supported by passive rollers 254. According to some alternate embodiments, the belts 252 and rollers 252 are omitted and a pair of tracks such as tracks 780 illustrated in FIGS. 7A-7C are positioned on the floor 708 of the input receptacle and the paddle 216*a* contains channels 282 (see FIGS. 5-6) to aid in constraining the paddle 216*a* to a linear path along the pair of tracks. According to some embodiments, the paddle 716*a* may additionally include a roller 284 (FIG. 6) to facilitate the movement of the paddle 216*a* along the floor 208.

Figure 7D:
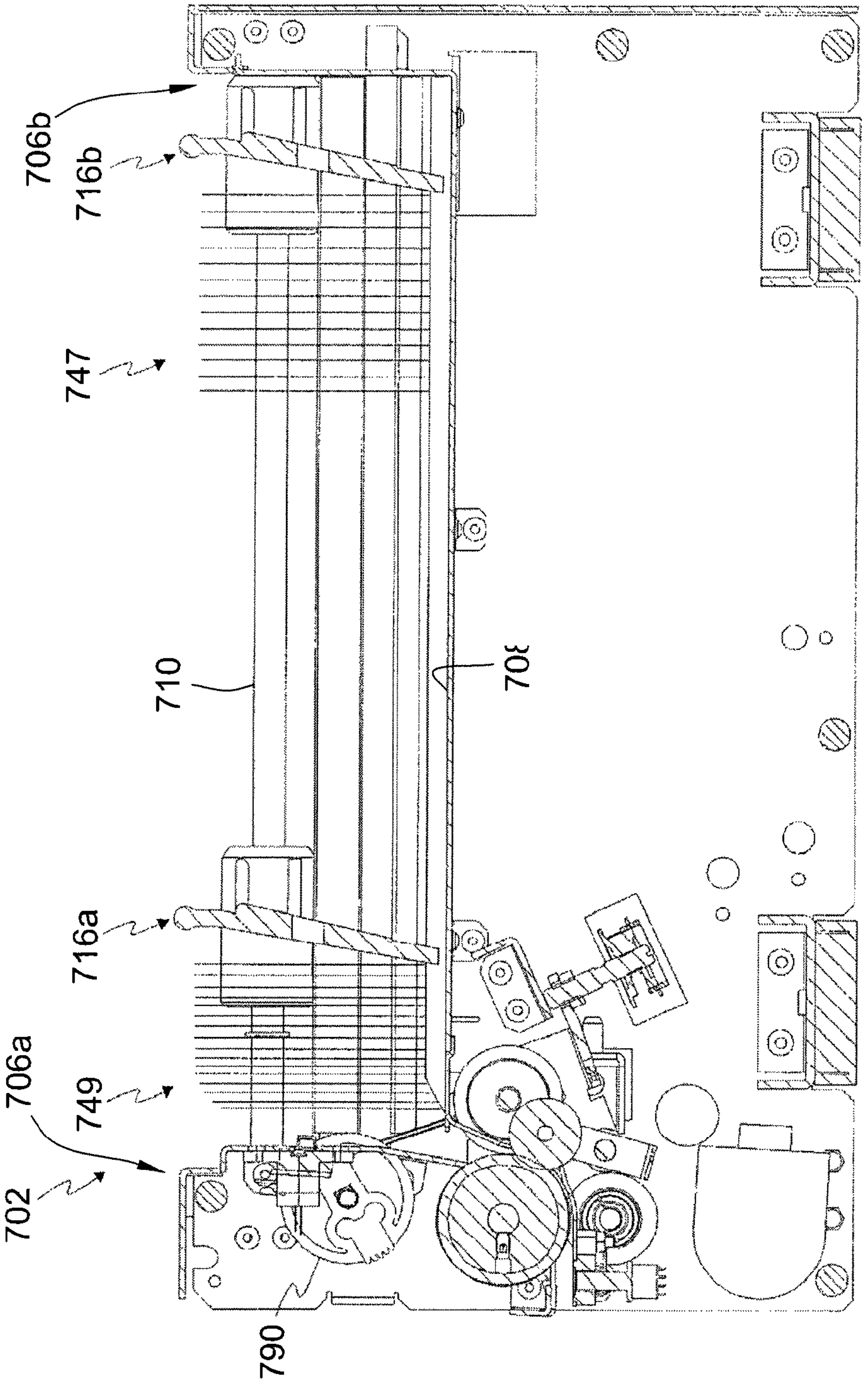
FIG. 7D is a cross-sectional side view of the input receptacle of FIG. 7A according to some embodiments of the present disclosure.

Referring now to FIGS. 7A-7D, FIG. 7A is a perspective view of an input receptacle 702 according to some alternate embodiments of the present disclosure. FIG. 7B is another perspective view of the input receptacle 702 of FIG. 7A according to some embodiments of the present disclosure. FIG. 7C is a top view of the input receptacle 702 of FIG. 7A according to some embodiments of the present disclosure. FIG. 7D is a cross-sectional side view of the input receptacle 702 of FIG. 7A according to some embodiments of the present disclosure. In general, input receptacle 702 is similar to input receptacle 202 of FIGS. 2-6 and like reference numerals are used for similar or identical components. For example, in FIGS. 2-6 a resilient member such as a spring is given a reference numeral beginning with 240 whereas in FIGS. 7A-7D a similar or identical resilient member such as a spring is given a reference number beginning with 740. Likewise, according to some embodiments, the operation of the input receptacle 202 and the manner of loading the input receptacle 202 using paddles 216*a*, 216*b* is similar to or identical to the operation of the input receptacle 702 and the manner of loading the input receptacle 702 using paddles 716*a*, 716*b*.

In general, in FIGS. 7A-7D, the first and second paddle rails 210*a*, 210*b* in the form of elongated rectangular bars are replaced by first and second paddle rails 710*a*, 710*b* in the form of elongated cylindrical bars. Furthermore, pivot housings 722*a*, 722*b* corresponding generally pivot housings 222*a*, 222*b* are configured to pivot about the respective first and second paddle rails 710*a*, 710*b* and the first and second paddle trolleys 212*a*, 212*b* are omitted.

According to some embodiments, the input receptacle 702 is incorporated into a document handling device such as, for example, the document or currency handling device 100 of FIG. 1 or one of the document or currency handling devices such as note counters, currency bill denominating devices, document imaging devices, ATMs described in the above mentioned patent applications and patent previously incorporated by reference in their entireties including, for example, U.S. Pat. Nos. 6,398,000; 7,726,457; 7,753,189; 7,686,151; and 8,162,125, and U.S. Published Application No. 2011-0215034 and U.S. patent application Ser. No. 13/774,974. According to some embodiments the input receptacle 702 is configured to receive a plurality of stacks or batches of documents such as currency bills.

Referring to FIGS. 7A-7D, the input receptacle 702 has a first side 704*a* and a second opposing side 704*b*, a front end 706*a* and a back end 706*b*, and a floor 708. An exemplary feeder mechanism such as a pair of stripping wheels 790 is disposed adjacent the front end 706*a* of the input receptacle 702. The feeder mechanism is configured to transfer documents in seriatim, one at a time, from the input receptacle 702 into a document handling device.

The input receptacle 702 comprises a first paddle rail 710*a* disposed along the first side 704*a*. According to some embodiments, the first paddle rail 710*a* serves as a first paddle guide for a first pivot housing 722*a*. According to some embodiments, the first paddle rail 710*a* is an elongated cylindrical bar positioned adjacent to and substantially parallel to the first side 704*a* of the input receptacle 702 and having a length generally extending from a location near the front end 706*a* to a location near the back end 706*b* of the input receptacle 702. According to some embodiments, the first paddle rail 710*a* has a generally circular cross-sectional shape as viewed in a cross-sectional view transverse to the length of the rail 710*a*.

According to some embodiments, the input receptacle 702 further comprises a first paddle assembly 714*a*. According to some embodiments, the first paddle assembly 714*a* comprises a first paddle 716*a*, a first paddle arm 718*a*, and the first pivot housing 722*a*. In the illustrated embodiment, the first paddle arm 718*a* extends from the first paddle 716*a* and couples the first paddle 716*a* to the first pivot housing 722*a*. According to some embodiments, the first paddle assembly 714*a* also comprises a first paddle handle 720*a* extending from the top of the first paddle 716*a*. According to some embodiments, the first pivot housing has an aperture therein configured to permit the first paddle rail 710*a* to extend there through. The pivot housing 722*a* is configured to pivot about the first paddle rail 710*a* which extends through the aperture of the first pivot housing 722*a*. According to some embodiments, the shape aperture of the first pivot housing 722*a* is complimentary to the shape of the first paddle 710*a*, e.g., both made have a circular cross-sectional shape. The pivot housing 722*a* is pivotally and slidably mounted to the first paddle rail 710*a*. The pivot housing 722*a* also constrains the paddle 716*a* to a linear path. The pivot housing 722*a* may contain a liner bearing (not shown) allowing the paddle 716*a* to easily slide along the shaft 710*a*, 710*b*.

In operation, pivot housing 722*a* is mounted on the first paddle rail 710*a* which serves as a first paddle guide thereby permitting the first pivot housing 722*a* to move in a linear manner adjacent and substantially parallel to the first side 704*a* of the input receptacle 702. Likewise, the linear motion of the first pivot housing 722*a* along the first paddle rail 710*a* translates into a liner motion of the first paddle 716*a* towards and away the first end 706*a* of the input receptacle 706*a*. Furthermore, as best illustrated in FIGS. 7A-7B, the first pivot housing 722*a* permits the first paddle 716*a* to transition between a first operational position within the input receptacle 702 as illustrated in FIG. 7A and at least a second non-operational position outside the input receptacle 702 such as illustrated in FIG. 7B by permitting the first paddle 716*a* to pivot about the first paddle rail 710*a*.

According to some embodiments, the first paddle 716*a* is biased toward the first end 706*a* of the input receptacle 702 toward a feeder mechanism. According to some embodiments, the biasing of the first paddle 716*a* is achieved by the use of a first resilient member. According to some embodiments, the first resilient member is a spring 740*a*. According to some embodiments, one end of the spring 740*a* is coupled to the first pivot housing 722*a*. In the illustrated embodiment, bias is imparted to the pivot housing 722*a* via a spring 740*a*. In other alternative embodiments, the pivot housing 722*a* is motor driven.

In the embodiment illustrated, the paddle 716*a* may also contain channels 782 to aid in constraining the paddle 716*a* to a linear path along a pair of tracks 780 on the floor 708 of the input receptacle. According to some embodiments, the channels 782 disposed in a bottom surface of the first paddle 716*a* have a width slightly larger than a width of the track 780 and the channel 782 is adapted to fit around the track 780 and the channel 782 is adapted to slide along the track 780. According to some embodiments, channels 782 are disposed in a bottom surface of a second paddle 716*b* and the channels 782 have a width slightly larger than a width of the track 780 and the channel 782 is adapted to fit around the track 780 and the channel 782 is adapted to slide along the track 780.

The paddle 716*a* may additionally include a roller 784 to facilitate the movement of the paddle 716*a*. According to some embodiments, the first paddle 716*a* (and/or second paddle 716*b*) has a bottom surface and the roller 784 is attached to the first paddle 716*a* (and/or second paddle 716*b*) in a manner such that the roller 784 extends slightly beyond the bottom surface of the first paddle 716*a* (and/or second paddle 716*b*). The roller 784 is adapted to roll along the floor 708 of the receptacle as the first paddle 716*a* (and/or second paddle 716*b*) urges a stack of bills or documents towards the front end 706*a* of the input receptacle 702. Alternatively, according to some embodiments, the input receptacle 702 comprises a plurality of belts supported by passive rollers similar to the arrangement of belts 252 and rollers 254 illustrated in FIGS. 2-4.

According to some embodiments, the input receptacle 702 additionally comprises a second paddle rail 710*b* disposed along the second side 704*b*. The second paddle rail 710*b* serves as a second paddle guide for a second pivot housing 722*b*. In the embodiment illustrated, the second paddle rail 710*b* is an elongated cylindrical bar positioned adjacent to and substantially parallel to the second side 704*b* of the input receptacle 702. According to some embodiments, the second paddle rail 710*b* and the second pivot housing 722*b* are identical or substantially identical to the first paddle rail 710*a* and the first pivot housing 722*a* and identically or substantially identically arranged with respect to each other as described above. According to some embodiments, the input receptacle comprises a second paddle assembly 714*b* comprising a second paddle 716*b*, a second paddle arm 718*b*, the second pivot housing 722*b*, and a second resilient member such as a spring 740*b* identical or substantially identical to the first paddle assembly 714*a*, the first paddle 716*a*, the first paddle arm 718*a*, the first pivot housing 722*a*, and the first resilient member such as spring 740*a*, respectively, and identically or substantially identically arranged with respect to each other.

Accordingly, according to some embodiments, the input receptacle 702 includes at least one spring-loaded feeder paddle 716*a* which is pivotally mounted, permitting it to be pivoted upward and drawn back to the rear of a stack of bills placed in the input receptacle 702 so as to bias the bills towards the pair of stripping wheels 790.

According to some embodiments, the second paddle 716*b* is provided such that a second stack of bills 747 may be placed in the input receptacle 702 behind a first group of bills 749, while the first group of bills 749 is being fed out of the input receptacle. Thus, the two feeder paddles 716*a* and 716*b* may be alternated during processing in order to permit multiple stacks of currency bills to be loaded into the input receptacle 702. According to some such embodiments, the operator would retract paddle 716*a* and place a stack of bills into the input receptacle 702. Once inside the input receptacle 702, the operator would place the paddle 716*a* against the stack of bills so that the paddle 716*a* biases the stack of bills towards the pair of stripper wheels 790. The operator could then load a second stack of bills into the input receptacle 702 by retracting the second paddle 716*b* and placing a stack of bills in the input receptacle between the paddles 716*a* and 716*b*. The second paddle 716*b* urges the second stack of bills up against the backside of the first paddle 716*a*. The operator can then upwardly rotate the first paddle 716*a* thus combining the two stacks. The first paddle 716*a* is then retracted to the rear of the input receptacle 702 and the process can be repeated. The two paddle input receptacle allows the operator to more easily continuously feed stacks of bills to an associated currency or document handling device. According to some embodiments, this process likewise applies to input receptacle 202 and the use of the two paddles 216*a*, 216*b*. In devices not having two feeder paddles, the operator is forced to awkwardly manipulate the two stacks of bills and a single paddle. Alternatively, the operator may wait for a first stack of bills to be completely processed out of the input receptacle before adding another stack; however, waiting to reload until each stack is processed adds to the total time to process a given amount of currency or documents.

Now, an exemplary loading operation of input receptacle 202 will be described using the two paddle 216*a*, 216*b* configuration of FIG. 3 as a reference. However, it should be understood that this description is also applicable to the use of input receptacle 702 and the two paddles 716*a*, 716*b*. According to some embodiments, when initially loading documents such as currency bills into the input receptacle 202, both paddles 216*a*, 216*b* are manually retracted by an operator toward the back end 206*b* of the input receptacle 202. The force exerted by, for example, the hands of the operator overcomes the biasing force applied by springs 240*a*, 240*b* allowing the operator to move the paddles 216*a*, 216*b* toward the back end 206*b* of the input receptacle 202. Note, should the operator release one or both paddles 216*a*, 216*b*, a released paddle would be pulled by the respective spring 240*a*, 240*b* to or toward a position adjacent the front end 206*a* of the input receptacle.

According to some embodiments, the input receptacle 202 (and/or input receptacle 702) is provided with rigid and/or releasable latches or stops such as rigid paddle stop 270*a* (best shown in FIG. 4) for locking and/or holding the paddles 216*a*, 216*b* in positions adjacent the back end 206*b* of the input receptacles. In the embodiment illustrated in FIG. 4, the latch or stop 270*a* is a flange protruding from a top of the first side 204*a*. According to some embodiments, the latch or stop 270*a* has a sloping front edge and a generally vertical back edge which facilitates allowing the arm 218*a* of the first paddle assembly 214*a* to slide up and over the top of the latch or stop 270*a* as the first paddle assembly 214*a* is moved rearwardly in an operational position. Once the first arm 218*a* is positioned to the rear of the latch or stop 270*a* in an operational position, the generally vertical rear edge of the latch or stop 270*a* prevents the first arm 218*a* (and, thus, the first paddle assembly 214*a*) from moving forward past the latch or stop 270*a* when the first paddle assembly is in an operational position and is released by the operator. Rather, forward bias applied to the first paddle assembly holds the arm 218*a* of the first paddle assembly 214*a* into engagement with the rear edge of the latch or stop 270*a*. To disengage the first paddle assembly 214*a* from the latch 270*a*, the first paddle assembly 214*a* may be pivoted up and over the latch 270*a*. According to some embodiments, a latch or stop may exist for holding the second paddle assembly 214*b* (or second paddle assembly 714*b*) in a retracted position away from the front end 206*a* of the input receptacle 202 (or input receptacle 702).

While both paddles 216*a*, 216*b* are at a position toward the back end 206*b* of the input receptacle 202, the operator may manually insert a first stack of documents such as currency bills into the input receptacle between the front end 206*a* of the input receptacle 202 and the paddles 216*a*, 216*b* with individual documents residing in generally vertical planes and resting on edges of the documents. The operator may then place a first one of the paddles against a document in the first stack closest to the back end 206*b* of the input receptacle 202. According to some embodiments, the first one of the paddles then pushes the first stack of documents against the front end 206*a* of the input receptacle and holds the documents so that they remain stacked upright upon the edges of the documents with the foremost document in the stack pressed into engagement with a feeder mechanism positioned at the front end 206*a* of the input receptacle 202 (e.g., stripper wheels 790 shown in FIG. 7A).

A second stack of documents may then be placed into the input receptacle in a similar fashion between the first one of the paddles abutting the first stack of documents and the second one of the paddles which is positioned toward the back end 206*b* of the input receptacle 202. The operator may then place the second one of the paddles against a document in the second stack closest to the back end 206*b* of the input receptacle 202. The second one of the paddles then pushes the second stack of documents against a back side of the first one of the paddles. The second one of the paddles then holds the documents in the second stack so that they remain stacked upright upon the edges of the documents. Note, when using such a method, a second stack of documents may be loaded into the input receptacle 202 even while a feeder mechanism (e.g., the pair of stripper wheels 790 shown in FIG. 7A) is operating to transfer documents from the first stack of documents, one at a time, from the input receptacle 202 into a document handling device.

The first one of the paddles may then be rotated upward so that it is no longer between the first and the second stacks of documents, thereby causing the first and second stacks of documents to merge into a single stack of documents. To add additional documents into the input receptacle 202, the operating may pull the first one of the paddles toward the back end 206*b* of the input receptacle 202 and rotate it downward to an operational position and insert a third stack of documents between the second one of the paddles and the first one of the paddles. The operator may then place the first one of the paddles against a document in the third stack closest to the back end 206*b* of the input receptacle 202 which then pushes the third stack of documents against a back side of the second one of the paddles, holding the third stack of documents in place in the input receptacle 202. Again note, using such a method, a third stack of documents may be loaded into the input receptacle 202 even while a feeder mechanism (e.g., the pair of stripper wheels 790 shown in FIG. 7A) is operating to transfer documents from a previously loaded stack of documents, one at a time, from the input receptacle 202 into a document handling device.

The second one of the paddles may then be rotated upward so that it is no longer between the second and the third stacks of documents, thereby causing the second and third stacks of documents to merge into a single stack of documents. To continue adding documents into the input receptacle, this process may be continued by alternatively removing a paddle from between two stacks of documents and moving it toward the back end 206*b* of the input receptacle and placing an additional stack of documents between the removed paddle and the other paddle pressing against the previously existing stack of documents in the input receptacle 202. Using such a method, the operation of a document handling device having input receptacle 202 can continuously run even while additional documents are being loaded into the input receptacle.

In loading documents into the input receptacle 202 or input receptacle 702, a paddle 216*a*, 216*b*, 716*a*, 716*b* may occasionally slip out of the hand of the operator. Due to the fact that the paddles are forward biased toward the front end 206*a*, 706*a* of the input receptacle 202, 702, the released paddle will snap quickly toward the front end 206*a*, 706*a* of the input receptacle 202, 702. The unrestrained, undamped movement of the paddle 216*a*, 216*b*, 716*a*, 716*b* can be quite rapid and the paddle can hurt the hand of an operator if the paddle strikes the operator's hand as the paddle moves toward the front end 206*a*, 706*a* of the input hopper.

In general, the longer the input receptacle 202, 702 (measured between the front end 206*a*, 706*a* and the back end 206*b*, 706*b*), the more documents that may be accommodated in the input receptacle 202, 702 at any one time. However, the longer the input receptacle 202, 702, the greater the force the biasing mechanism such as spring 240*a*, 240*b*, 740*a*, 740*b* must impart on the paddle 216*a*, 216*b*, 716*a*, 716*b* to ensure the paddle 216*a*, 216*b*, 716*a*, 716*b* pushes on a large stack of documents in the input receptacle 202, 702 with sufficient force to move the stack into proper contact into the front end 206*a*, 706*a* of the input receptacle 202, 702 and the feeding mechanism (e.g., the pair of stripper wheels 790 shown in FIG. 7A) located there. Increasing the biasing force of the resilient members such as springs 240*a*, 240*b*, 740*a*, 740*b* however, increases the unrestrained, undamped rate of acceleration of the paddle 216*a*, 216*b*, 716*a*, 716*b*. For example, in some embodiments, a paddle 216*a*, 216*b*, 716*a*, 716*b* extended twenty (20) inches away from the front end 206*a*, 706*a* of the input receptacle is biased toward the front end by a resilient member such as spring 240*a*, 240*b*, 740*a*, 740*b* with about three and a half pounds to about four pounds of force. According to some such embodiments, the paddle 216*a*, 216*b*, 716*a*, 716*b* will travel to the front end 206*a*, 706*a* of the input receptacle 202, 702 (when the input receptacle is empty) with an average unrestrained, undamped rate of speed of about 70 inches per second or more. Furthermore, the unrestrained, undamped rate of speed generally increases from time of release until the paddle 216*a*, 216*b*, 716*a*, 716*b* is adjacent the front end 206*a*, 706*a* of the input receptacle. Thus, according to some embodiments, an unrestrained, undamped paddle 216*a*, 216*b*, 716*a*, 716*b* may be moving at about 100 inches per second as it approaches the first end 206*a*, 706*a* of the input receptacle.

According to some embodiments, a damping mechanism is added to the paddle system of the input receptacle 202, 702 to reduce the speed and average rate of speed of an unrestrained paddle 216*a*, 216*b*, 716*a*, 716*b*. Referring to FIGS. 5 and 6, according to some embodiments, one or more magnets 260 are coupled to a bottom side of the first trolley plate 226*a*. According to some embodiments, magnets 260 are permanent magnets. For embodiments, comprising a second paddle 216*b*, one or more magnets 260 may likewise be coupled to a bottom side of a second trolley plate 226*b*. Additionally, according to some embodiments, the first paddle rail 210*a* (FIGS. 2 and 3) serving as a first trolley guide for the first paddle trolley 212*a* (and where present, the second paddle rail 210*b* serving as a second trolley guide for the second paddle trolley 212*b*) is made of a non-ferrous, conductive material such as, for example, aluminum, copper, or bronze. The one or more magnets 260 being mounted on the underside of the trolley plate 226*a*, 226*b* move in spaced relation to and parallel to the non-ferrous, conductive paddle rail such as the elongated bar 210*a*, 210*b* as the paddle trolley 212*a*, 212*b* moves back and forth along the length of the paddle rail 210*a*, 210*b* (and correspondingly, as the paddle 216*a*, 216*b* moves back and forth toward and away from the front end 206*a* of the input receptacle 202).

With respect to input receptacle 702 and FIGS. 7A-7D, according to some embodiments, a damping mechanism or braking mechanism comprises one or more magnets 760 magnets (not shown) positioned within pivot housings 722*a*, 722*b*. According to some such embodiments, the one or more magnets 760 are donut-shaped and the respective first and second paddle rails 710*a*, 710*b* in the form of elongated cylindrical bars pass through central apertures in the donut-shaped magnets 760. According to some embodiments, magnets 760 are permanent magnets. According to some embodiments, the liner bearing(s) of the pivot housings 722*a*, 722*b* constrain the movement of the pivot housings 722*a*, 722*b* and the one or more magnets contained therein so that the one or more magnets maintain a spaced relationship from the shafts 710*a*, 710*b* as the pivot housings 722*a*, 722*b* slide along the shafts 710*a*, 710*b*. According to some embodiments, the pivot housings 722*a*, 722*b* are configured to slide along the shafts 710*a*, 710*b* without the one or more magnets contacting the shafts 710*a*, 710*b*. According to some such embodiments, the first and second paddle rails 710*a*, 710*b* are made of a non-ferrous, conductive material such as, for example, aluminum, copper, or bronze. Such magnetic damping mechanisms have the advantage that as the speed of the paddle 216*a*, 216*b*, 716*a*, 716*b* increases, the damping force also increases; while as the speed of the 216*a*, 216*b*, 716*a*, 716*b* decreases, the damping force decreases. According to some embodiments and within certain speed ranges, some such magnetic damping mechanisms have the advantage that as the speed of the paddle 216*a*, 216*b*, 716*a*, 716*b* increases, the damping force also proportionally increases; while as the speed of the 216*a*, 216*b*, 716*a*, 716*b* decreases, the damping force proportionally decreases. Additionally, according to some embodiments, such magnetic damping mechanisms have the advantage that as the speed of the paddle 216*a*, 216*b*, 716*a*, 716*b* becomes close to zero, the damping force becomes close to zero.

According to some embodiments, when a damping mechanism as described above is incorporated into the input receptacle 202, 702, an average unrestrained, undamped rate of speed of about 70 inches per second or more of the paddle 216*a*, 216*b*, 716*a*, 716*b* traveling to the front end 206*a*, 706*a* of the input receptacle (where the input receptacle is empty) is reduced to an average unrestrained, damped rate of speed of about 33 inches per second. Furthermore, while the unrestrained, undamped speed of the paddle 216*a*, 216*b*, 716*a*, 716*b* tends to quickly accelerate after release, the unrestrained, damped speed of the paddle 216*a*, 216*b*, 716*a*, 716*b* remains relatively constant at about 33 inches per second.

According to some embodiments, the pull-off force of the magnet 260, 760 may vary between, for example, about 1.8 pounds to about 13.6 pounds. According to some embodiments, total pull-off force of the one or more magnets 260, 760 may vary, for example, between about 5.4 pounds (e.g., three magnets 260 each having a pull-off force of 1.8 pounds) to about 81.6 pounds (e.g., six magnets 260 each having a pull-off force of 13.6 pounds). According to some embodiments, one or more magnets 260, 760 are employed having a pull-off force of about or greater than about one (1) pound. According to some embodiments, one or more magnets 260, 760 are employed having a pull-off force of about or greater than about one and a half (1½) pounds.

As described above, according to some embodiments, a spring 240*a*, 240*b*, 740*a*, 740*b* may be configured to cause a paddle 216*a*, 216*b*, 716*a*, 716*b* to impart about three and a half to about four pounds of force on a stack of documents twenty inches deep when the paddle 216*a*, 216*b*, 716*a*, 716*b* is placed behind the stack of the documents. However, as documents in the stack are fed out of the input receptacle 202, 702, the depth of the stack decreases and the paddle 216*a*, 216*b*, 716*a*, 716*b* moves toward the front end 206*a*, 706*a* of the input receptacle 202, 702 and the tension on the spring

240*a*, 240*b*, 740*a*, 740*b* decreases. When the paddle 216*a*, 216*b*, 716*a*, 716*b* is in close proximity to the front end 206*a*, 706*a* and only a few documents remain to be fed out of the input receptacle, the tension spring 240*a*, 240*b*, 740*a*, 740*b* may only cause the paddle 216*a*, 216*b*, 716*a*, 716*b* to impart about a half pound of force on the remaining documents. As mentioned above, the magnetic damping mechanisms have an advantage that when the speed at which the paddle 216*a*, 216*b*, 716*a*, 716*b* moves toward the front end 206*a*, 706*a* of the input receptacle 202, 702 is low, the damping force exerted on the paddle 216*a*, 216*b*, 716*a*, 716*b* is at or close to zero pounds. According to some embodiments, bills or documents in the input receptacle 202, 702 are fed out of the input receptacle at a rate of about 1000-1500 bills or documents per minute, which in turn translates into forward movement of the documents or bills stack on their edges toward the front ends 206*a*, 702*a* of the input receptacle 202, 702 at a rate of about or less than about 1/10 of an inch per second. According to some embodiments, the damping force exerted on the paddle is at or close to zero as a paddle 216*a*, 216*b*, 716*a*, 716*b* abutting against the rear of a stack of documents advances to the front end of the input receptacle, such as at a rate of about or less than about 1/10 inch per second. According to some embodiments, the damping force exerted on the paddle is at or close to zero as a paddle 216*a*, 216*b*, 716*a*, 716*b* abutting against the rear of a stack of documents advances to the front end of the input receptacle, such as at a rate of about or less than about 1/5 inch per second. Accordingly, even when the tension of the spring 240*a*, 240*b*, 740*a*, 740*b* has reduced the forward biasing force of the paddle 216*a*, 216*b*, 716*a*, 716*b* to about a half pound, this is still greater than the damping force; and thus, the paddle 216*a*, 216*b*, 716*a*, 716*b* continues to smoothly and reliably press documents against the front end 206*a*, 706*a* of the input receptacle 202, 702 (and the corresponding feeding mechanism positioned at the front end 206*a*, 706*a*). Thus, the input receptacle continues to facilitate the smooth and reliable feeding of documents out of the input receptacle 202, 702 until no documents remain in the input receptacle. According to some embodiments, when the paddle 216*a*, 216*b*, 716*a*, 716*b* is in close proximity to the front end 206*a*, 706*a* and only a few documents remain to be fed out of the input receptacle, the damping force on the movement of the paddle 216*a*, 216*b*, 716*a*, 716*b* is substantially less than the forward biasing force being applied to the paddle (e.g., by spring 240*a*, 240*b*, 740*a*, 740*b*) while the paddle 216*a*, 216*b*, 716*a*, 716*b* is urging the remaining documents forward.

Figure 21:
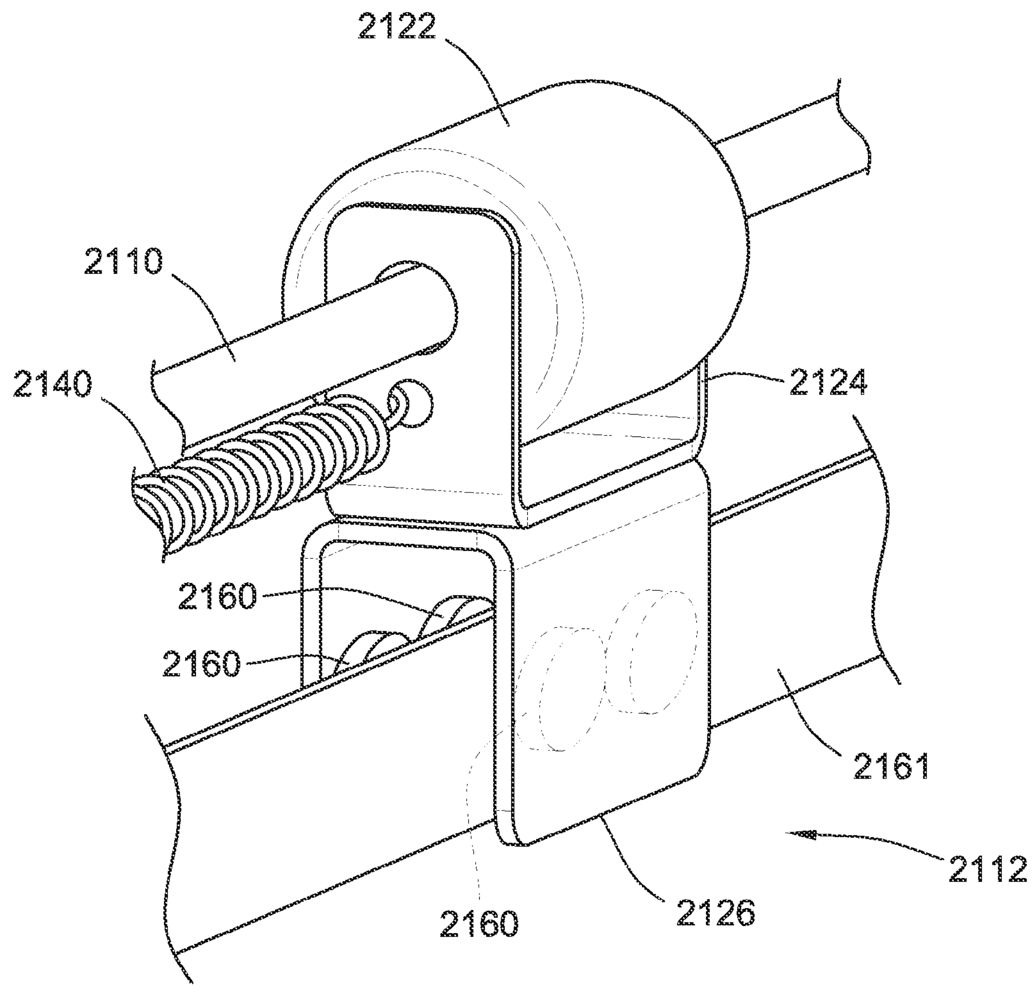
FIG. 21 is a perspective view of a paddle trolley having a damping mechanism according to some embodiments of the present disclosure.

FIG. 21 is a perspective view of a paddle trolley 2112 having a damping mechanism according to some embodiments of the present disclosure. The paddle trolley 2112 is slidably coupled to a paddle rail 2110. A paddle pivot housing 2122 is slidably and pivotally coupled to the paddle rail 2110. A paddle (not shown) is coupled to the paddle pivot housing 2122. A non-ferrous, conductive bar 2161 is positioned parallel to and spaced from the paddle rail 2110. The paddle trolley 2112 comprises a U-shaped plate 2124 slidably coupled to the paddle rail 2110. The paddle trolley 2112 also comprises a U-shaped plate 2126 coupled to the U-shaped plate 2124. One or more magnets 2160 are coupled to an inside face of the U-shaped plate 2126 and are maintained in spaced relation with respect to the non-ferrous, conductive bar 2161 as the paddle trolley 2126 moves along the paddle rail 2110. According to some embodiments, the one or magnets 2160 are permanent magnets. A resilient member 2140 such as a spring is coupled to the paddle trolley 2112 and biases the paddle trolley 2112 and paddle pivot housing 2122 forward toward a front end of an input receptacle. The damping mechanism comprising the one or more magnets 2160 and the non-ferrous, conductive bar 2161 operate in a manner similar to that described above with respect to the one or magnets 260 and the non-ferrous, conductive rail 210*a*, 210*b*. Motion of the magnets 2160 relative to the non-ferrous, conductive bar 2161 induces eddy current forces which resist the relative motion. According to some embodiments, the resistive force is proportional to the speed of the motion. As described above, according to some embodiments, at slow speeds (such as during normal operation of a paddle urging documents within an input receptacle) negligible resistive force is exerted. However, in the case of inadvertent release of a paddle and subsequent unrestrained motion to a paddle coupled to the paddle trolley 2112 (e.g., when the paddle is not engaged in pushing documents in an input receptacle), the speeds are higher and the eddy current braking slows the motion of the paddle as described above.

Figure 22:
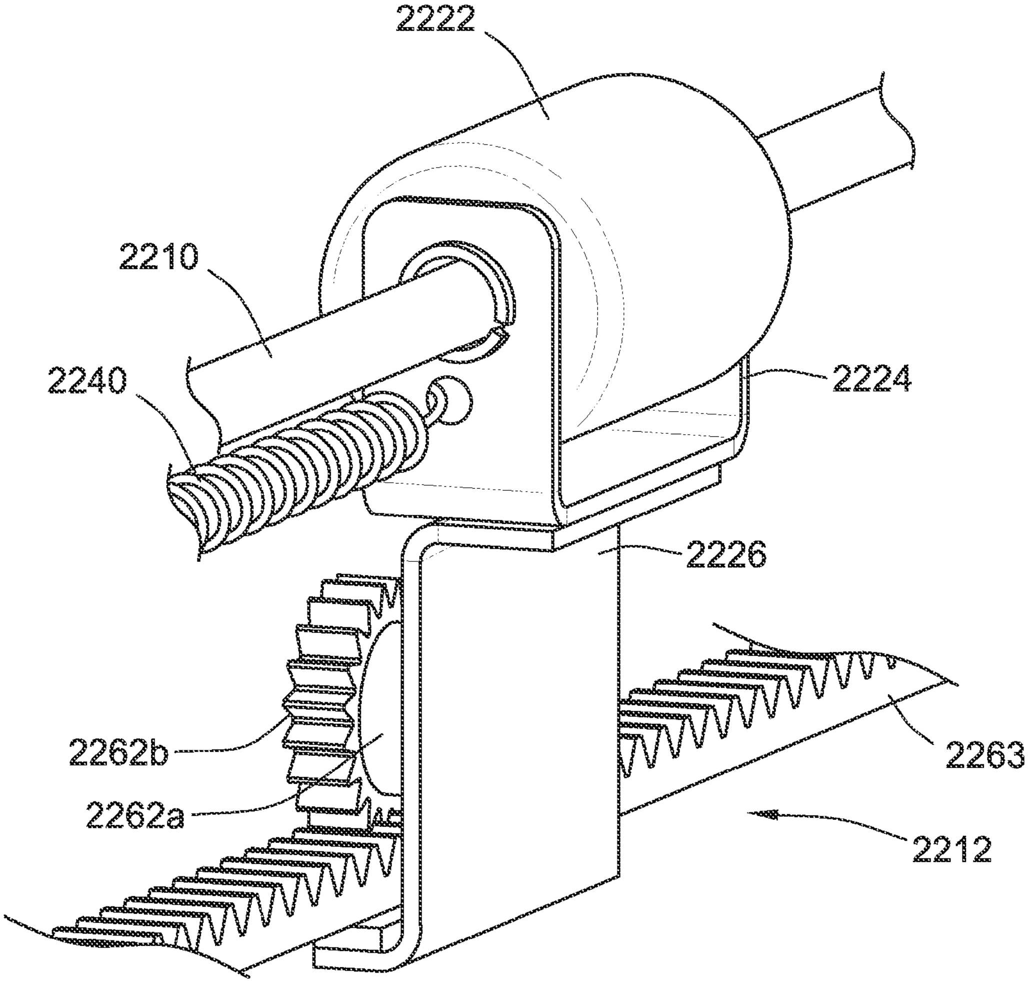
FIG. 22 is a perspective view of a paddle trolley having a damping mechanism according to some embodiments of the present disclosure.

FIG. 22 is a perspective view of a paddle trolley 2212 having a damping mechanism according to some embodiments of the present disclosure. The paddle trolley 2212 is slidably coupled to a paddle rail 2210. A paddle pivot housing 2222 is slidably and pivotally coupled to the paddle rail 2210. A paddle (not shown) is coupled to the paddle pivot housing 2222. The paddle trolley 2212 comprises a U-shaped plate 2224 slidably coupled to the paddle rail 2210. The paddle trolley 2212 also comprises a plate 2226 coupled to the U-shaped plate 2224. A rotary damper 2262*a* having an external gear 2262*b* is coupled to the plate 2226. The gear 2262*b* meshes with a gear rack track 2263. A resilient member 2240 such as a spring is coupled to the paddle trolley 2212 and biases the paddle trolley 2212 and paddle pivot housing 2222 forward toward a front end of an input receptacle. The rotary damper 2262*a* is configured to provide increased damping at higher speeds of motion such as in the case of inadvertent release of a paddle and subsequent unrestrained motion to a paddle coupled to the paddle trolley 2112. At slow speeds (such as during normal operation of a paddle urging documents within an input receptacle) the rotary damper 2262*a* is configured to provide negligible resistive force as described above.

Figure 23:
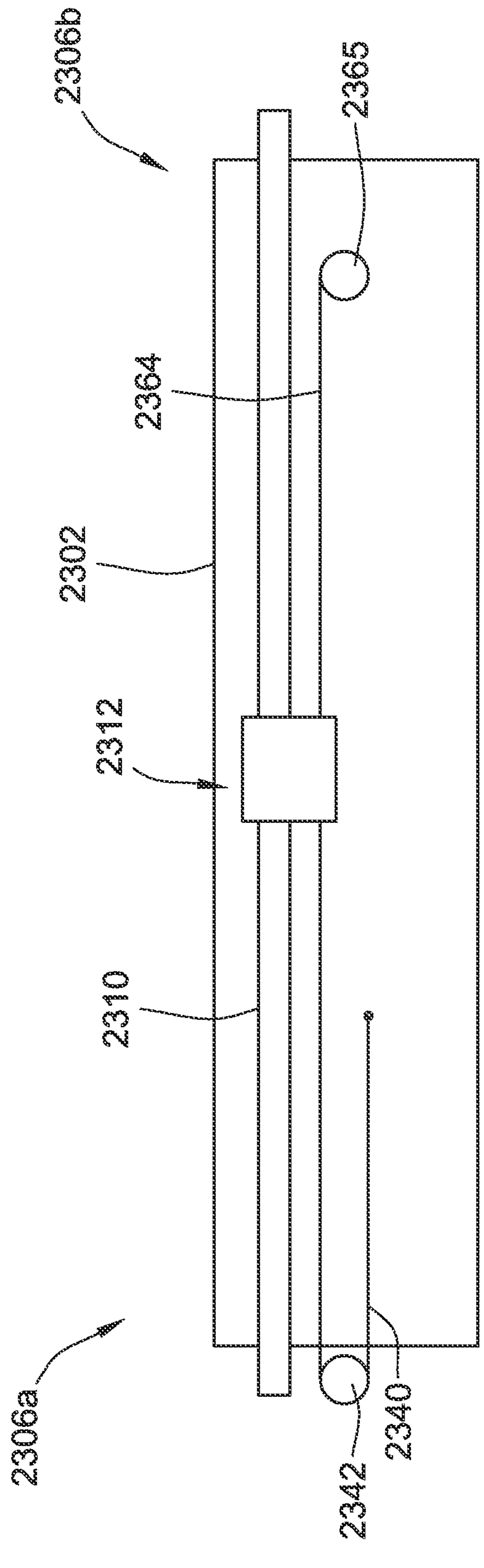
FIG. 23 is a perspective view of a paddle trolley having a damping mechanism according to some embodiments of the present disclosure.

FIG. 23 is a perspective view of a paddle trolley 2312 having a damping mechanism according to some embodiments of the present disclosure. An input receptacle 2302 has a front end 2306*a* and a back end 2306*b*. A paddle trolley 2312 is slidably mounted on a paddle rail 2310. A resilient member 2340 such as a spring is coupled to the paddle trolley 2312 and biases the paddle trolley 2312 forward toward the front end 2306*a* of the input receptacle 2302. The spring 2340 engages a pulley 2342. A cable 2364 is coupled to the paddle trolley 2312 and a rotary damper 2365. The cable 2364 exerts a damping force generated by the damper 2365 on the trolley 2312 in a first direction opposite to a second direction in which the resilient member 2340 biases the paddle trolley 2312. The rotary damper 2365 is configured to provide increased damping at higher speeds of motion such as in the case of inadvertent release of a paddle and subsequent unrestrained motion to a paddle coupled to the paddle trolley 2312. At slow speeds (such as during normal operation of a paddle urging documents within an input receptacle) the rotary damper 2365 is configured to provide negligible resistive force as described above.

Figure 24:
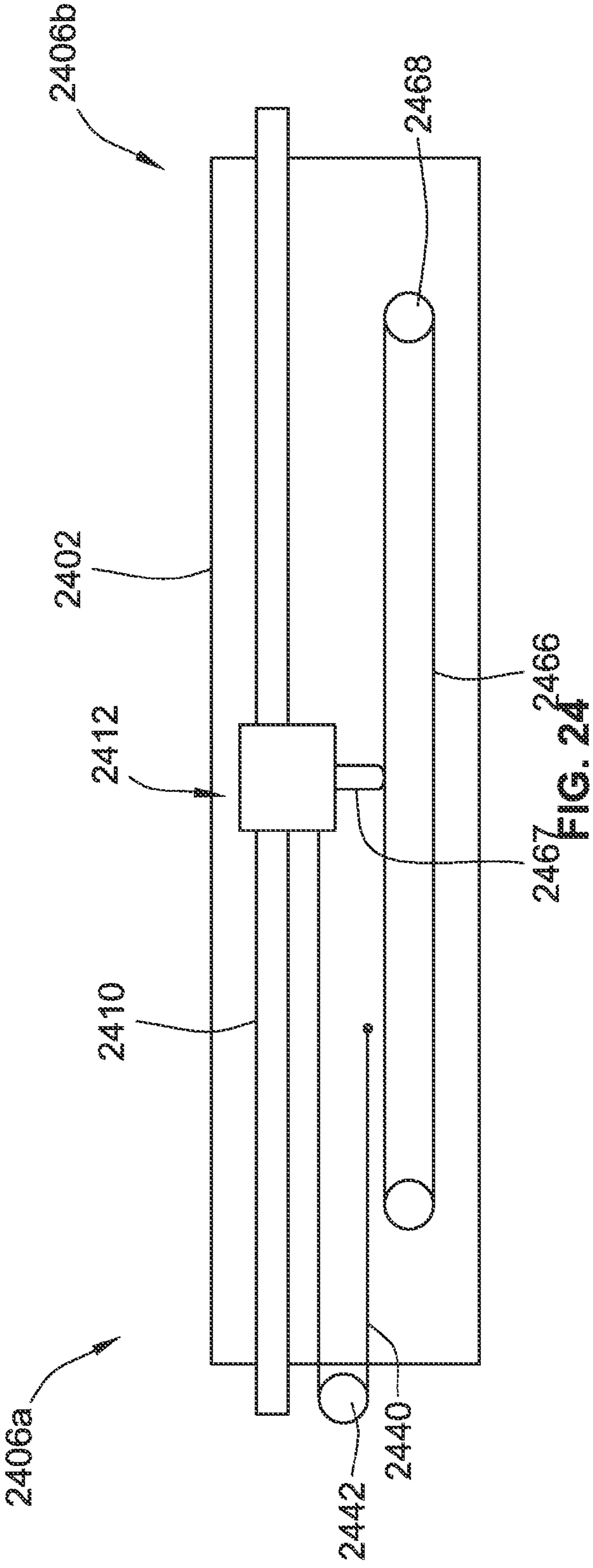
FIG. 24 is a perspective view of a paddle trolley having a damping mechanism according to some embodiments of the present disclosure.

FIG. 24 is a perspective view of a paddle trolley 2412 having a damping mechanism according to some embodiments of the present disclosure. An input receptacle 2402 has a front end 2406*a* and a back end 2406*b*. A paddle trolley 2412 is slidably mounted on a paddle rail 2410. A resilient member 2440 such as a spring is coupled to the paddle trolley 2412 and biases the paddle trolley 2412 forward toward the front end 2406*a* of the input receptacle 2402. The spring 2440 engages a pulley 2442. A cable 2464 is coupled to the paddle trolley 2412 and a rotary damper 2465. The trolley 2412 is coupled to a timing belt 2466 such as via a coupling member 2467 which may be, for example, a screw, bolt, glue, etc. When the trolley 2412 moves it causes the timing belt 2466 to move. The timing belt 2466 engages a rotary damper 2468. The timing belt 2466 exerts a damping force generated by the damper 2465 which resists motion of the trolley 2412. The rotary damper 2468 is configured to provide increased damping at higher speeds of motion such as in the case of inadvertent release of a paddle and subsequent unrestrained motion to a paddle coupled to the paddle trolley 2412. At slow speeds (such as during normal operation of a paddle urging documents within an input receptacle) the rotary damper 2468 is configured to provide negligible resistive force such as described above.

Figure 25:
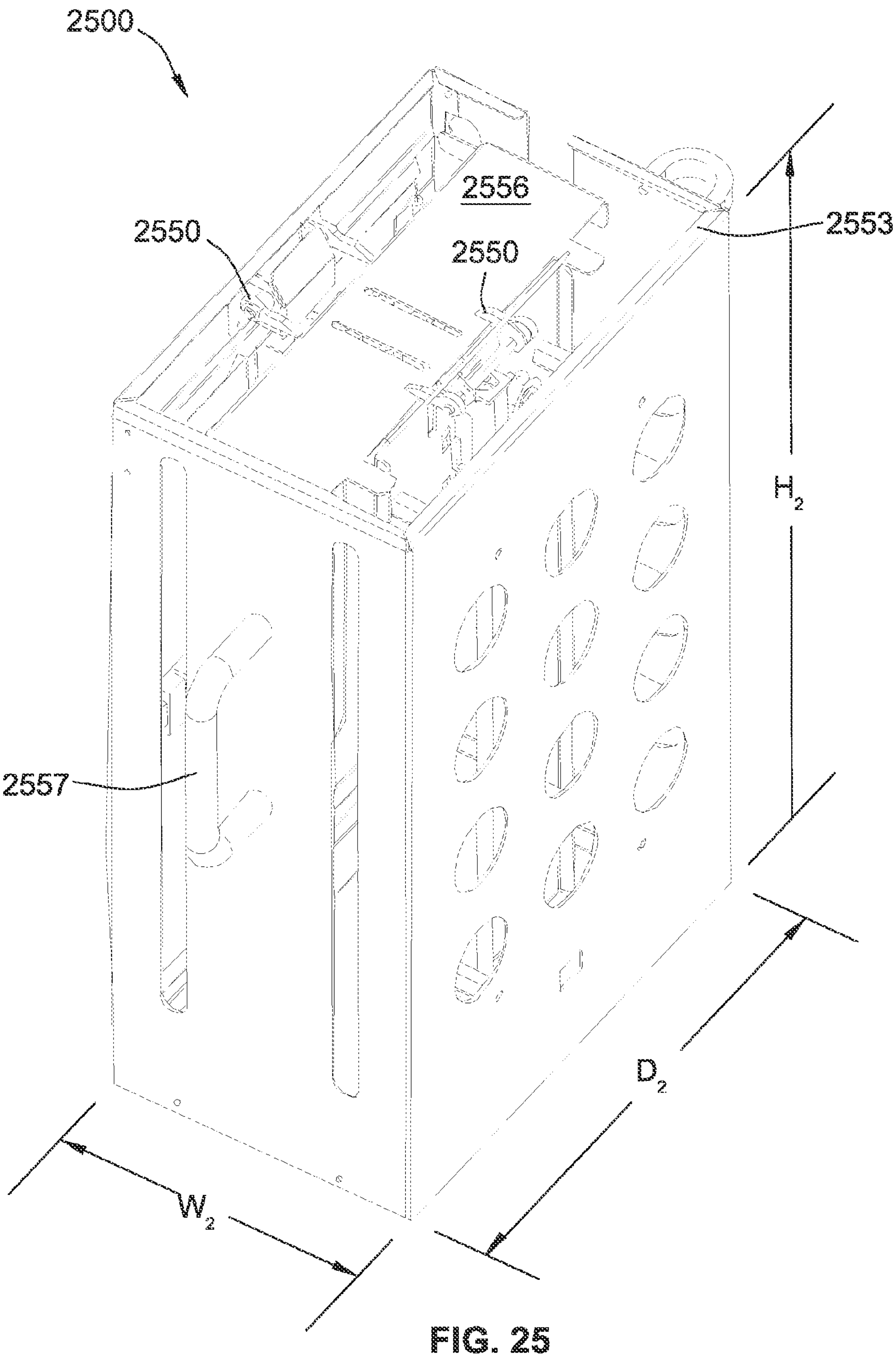
FIG. 25 is a perspective view of a document storage cassette according to some embodiments of the present disclosure.
Figure 26:
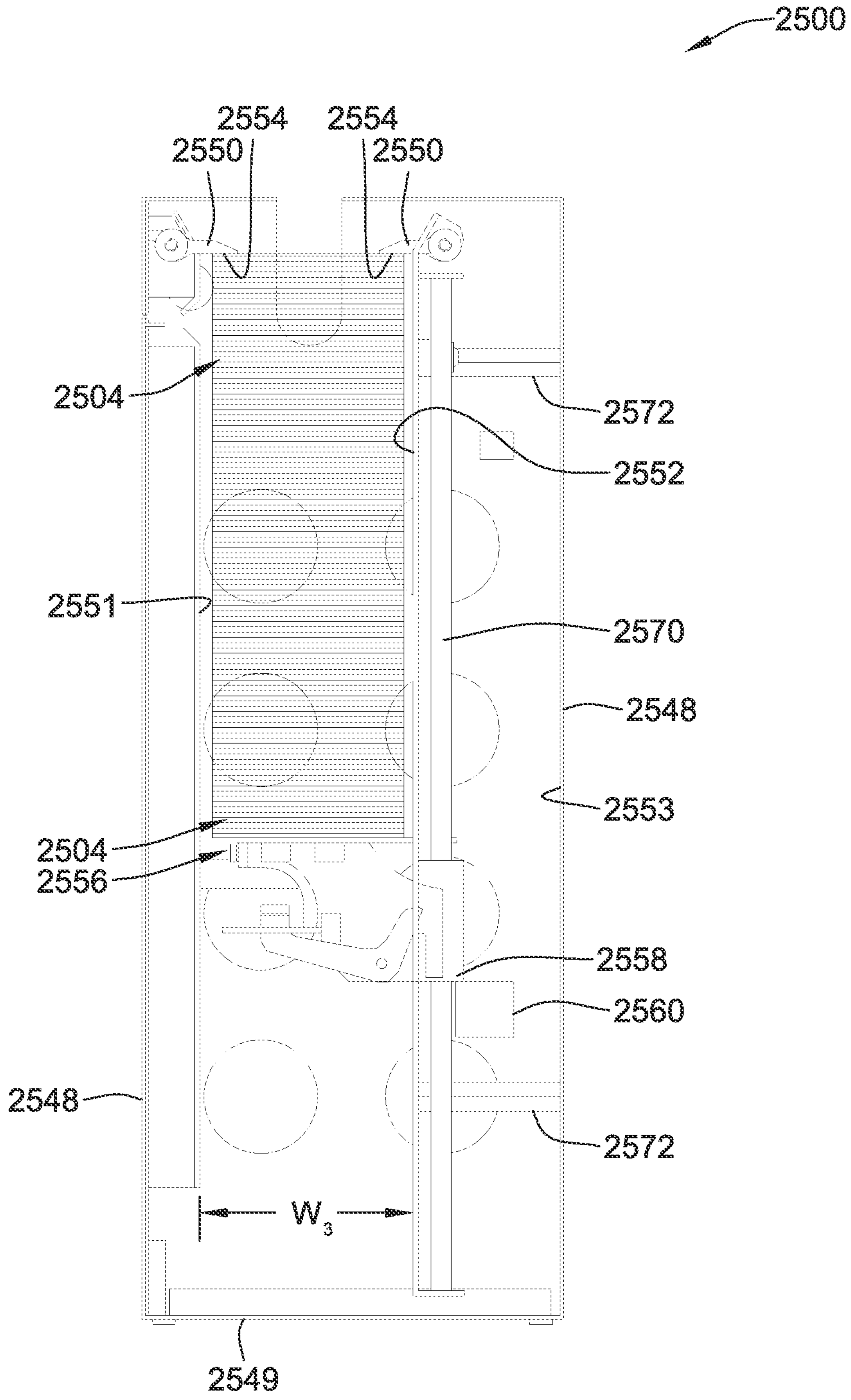
FIG. 26 is a rear, cross-sectional view of the document storage cassette of FIG. 25 according to some embodiments of the present disclosure.

According to some embodiments, the damping mechanisms described above may be employed to damp the motion at which a biased document stacking plate or platform in a document cassette or container moves, such as, for example, document or currency bill containers for use in various kinds of currency and/or document handling and processing devices for processing currency bills and/or other financial documents such as, for example, note counters, currency bill denominating devices, document imaging devices, currency bill and/or document strapping devices, automatic teller machines (ATMs), merchant teller machines (MTs), recycler devices (RCs), Personal Teller Machines (PTMs), Automated Employee Bank Machines (AEBMs), Employee Safes (ESs), and Cashier Balancing Machines (CBMs), and other devices. FIG. 25 is a perspective view and FIG. 26 is a rear, cross-sectional view of an exemplary document storage cassette 2500. Examples of such cassettes 2500 can also be seen in FIG. 1 in operational positions in output receptacles 106*c*-106*h*. Such cassettes 2500 and their use and operation are described in U.S. Pat. No. 7,650,980, which is hereby incorporated by reference herein in its entirety.

Documents 2504 such as, for example, currency bills and/or other documents described herein are stored within a cassette housing 2548 which has a base 2549. According to some embodiments, each storage cassette 2500 contains two pairs of retaining tabs 2550 positioned adjacent to interior walls 2551, 2552 of the storage cassette. The lower surface 2554 of each tab 2550 is substantially planar. The tabs 2550 are hingedly connected to the storage cassette 2500 enabling the tabs 2550 to downwardly rotate from a horizontal position, substantially perpendicular with the interior walls 2551, 2552 of the cassette 2500, to a vertical position, substantially parallel to the interior walls 2551, 2552 of the cassette 2500. The tabs 2550 are coupled to springs (not shown) to maintain the tabs in the horizontal position.

The storage cassette 2500 contains a slidable platform 2556 which is biased upward. During operation of, for example, device 100 (FIG. 1), the platform 2556 receives stacks of documents 2504. The platform 2556 is attached to a base 2558 which is slidably mounted to a vertical support member 2570. The base 2558 is spring-loaded so that it is biased upward and in turn biases the platform 2556 upward. According to some embodiments, the storage cassettes 2500 are designed to be interchangeable so that once full, a storage cassette can be easily removed from the device 100 (FIG. 1) and replaced with an empty storage cassette 2500. In the illustrated embodiment, the storage cassette 2500 is equipped with a handle 2557 in order to expedite removal and/or replacement of the storage cassettes 2500. Also in the illustrated embodiment, the storage cassette 2500 has a door (shown in U.S. Pat. No. 7,650,980), which enables an operator to remove bills from the storage cassette 2500.

According to some embodiments, the storage cassettes 2500 are dimensioned to accommodate documents of varying sizes. In the illustrated embodiment, the storage cassettes 2500 has a height, $H_2$, (FIG. 25) of approximately 15.38 inches (39 cm), a depth, $D_2$, (FIG. 25) of approximately 9 inches (22.9 cm), and a width, $W_2$, (FIG. 25) of approximately 5.66 inches (14.4 cm). The storage cassette illustrated in FIG. 26 has stand-offs 2572 to set interior wall 2552 off a fixed distance from an interior wall 2553 of the cassette housing 2548. The interior walls 2551, 2552 aid in aligning the documents 2504 such as currency bills in a stack within the storage cassettes 2500. The embodiment of the storage cassette illustrated in FIG. 26 is sized to accommodate United States currency bills. To properly accommodate United States currency bills, the interior width of the storage cassette, $W_3$, (FIG. 26) is approximately 2.88 inches. In alternative embodiments, the length of the stand-offs 2572 can be varied to accommodate documents of varying sizes. In order to accommodate large documents and increase the interior width, $W_3$, (FIG. 26) of the storage cassette 2500, the lengths of stand-offs 2572, illustrated in FIG. 26, is shortened.

According to some embodiments, as shown in FIG. 26, a damping mechanism 2560 is operatively coupled to the slidable platform 2556 such as, for example, by being operatively coupled to the base 2558. The damping mechanism 2560 can take the form of, for example, any of the damping mechanisms described above and operates in the same, or similar, manner to regulate the unrestrained movement of the platform 2556. For example, magnets may be coupled to the base 2558 in spaced relation to vertical support member 2570 which is made of a ferrous, conductive material such as described above. As another example, a rotary damper may be coupled to the base 2558.

According to some embodiments, especially those having only a single paddle assembly 214*a*, 714*a*, the paddle assembly 214*a*, 714*a* is not designed to pivot upward but merely slide forward and backward along the first paddle rail 210*a*, 710*a*.

According to some embodiments, the receptacle 202, 702 and the feeder mechanism are adapted to accommodate bills or documents ranging in size from, for example, about 4.39 inches long by about 2.40 inches wide to, for example, about 7.17 inches long by about 3.82 inches wide.

VI. Loading Trays

Generally referring to FIGS. 8A-9B, a tray 800 or document loading tray is shown with a first plurality of documents 850 therein. The documents 850 can be any type of document such as, for example, U.S. currency bills, checks, header cards, trailer cards, deposit slips, etc. The tray 800 has a bottom 810, two opposing lateral sides 820*a,b*, and a front side 830*a* and an opposing back side 830*b*. The front side 830*a* and the back side 830*b* are generally perpendicular to the two opposing lateral sides 820*a,b*.

According to some embodiments, the lateral sides 820*a,b* are spaced apart from one another such that the documents 850 can fit therebetween with a wide edge of the documents 850 resting against the bottom 810 of the tray 800. According to some embodiments, the lateral sides 820*a,b* are between about five inches and ten inches apart. According to some embodiments, the lateral sides 820*a,b* are between about five and a half inches and about seven inches apart. According to some embodiments, the lateral sides 820*a,b* are about six and a half inches apart.

The front and the back sides 830*a,b* are spaced apart from one another such that a stack of documents between about 100 documents and three thousand documents can fit therebetween with a wide edge of the stack of documents resting against the bottom 810 of the tray 800. According to some embodiments, the front and the back sides 830*a,b* are between about two inches and about thirty inches apart from one another. According to some embodiments, the front and the back sides 830*a,b* are between about five inches and about twenty-five inches apart from one another. According to some embodiments, the front and the back sides 830*a,b* are about twenty inches apart from one another.

According to some embodiments, each of the front and the back sides 830*a,b* includes a built-in handle 835*a,b*. The handles 835*a,b* can be formed as an aperture in the front and the back sides 830*a,b*. The handles 835*a,b* assist an operator of, for example, the device 100 in transporting the tray 800 containing documents from a document preparation room or location to a room or location wherein the device 100 is located. According to some embodiments, multiple trays 800 are preloaded with documents in a first room in, for example, a financial institution, and then physically transported to a second room for processing using one or more devices (e.g., device 100). According to some embodiments, the trays 800 are nestable and/or stackable. That is, a second tray (not shown) can be stacked on top of the tray 800 such that a bottom of the second tray is positioned above the documents 850 in the tray 800 without resting thereon. In some such embodiments, the front and the back sides 830*a,b* of the tray 800 can be designed to support the bottom of another similar or identical tray.

Figure 8A:
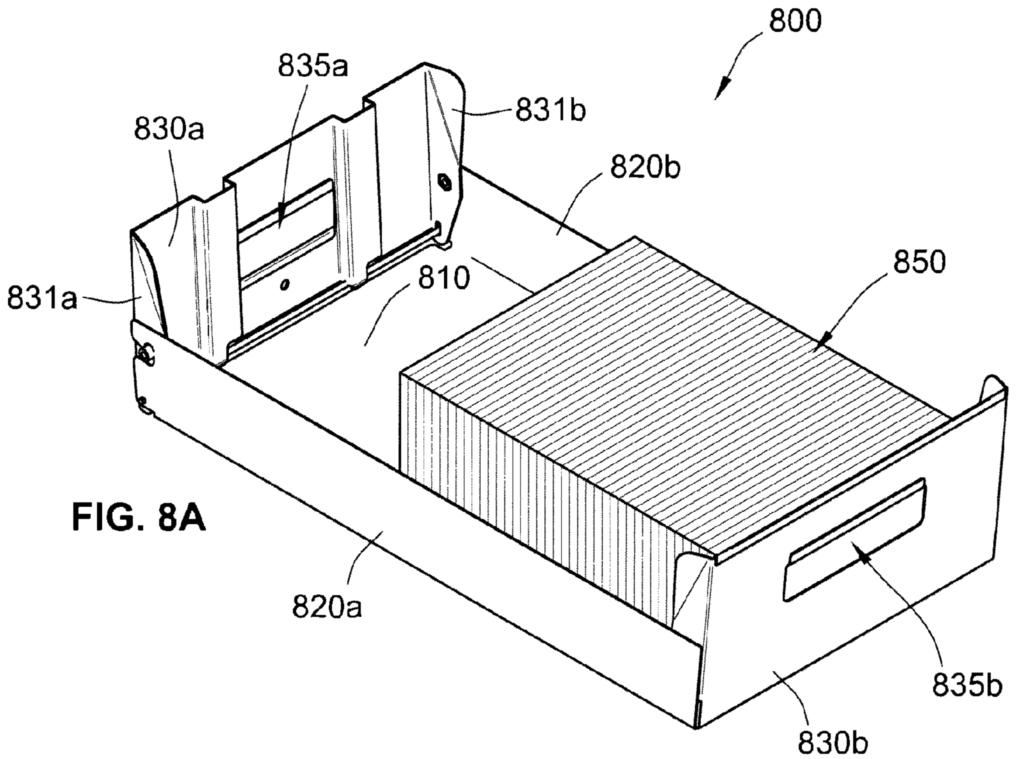
FIG. 8A is a top, front perspective view of a loading tray having a movable gate positioned in an up or closed position according to some embodiments of the present disclosure.
Figure 8B:
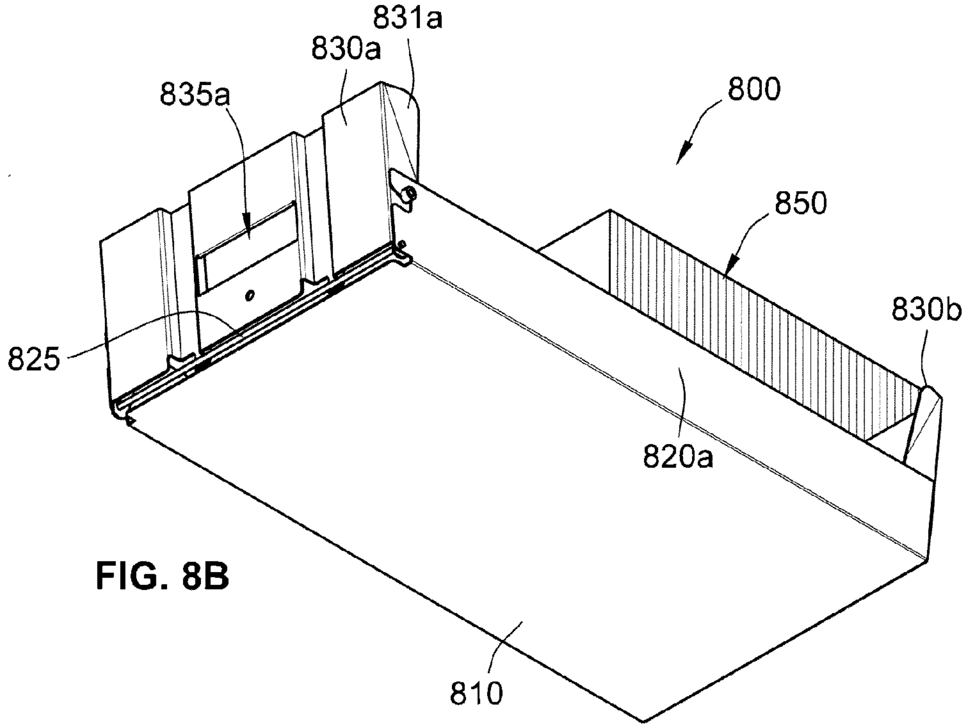
FIG. 8B is a bottom, front perspective view of the loading tray of FIG. 8A.

As best shown in FIGS. 8B and 9B, according to some embodiments, the front side 830*a* of the tray 800 is pivotally coupled to the first and the second lateral sides 820*a,b* of the tray 800 via a pin 825. According to some embodiments, the front side 830*a* of the tray 800 is pivotally coupled to the rest of the tray 800 (e.g., the front side 830*a* is coupled via the pin 825 to the lateral sides 820*a,b*, the front side 830*a* is coupled to the bottom 810 of the tray via a hinge, etc.). As such, the front side 830*a* of the tray 800 is selectively moveable (e.g., manually by an operator) between a closed position (shown in FIGS. 8A and 8B) and an open position (shown in FIGS. 9A and 9B). As such, when the front side 830*a* is in the open position (FIGS. 9A and 9B), the documents 850 therein can be slid out of the tray along the bottom 810 and over the front side 830*a* in the direction of arrow A (FIG. 9A), also referred to as a feed direction (e.g., the direction that the documents 850 are feed), as described herein without having to manually grab and lift the documents 850 out of the tray 800.

According to some embodiments, the lateral sides 820*a,b* of the tray 800 include notches 822*a,b*, respectively, which are sized and shaped to receive corresponding rollers 832*a,b* coupled to respective flanges 831*a,b* of the front side 830*a* of the tray 800. According to some embodiments, the rollers 832*a,b* are coupled to the respective flanges 831*a,b* of the front side 830*a* of the tray 800 such that each of the rollers 832*a,b* is rotatable about a central axis of the roller 832*a,b*. As the front side 830*a* is moved from the open position (FIGS. 9A and 9B) and into the closed position (FIGS. 8A and 8B), the rollers 832*a,b* engage the notches 822*a,b* and snap into place therein, thereby releasably holding the front side 830*a* in the closed position (FIGS. 8A and 8B).

The tray 800 can be used to load documents 850 into an input receptacle of a currency or document handling or processing device such as input receptacles 202, 702 described herein. As such, the tray 800 is sized and shaped to fit into at least a portion of the input receptacle into which it is to be inserted such as, for example, input receptacle 202, 702. According to some embodiments, the tray 800 is positioned within the input receptacle 202 by an operator such that the tray 800 is received in the input receptacle 202 with the two opposing lateral sides 820*a,b* of the tray 800 being generally parallel with the two opposing sides 204*a,b* of the input receptacle 202.

Although the some of the trays are illustrated in FIGS. 8A-19 as being partially full with documents, according to some embodiments, a tray 800 is full when loaded into an input receptacle as will be described below. Likewise, although the some of the trays are illustrated in FIGS. 8A-19 as being partially full with documents with a space existing between the front side 830*a* of the tray 800 and the documents 850, according to some embodiments, a tray which is partially loaded with documents when loaded into an input receptacle has the documents 850 loaded therein such that the documents are positioned forward in the tray 800 with a front one of the documents abutting the front side 830*a* of the tray 800 and any extra space being located near the back side 830*b* of the tray 800. According to some embodiments, the tray 800 has an adjustable support plate (not shown) which may be positioned behind a rearmost document in a stack of documents in the tray 800 to maintain the documents in the stack forward in the tray so that the front most document abuts the front side 830*a* of the tray and thereby maintain the documents in an orderly manner on their edges.

Figure 10:
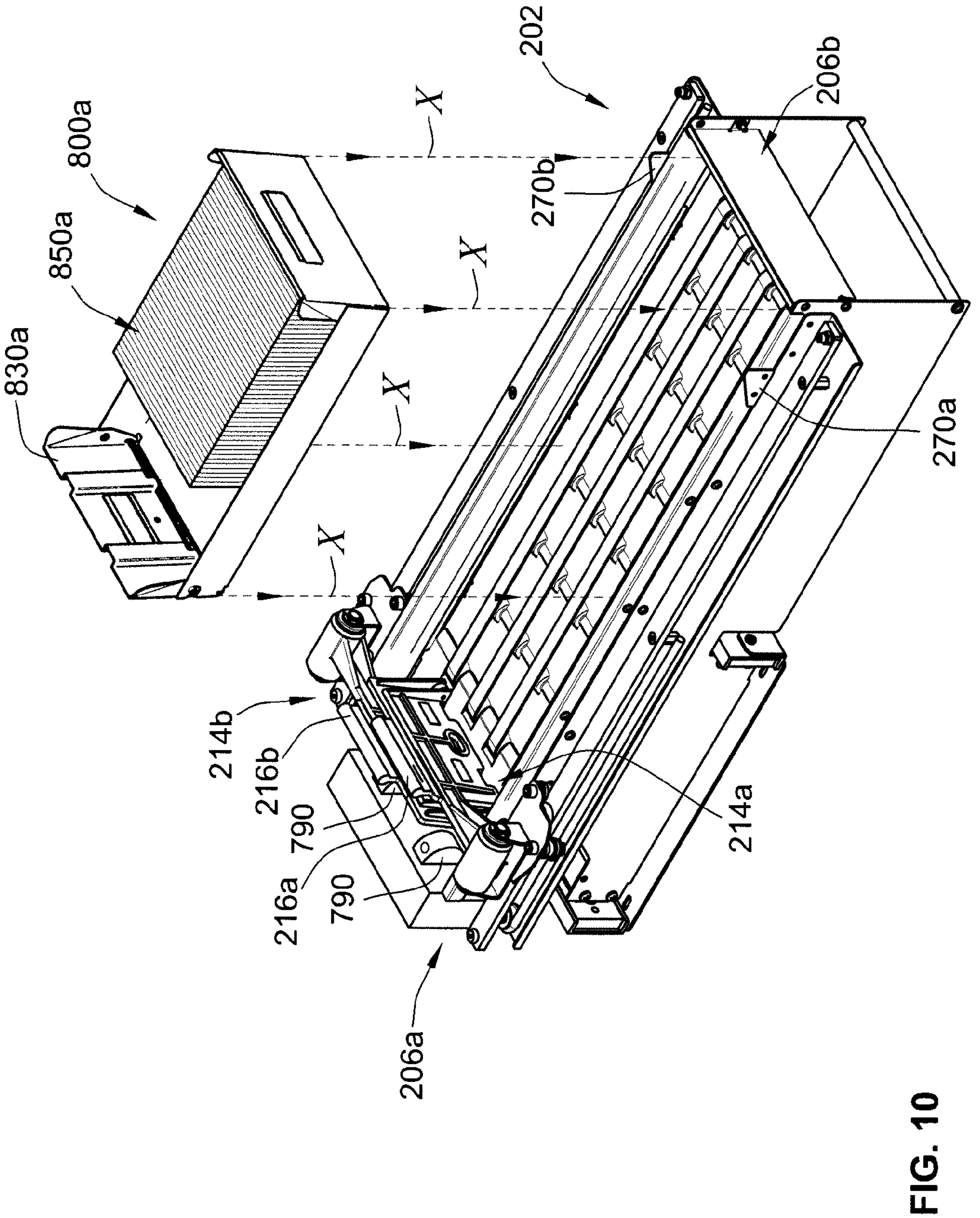
FIG. 10 is perspective view of a first loading tray positioned adjacent to an input receptacle according to some embodiments of the present disclosure.

Referring generally to FIGS. 10-19, a method of loading the input receptacle 202 with documents using several trays 800 begins with a first tray 800*a* with a first stack of a plurality of documents 850*a* preloaded therein being placed into the input receptacle 202 between the front and the back ends 206*a,b* of the input receptacle 202 as shown in FIG. 10. According to some embodiments, the first tray 800*a* is loaded into the input receptacle 202 generally in a vertical direction as illustrated by arrows X. As shown in FIG. 10, according to some embodiments, during the loading of the first tray 800*a*, both of the paddles 216*a*, 216*b* can be in their operational positions near the front end 206*a* of the input receptacle 202 so as to not interfere with the loading of the first tray 800*a* into the input receptacle 202. Alternatively, according to some embodiments, during the loading of the first tray 800*a*, one or both of the paddles 216*a*, 216*b* can be placed into their downward, operational positions or their upright positions (see e.g., the second paddle 216*b* shown in FIG. 11) so as to not interfere with the loading of the first tray 800*a* into the input receptacle 202.

Figure 11:
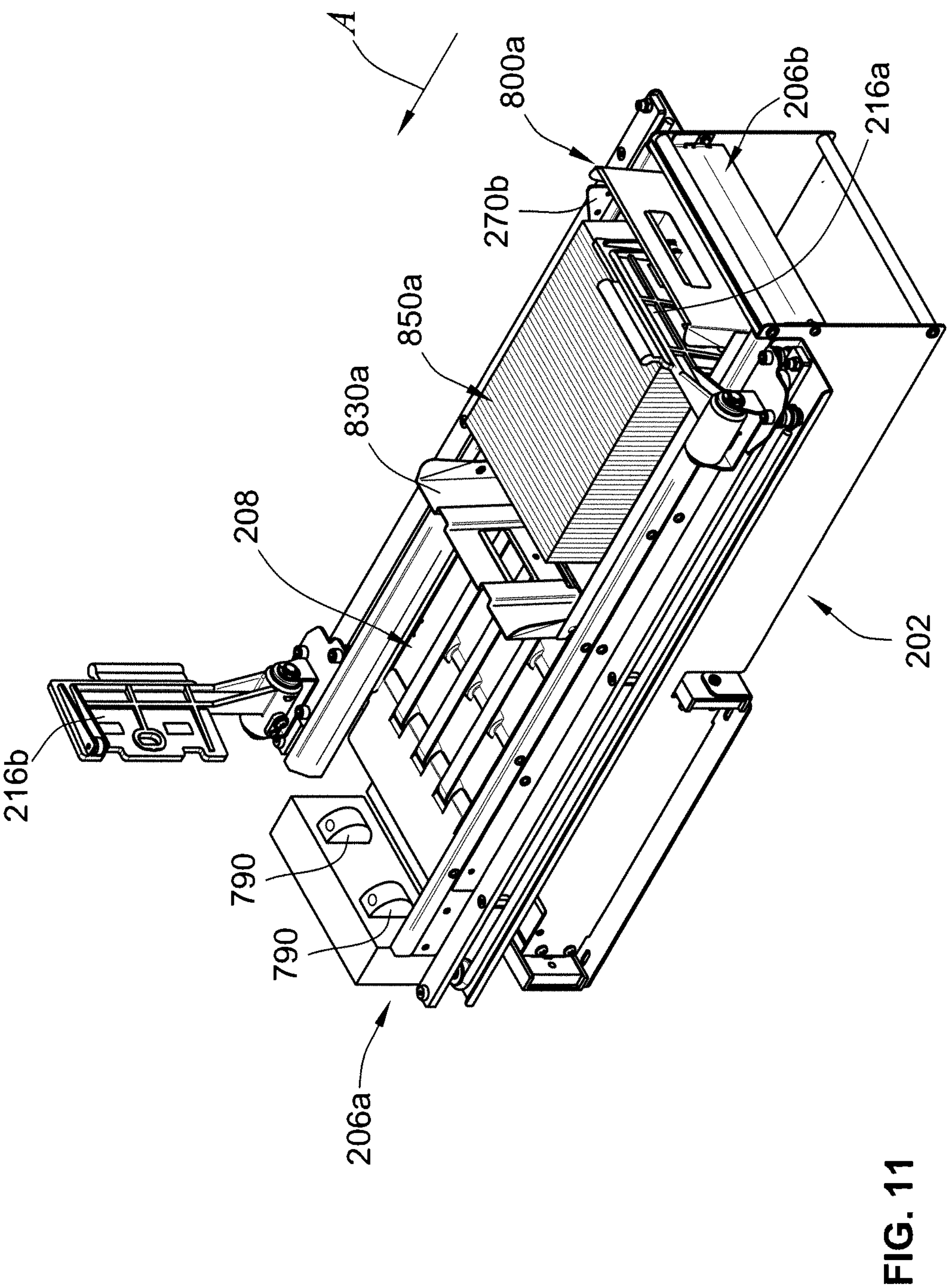
FIG. 11 is a perspective view of a first loading tray positioned within an input receptacle having a movable gate positioned in an up or closed position according to some embodiments of the present disclosure.

After the first tray 800*a* is positioned within the input receptacle 202, at least the first paddle 216*a* is manually retracted by an operator toward the back end 206*b* of the input receptacle 202 and rotated into its downward, operational position as shown in FIG. 11. As described above, the force exerted by, for example, the hands of the operator overcomes the biasing force applied by the spring 240*a* allowing the operator to move the first paddle 216*a* toward the back end 206*b* of the input receptacle 202. According to some embodiments, the input receptacle 202 is provided with a rigid and/or releasable latch 270*a* (best shown in FIG. 10) for locking and/or holding the first paddle 216*a* in the position adjacent the back end 206*b* of the input receptacle 202 shown in FIG. 11.

In the embodiments including the latch 270*a*, the operator can release the latch 270*a* such that the first paddle 216*a* is biased (e.g., via the spring 240*a*) against a last one of the first documents 850*a* closest to the second end 830*b* of the first tray 800*a*. The first paddle 216*a* then engages and pushes the first documents 850*a* along the bottom 810 of the first tray

800*a* towards the front side 830*a* of the first tray 800*a* in the direction of arrow A (FIG. 11).

Figure 12:
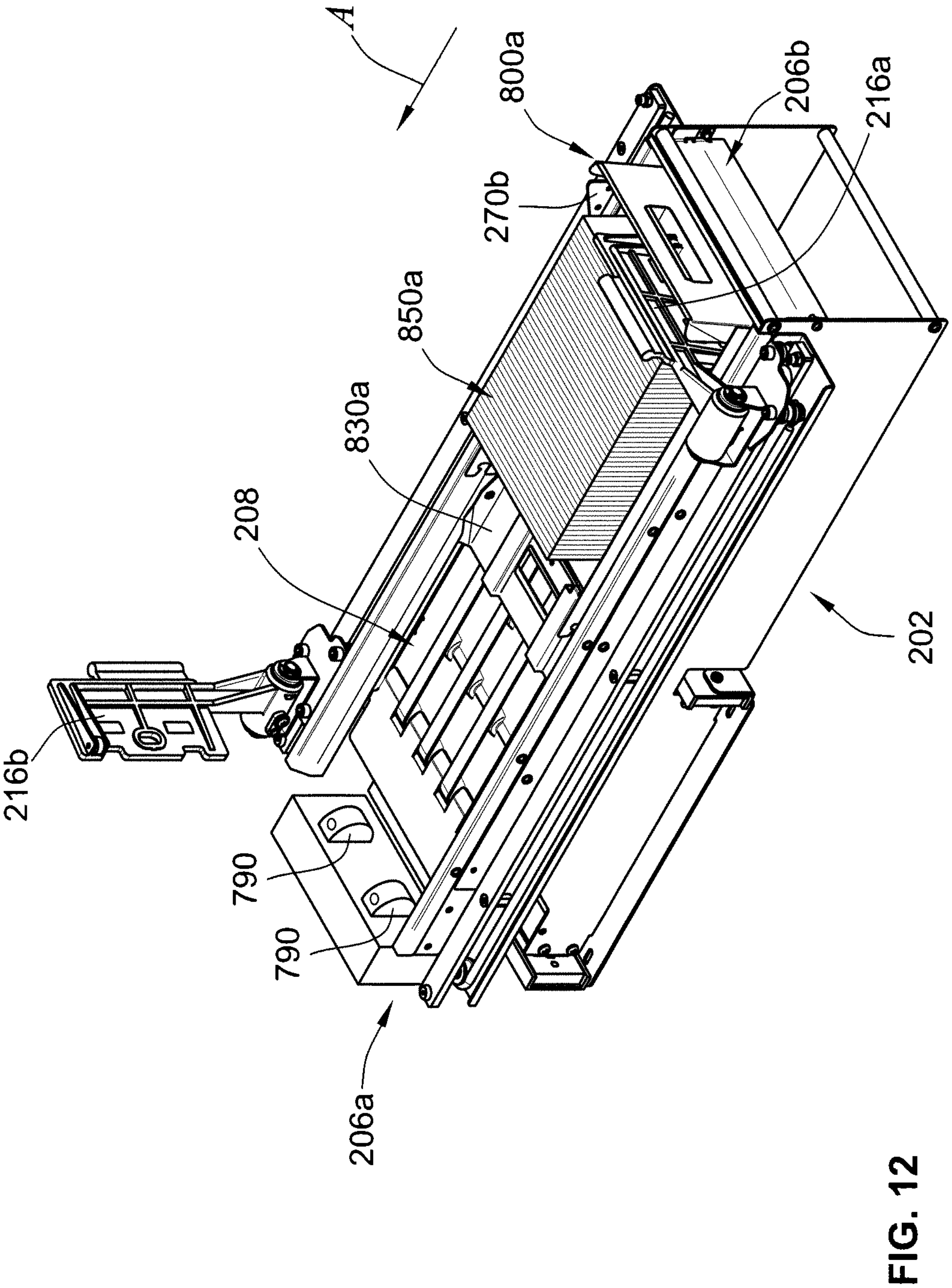
FIG. 12 is a perspective view the first loading tray of FIG. 11 with the movable gate positioned in a down or open position according to some embodiments of the present disclosure.
Figure 13:
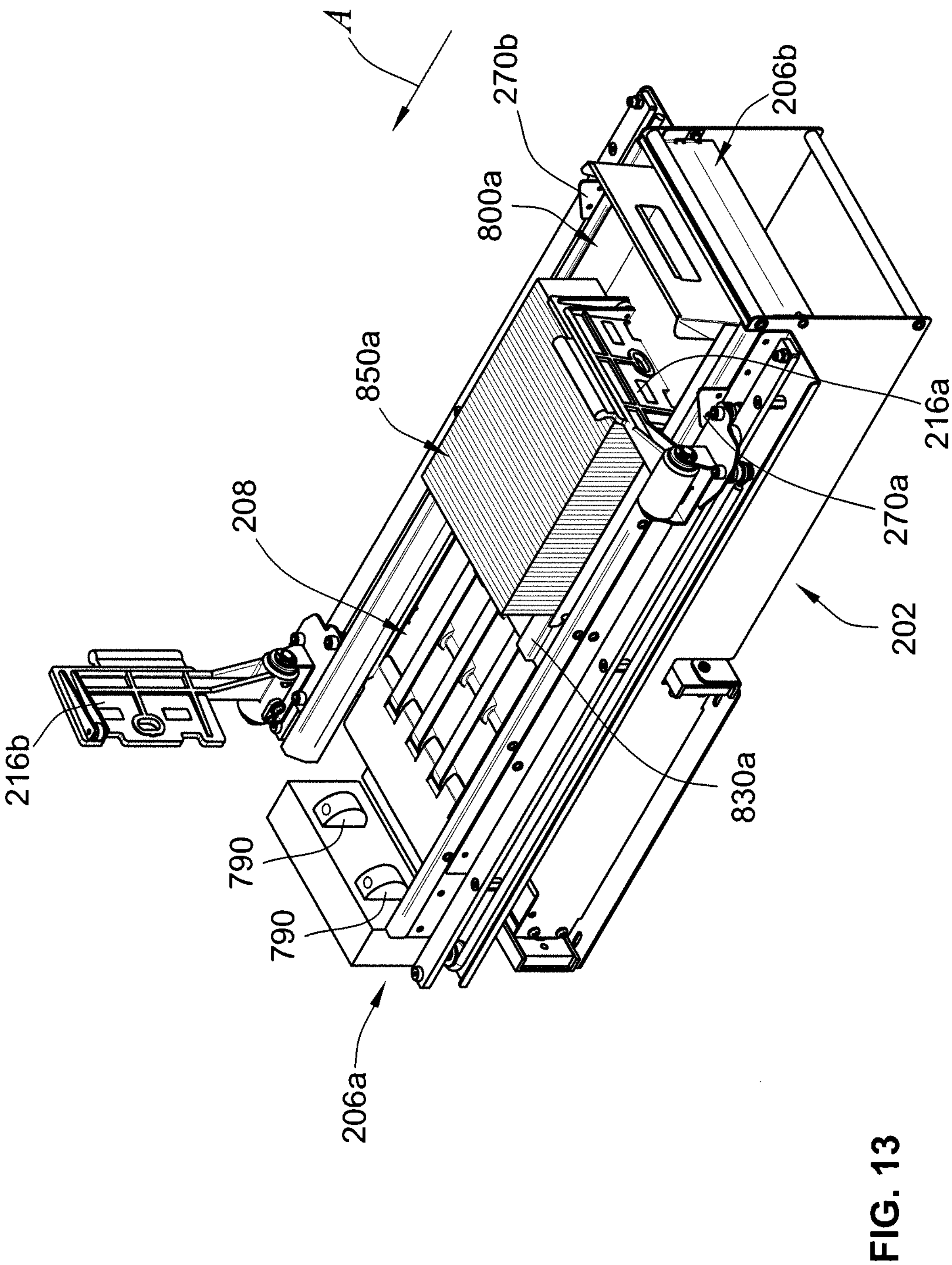
FIG. 13 is another perspective view the first loading tray of FIG. 11 with the movable gate positioned in the down or open position according to some embodiments of the present disclosure.

The operator can then move the front side 830*a* of the first tray 800*a* from the closed position (FIG. 11) into the open position (FIG. 12). As such, the first documents 850*a* are free to slide (e.g., the front side 830*a* no longer impedes movement of the first documents 850*a* in the direction of arrow A), under the force of the first paddle 216*a*, initially along the bottom 810 of the first tray 800*a* (as shown in FIG. 12), then along the front side 830*a* of the first tray 800*a* (as shown in FIG. 13), and then along the floor 208 of the input receptacle 202 towards the front end 206*a* of the input receptacle 202 in the direction of arrow A (as shown in FIG. 14), until a first one of the first documents 850*a* reaches and engages the pair of stripper wheels 790 (shown in FIG. 14).

According to some embodiments, after the front side 830*a* of the first tray 800*a* is moved into its open position (FIG. 12), an operator can aid in preventing the first documents 850*a* from falling over using the operator's hand(s) to help guide the first documents 850*a* towards the pair of stripper wheels 790. According to some embodiments, the first tray 800*a* can be inserted into the input receptacle 202 at a position relatively closer to the pair of stripper wheels 790 than the position shown in FIG. 11. As such, when the front side 830*a* is moved into its open position (FIGS. 9A and 9B), the first documents 850 have a relatively shorter distance to travel to reach the pair of stripper wheels 790, and thus, are less likely to fall over.

Figure 14:
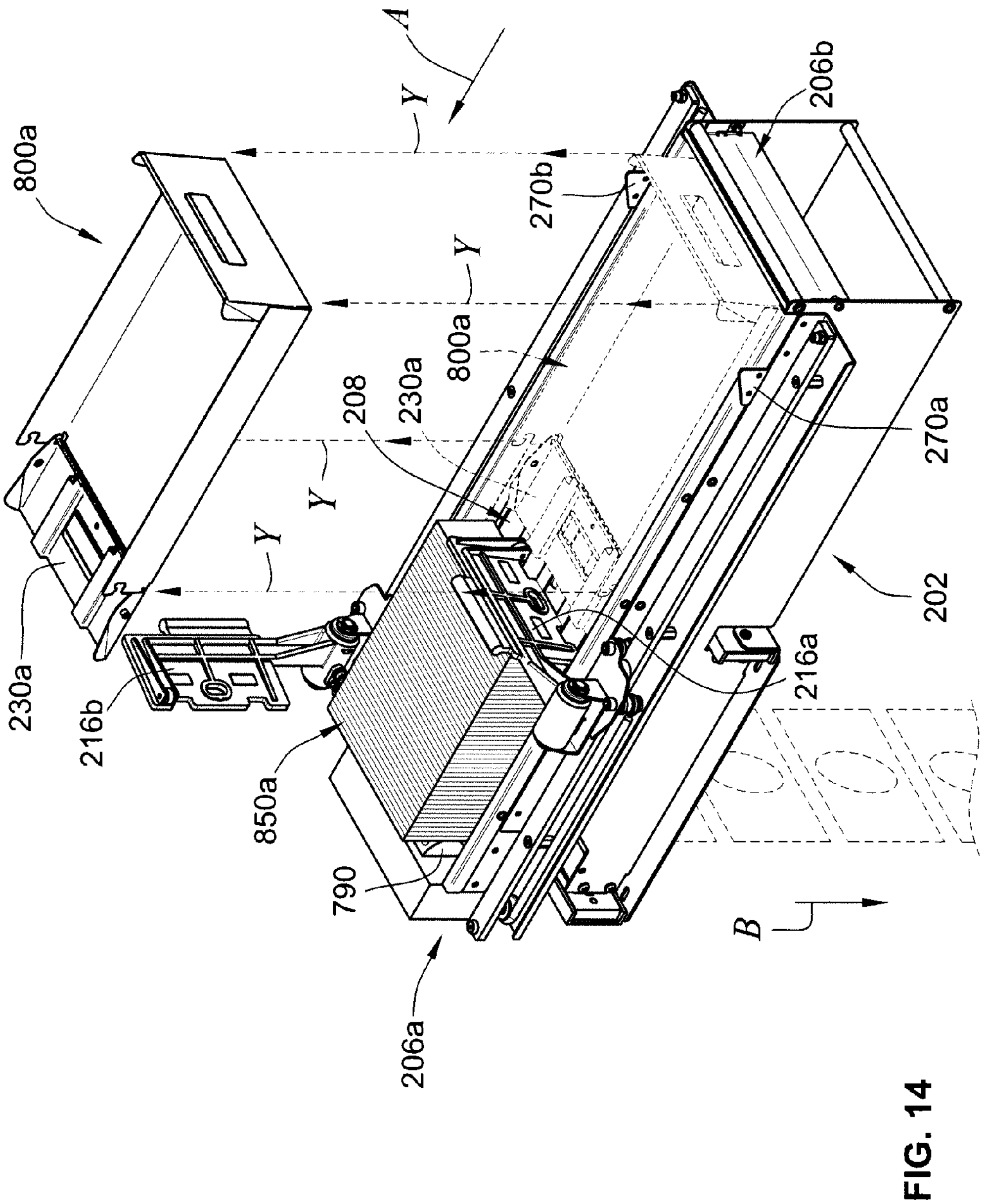
FIG. 14 is perspective view of an empty first loading tray which has been removed from an input receptacle according to some embodiments of the present disclosure.

After the first documents 850*a* reach the pair of stripper wheels 790 as shown in FIG. 14, the first paddle 216*a* holds the first documents 850*a* so that they remain stacked upright upon the edges of the first documents 850*a* and pressed into engagement with the front end 206*a* of the input receptacle 202 at which a feeder mechanism may be located such as, for example, the pair of stripper wheels 790. According to some embodiments, in response to the first documents 850*a* engaging the pair of stripper wheels 790, the pair of stripper wheels 790 automatically start rotate, thereby removing the first documents 850*a*, one at a time, from the input receptacle 202 in the direction of arrow B (FIG. 14) and into, for example, the transport mechanism 104 of the device 100 as described elsewhere herein.

According to some embodiments, after or while the front side 830*a* of the first tray 800*a* is moved into its open position (FIG. 12), an operator can aid in preventing the first documents 850*a* from falling over and in moving the stack of documents into engagement with the front end 206*a* of the input receptacle 202 by placing one hand in front of the foremost document (the document closest to the front end 206*a*) and the other hand behind the first paddle 216*a* that is engaging the rearmost document in the stack and help move the entire stack in a feed direction until the foremost document abuts the front ends 206*a* of the input receptacle 202 while the first paddle 216*a* presses on the rearmost document, thus maintaining the entire stack of documents in an upright manner on the edges of the documents. According to some embodiments, after the front side 830*a* of the first tray 800*a* is moved into its open position (FIG. 12), an operator can aid in preventing the first documents 850*a* from falling over and in moving the stack of documents into engagement with the front end 206*a* of the input receptacle 202 by placing one hand in front of the foremost document (the document closest to the front end 206*a*) while the first paddle 216*a* that is engaging the rearmost document in the stack moves the entire stack in a feed direction until the foremost document abuts the front ends 206*a* of the input receptacle 202 while the first paddle 216*a* presses on the rearmost document, thus maintaining the entire stack of documents in an upright manner on the edges of the documents.

Figure 15:
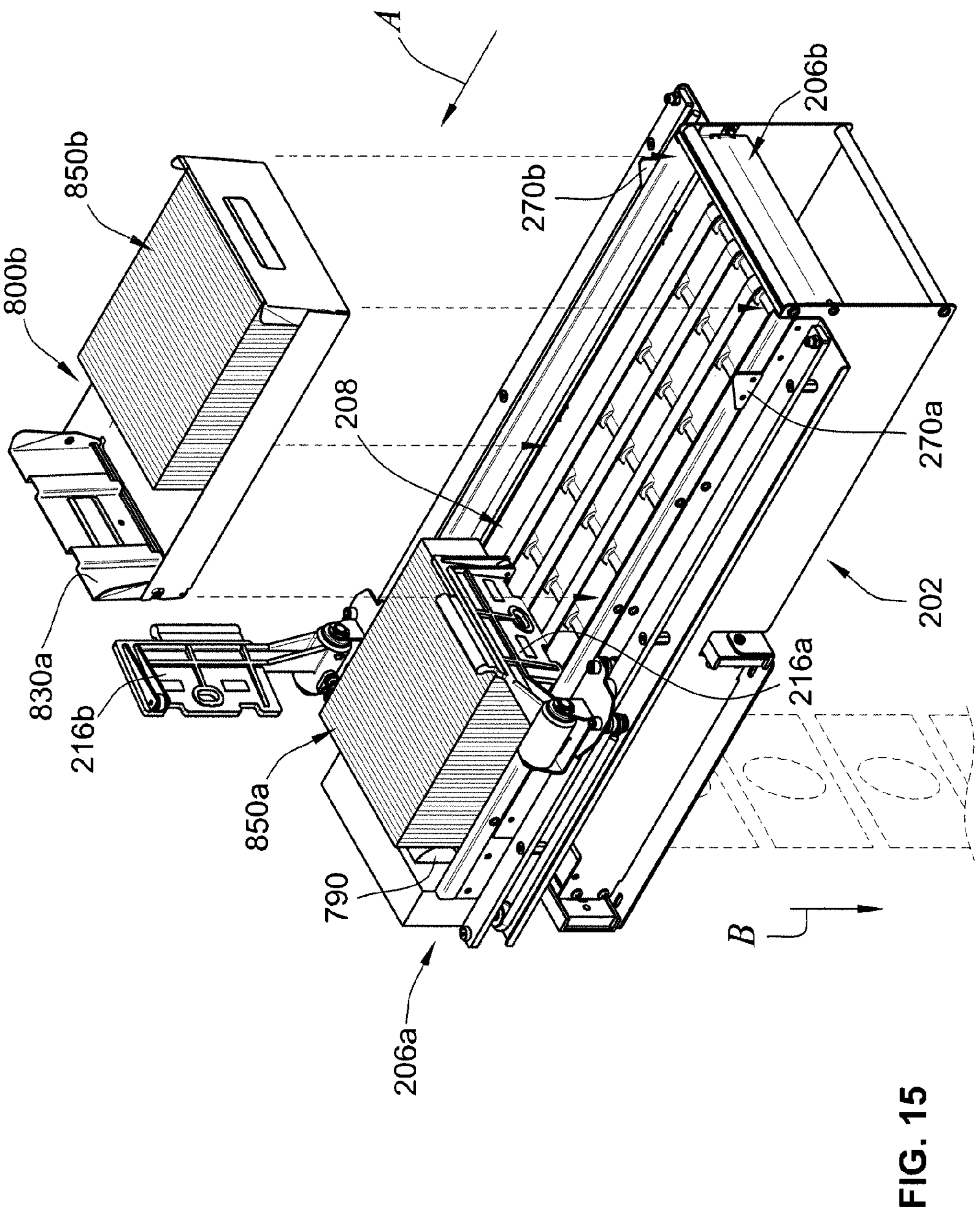
FIG. 15 is perspective view of a second loading tray positioned above and being about to be inserted into an input receptacle according to some embodiments of the present disclosure.

As the first documents 850*a* are moved in the direction of arrow A and then removed from the input receptacle 202 by the pair of stripper wheels 790, a space between the back side of the first paddle 216*a* and the back end 206*b* of the input receptacle 202 grows to a point where all of the first documents 850*a* are moved out of the first tray 800*a* as shown in FIG. 14. In particular, as shown in FIG. 14, all of the first documents 850*a* have been advanced out of the first tray 800*a* and the first paddle 216*a* has cleared the top edge of the front side 830*a* of the first tray 800*a*. As such, the first tray 800*a* can be removed from the input receptacle 202 without interfering with the processing of the first document 850*a* as shown in FIG. 14. According to some embodiments, the first tray 800*a* is removed from the input receptacle 202 generally in a vertical direction as illustrated by arrows Y. Further, the space between the back side of the first paddle 216*a* and the back end 206*b* of the input receptacle 202 grows such that a second tray 800*b* with a second stack of a plurality of documents 850*b* preloaded therein can be placed into the input receptacle 202 between the first paddle 216*a* and the back end 206*b* of the input receptacle 202 as shown in FIG. 15. As shown in FIG. 15, during the loading of the second tray 800*b*, the second paddle 216*b* can be left in its upright position near the front end 206*a* of the input receptacle 202 so as to not interfere with the loading of the second tray 800*b* into the input receptacle 202. Alternatively, according to some embodiments, the second paddle 216*b* can be placed into its downward, operational position (not shown in FIG. 15) near the back end 206*b* of the input receptacle 202 and engaged with the latch 270*b* (FIG. 15) so as to not interfere with the loading of the second tray 800*b* into the input receptacle 202. In such alternative embodiments, the second tray 800*b* can be loaded between the back side of the first paddle 216*a* and a front side of the second paddle 216*b*.

Figure 16:
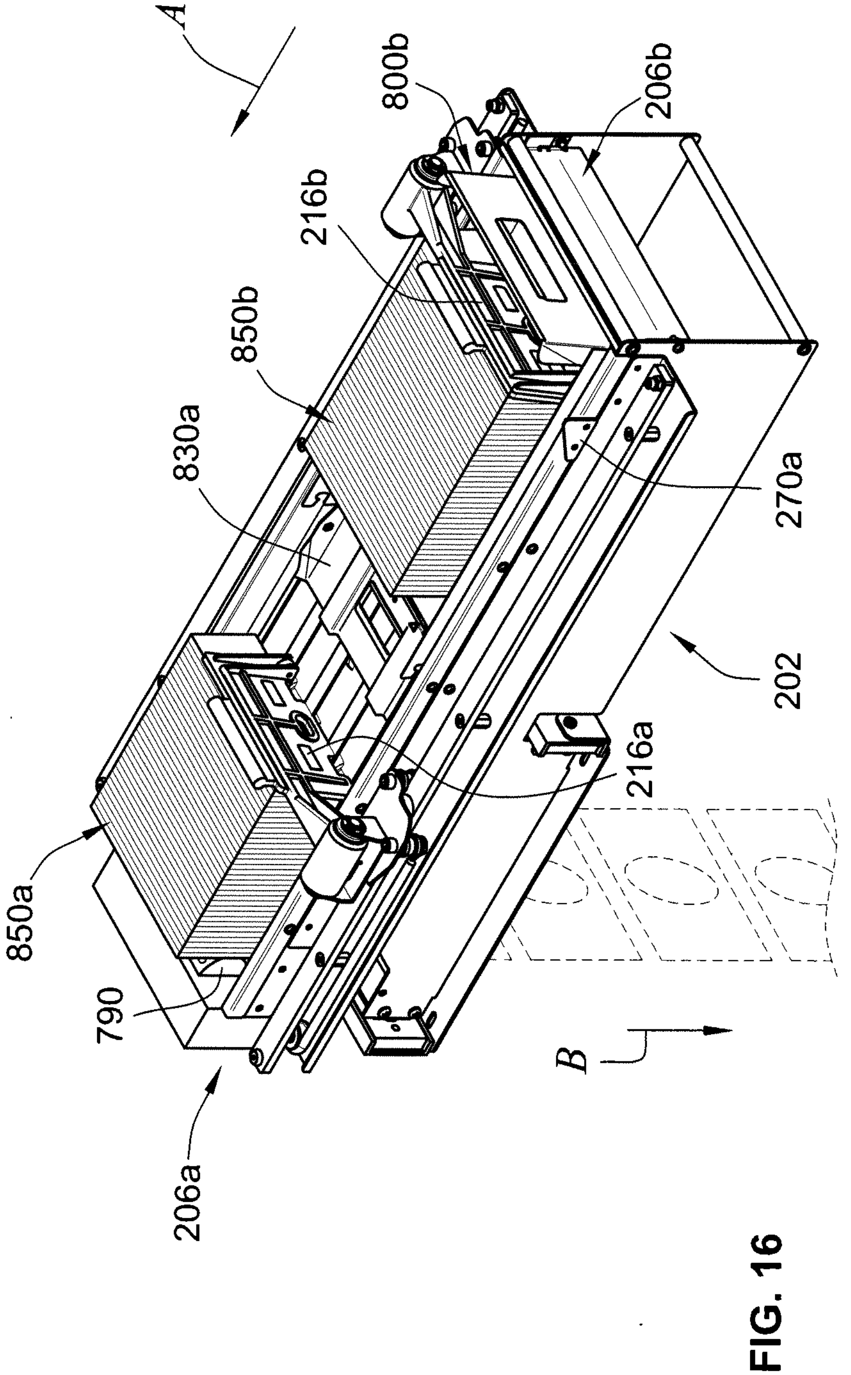
FIG. 16 is a perspective view of the second loading tray positioned within the input receptacle of FIG. 15 according to some embodiments of the present disclosure.

According to some embodiments, after the second tray 800*b* is positioned within the input receptacle 202, the second paddle 216*b* is manually retracted by the operator toward the back end 206*b* of the input receptacle 202 (or otherwise moved into the correct position such as by moving the second paddle 216*b* forward from a latched position near the back ends 206*b* of the input receptacle) and rotated into its downward, operational position such that at least a portion of the second paddle 216*a* is positioned within the second tray 800*b* as shown in FIG. 16. As described above, the force exerted by, for example, the hands of the operator overcomes the biasing force applied by the spring 240*b* allowing the operator to move the second paddle 216*b* toward the back end 206*b* of the input receptacle 202.

According to some embodiments, after the second paddle 216*b* is positioned at least partially within the second tray 800*b*, the second paddle 216*b* is biased (e.g., via the spring 240*b*) against a last one of the second documents 850*b* closest to the second end 830*b* of the second tray 800*b*. The second paddle 216*b* then engages and pushes the second documents 850*b* along the bottom 810 of the second tray 800*b* towards the front side 830*a* of the second tray 800*b* in the direction of arrow A (FIG. 16).

Figure 17:
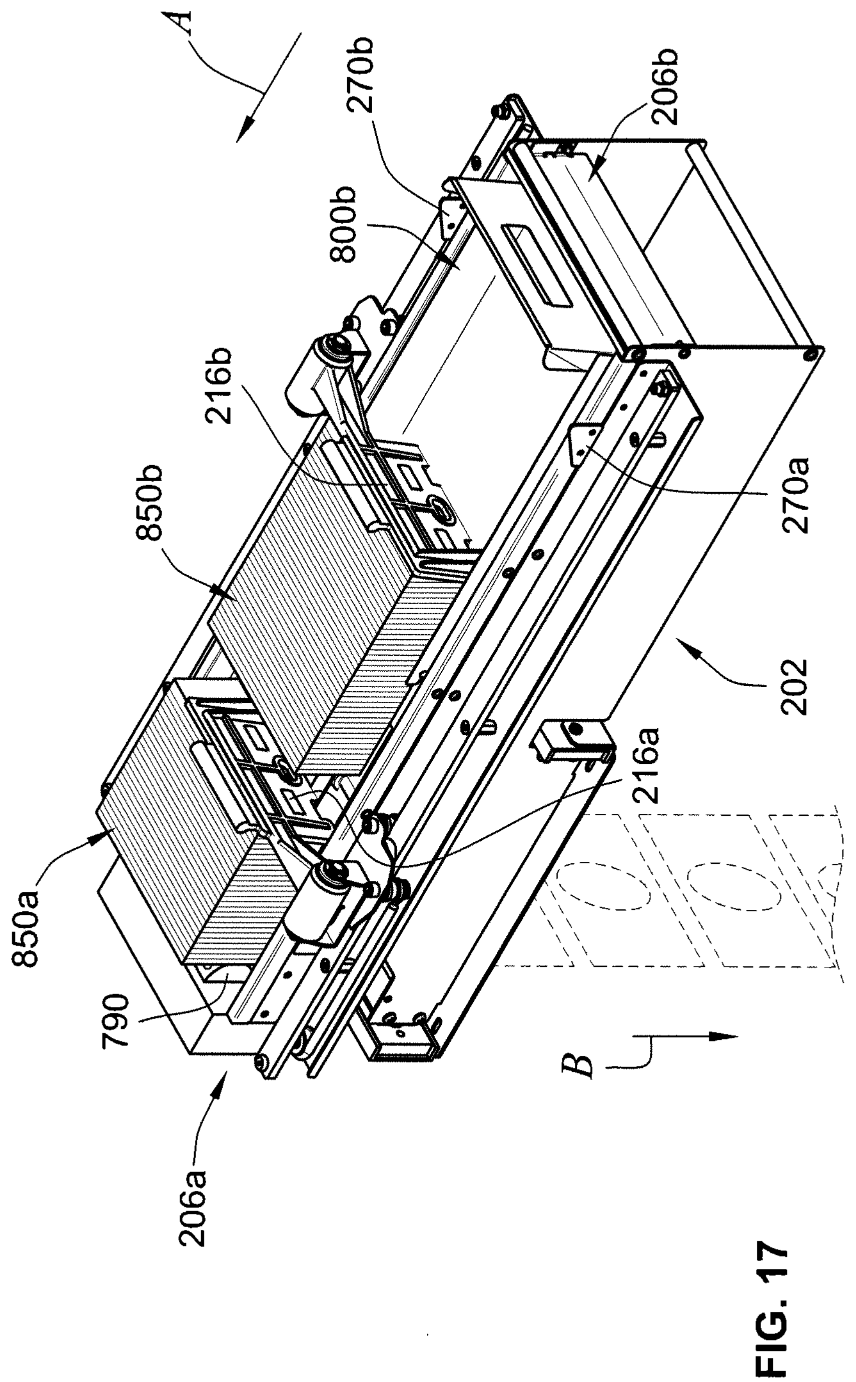
FIG. 17 is another perspective view of the second loading tray positioned within the input receptacle of FIG. 15 according to some embodiments of the present disclosure.

The operator can then move the front side 830*a* of the second tray 800*b* from the closed position (FIG. 15) into the open position (FIG. 16). As such, the second documents 850*b* are free to slide (e.g., the front side 830*a* no longer impedes movement of the second documents 850*b* in the direction of arrow A), under the force of the second paddle 216*b*, initially along the bottom 810 of the second tray 800*b* (as shown in FIG. 16), then along the front side 830*a* of the second tray 800*b* (as shown in FIG. 17), and then along the floor 208 of the input receptacle 202 towards the front end 206*a* of the input receptacle 202 in the direction of arrow A (as shown in FIG. 17), until a first one of the second documents 850*b* reaches and engages the back side of the first paddle 216*a*.

As such, the second paddle 216*b* holds the second documents 850*b* so that they remain stacked upright upon the edges of the second documents 850*b* and pressed into engagement with the back side of the first paddle 216*a*.

According to some embodiments, after or while the front side 830*a* of the second tray 800*b* is moved from the closed position (FIG. 15) into the open position (FIG. 16), an operator can aid in preventing the first documents 850*b* from falling over and in moving the stack of documents into engagement with the back side of the first paddle 216*a* by placing one hand in front of the foremost second document (the second document closest to the front end 206*a*) and the other hand behind the second paddle 216*b* that is engaging the rearmost second document in the stack and help move the entire second stack in a feed direction until the foremost document abuts the back side of the first paddle 216*a* while the second paddle 216*b* presses on the rearmost document, thus maintaining the entire second stack of documents in an upright manner on the edges of the documents. According to some embodiments, after or while the front side 830*a* of the second tray 800*b* is moved from the closed position (FIG. 15) into the open position (FIG. 16), an operator can aid in preventing the first documents 850*b* from falling over and in moving the stack of documents into engagement with back side of the first paddle 216*a* by placing one hand in front of the foremost second document (the second document closest to the front end 206*a*) while the second paddle 216*b* that is engaging the rearmost second document in the stack moves the entire second stack in a feed direction until the foremost second document abuts the back side of the first paddle 216*a* while the second paddle 216*b* presses on the rearmost second document, thus maintaining the entire second stack of documents in an upright manner on the edges of the documents.

According to some embodiments, after all of the first documents 850*a* are moved in the direction of arrow A and then removed from the input receptacle 202 by the pair of stripper wheels 790, the first paddle 216*a* reaches the pair of stripper wheels 790. Then the operator can pivot the first paddle 216*a* into its upright position (shown in FIG. 18) such that a first one of the second documents 850*b* is forced into engagement with the pair of stripper wheels 790 by the second paddle 216*b*. According to some alternative embodiments, after, or prior to, the second documents 850*a* engaging the back side of the first paddle 216*a*, the operator can pivot the first paddle 216*a* into its upright position (shown in FIG. 10) such that the second documents 850*b* are combined with the first documents 850*a* (which is not shown) such that the combined first and second documents 850*a*, 850*b* are moved in the direction of arrow A by the second paddle 216*b*. Such an alternative embodiment aids in the continuous processing of documents without having to wait for a particular stack of documents between the pair of stripper wheels and one of the paddles 216*a*, 216*b* to be processed completely before pivoting the paddle out of its operational position as it reaches the pair of stripper wheels 790.

Figure 18:
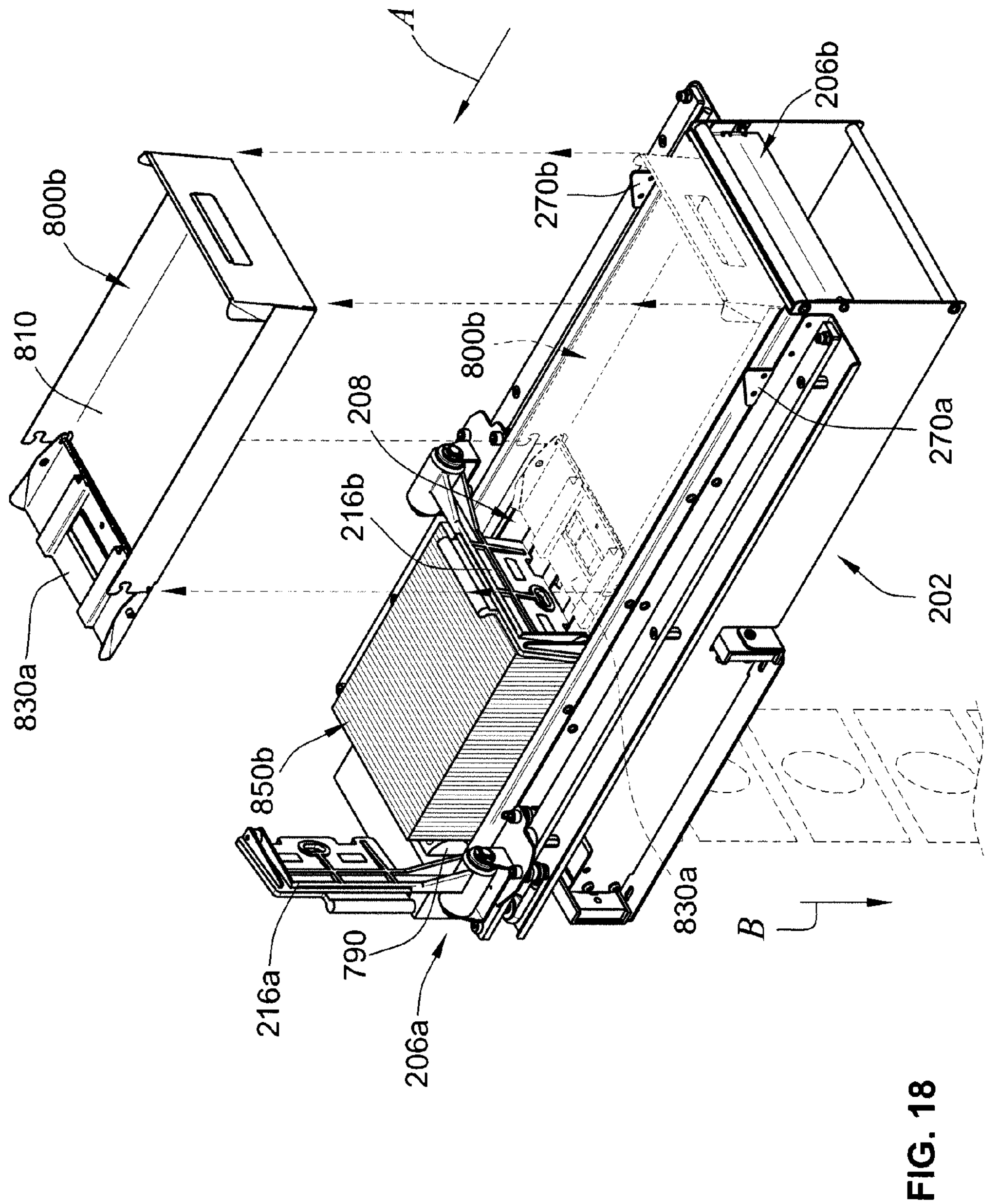
FIG. 18 is perspective view of an empty second loading tray which has been removed from an input receptacle according to some embodiments of the present disclosure.
Figure 19:
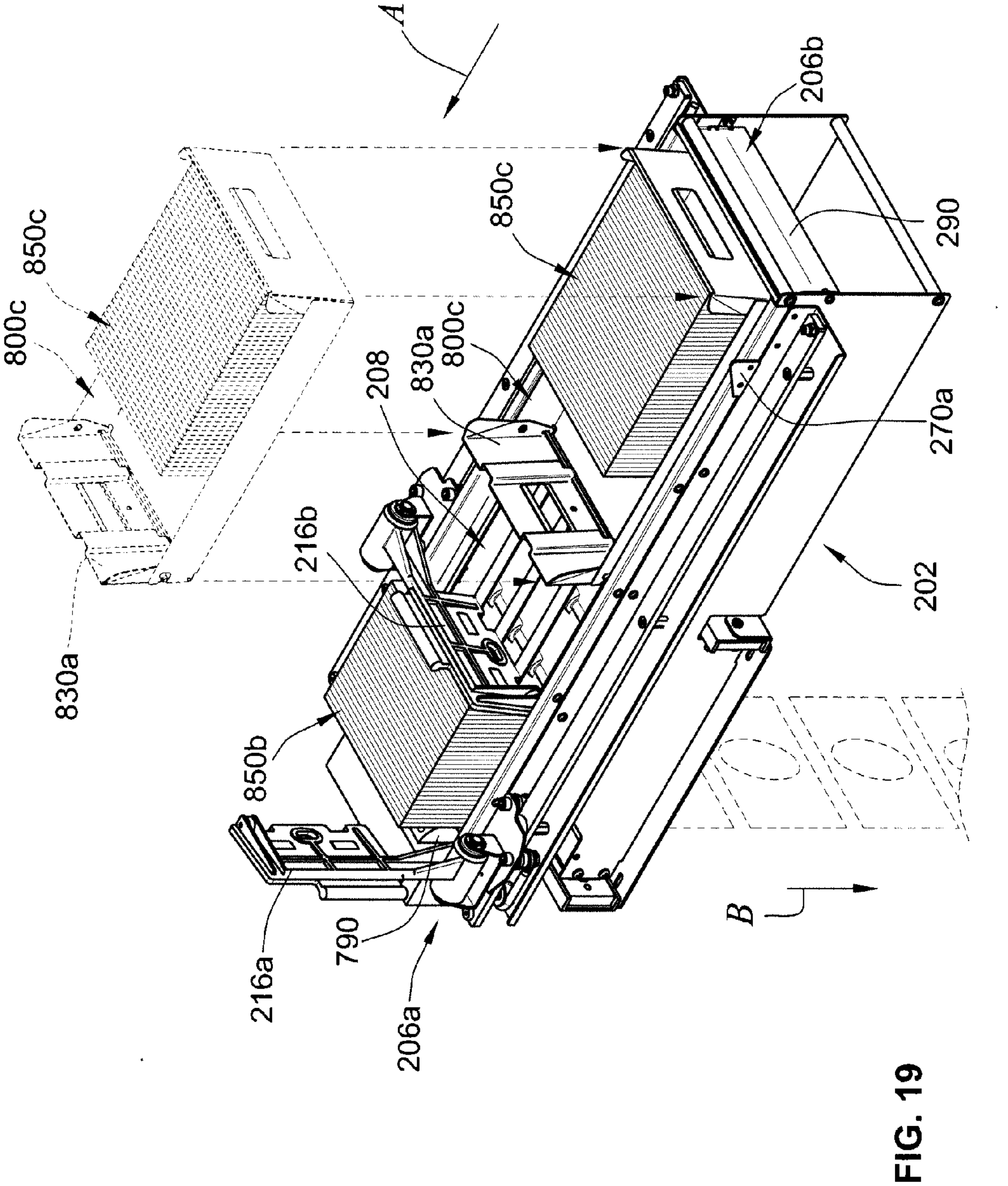
FIG. 19 is perspective view of a third loading tray positioned within an input receptacle having a moveable rear gate according to some embodiments of the present disclosure.

As the second documents 850*b* are moved in the direction of arrow A and removed from the input receptacle 202 by the pair of stripper wheels 790, a space between the back side of the second paddle 216*b* and the back end 206*b* of the input receptacle 202 grows to a point where all of the first documents 850*a* are moved out of the first tray 800*a* as shown in FIG. 18. In particular, as shown in FIG. 18, all of the second documents 850*b* have been advanced out of the second tray 800*b* and the second paddle 216*b* has cleared the top edge of the front side 830*a* of the second tray 800*b*. As such, the second tray 800*b* can be removed from the input receptacle 202 without interfering with the processing of the second documents 850*b* as shown in FIG. 18. Further, as shown in FIG. 19, the space between the back side of the second paddle 216*b* and the back end 206*b* of the input receptacle 202 grows such that a third tray 800*c* with a third plurality of documents 850*c* preloaded therein can be placed into the input receptacle 202 between the second paddle 216*b* and the back end 206*b* of the input receptacle 202 as shown in FIG. 19. As shown in FIG. 19, during the loading of the third tray 800*c*, the first paddle 216*a* can be left in its upright position near the front end 206*a* of the input receptacle 202 so as to not interfere with the loading of the third tray 800*c* into the input receptacle 202. Alternatively, according to some embodiments, the first paddle 216*a* can be placed into its downward, operational position (not shown in FIG. 19) near the back end 206*b* of the input receptacle 202 and engaged with the latch 270*a* (FIG. 19) so as to not interfere with the loading of the third tray 800*c* into the input receptacle 202. In such alternative embodiments, the third tray 800*c* can be loaded between the back side of the second paddle 216*b* and a front side of the first paddle 216*a*.

To continue adding documents into the input receptacle using trays 800, this process may be continued by alternatively removing an empty tray and adding a tray with documents preloaded therein as described above. Using such a method, the operation of a document handling device having input receptacle 202 can continuously run even while additional documents are being loaded into the input receptacle 202 via one or more trays 800.

Figure 20:
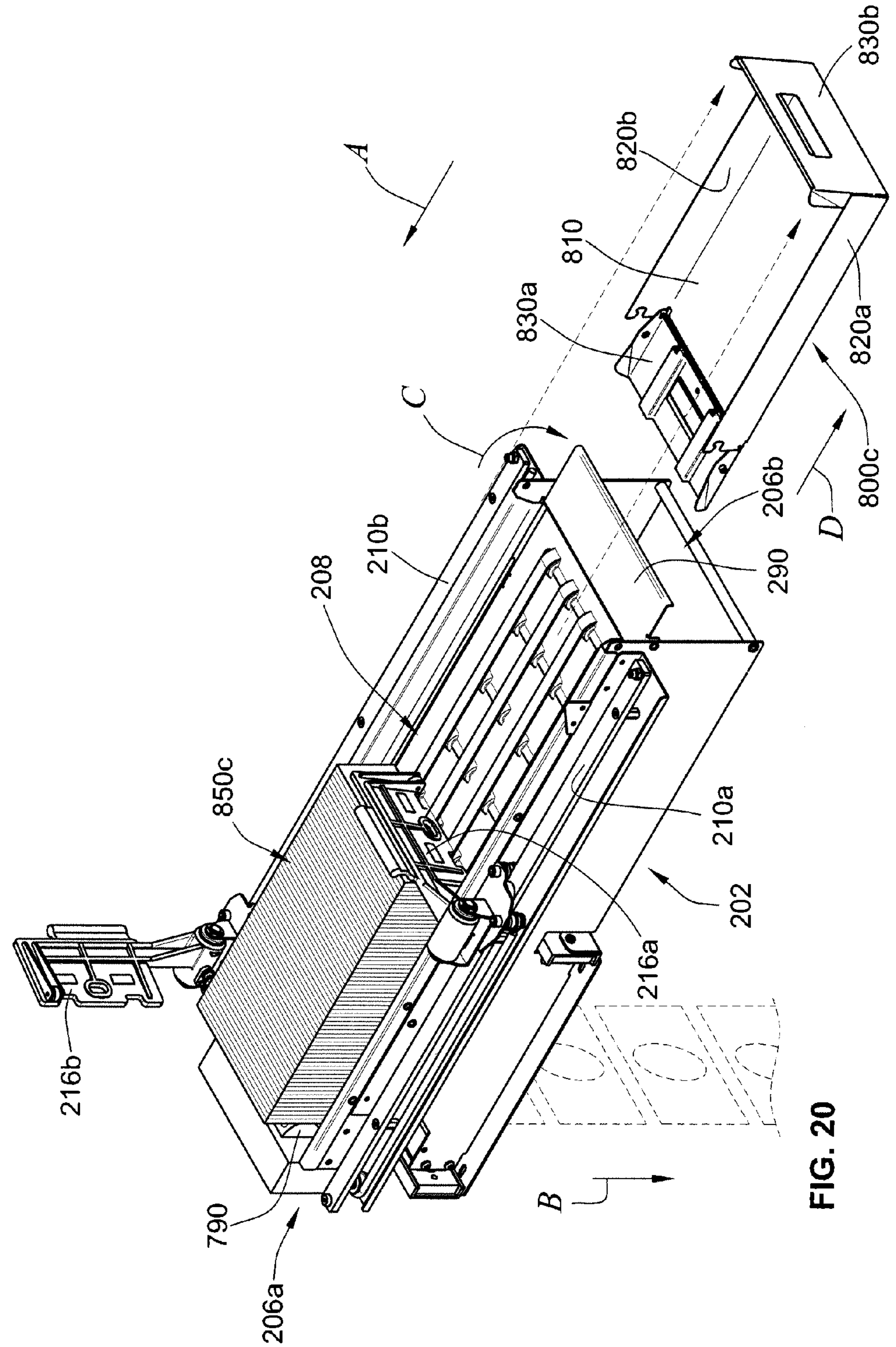
FIG. 20 is perspective view of an empty third loading tray which has been removed from an input receptacle of FIG. 19 in a generally horizontal direction according to some embodiments of the present disclosure.

Now referring to FIG. 20, according to some embodiments, the back end 206*b* of the input receptacle 202 can include a pivotal tail gate 290. According to some embodiments, the tail gate 290 is pivotally coupled to the first and the second sides 204*a,b* of the input receptacle 202 via one or more pivot pins (not shown). Thus, according to some embodiments, the tail gate 290 of the input receptacle 202 is pivotally coupled to the rest of the input receptacle 202 (e.g., the tail gate 290 is coupled via one or more pivot pins to the first and the second sides 204*a,b* of the input receptacle 202, the tail gate 290 is coupled to the floor 208 of the input receptacle 202 via a hinge, etc.). As such, the tail gate 290 of the input receptacle 202 is selectively moveable (e.g., in response to being engaged or pushed by the third tray 800*c* and/or manually by an operator's hand) between a closed position (shown in FIG. 19) and an open position (shown in FIG. 20) in the direction of arrow C (FIG. 20). As such, when the tail gate 290 is in the open position (FIG. 20), the third tray 800*c* in the input receptacle (e.g., as shown in FIG. 19) therein can be slid out of the input receptacle 202 in the direction of arrow D (FIG. 20), which is a tray-removal direction. The tray-removal direction (e.g., the direction of arrow D) is the opposite of the feed direction (e.g., the direction of arrow A), which is the direction that the third documents 850*c* are moved by the first paddle 216*a*. In some embodiments, sliding the third tray 800*c* in the direction of arrow D may cause the tail gate 290 to move (e.g., pivot about the one or more pivot pins in the direction of arrow C) from the closed position (FIG. 19) to the open position (FIG. 20) in response to the tray 800*c* pushing on the tailgate 290. According to some embodiments, the tail gate 290 is biased to be in the closed position (FIG. 19) by one or more biasing members (e.g., a spring which is not shown).

According to some embodiments, the tray 800 can be inserted into the input receptacle 202 and/or removed from the input receptacle 202 while one or both of the paddles 216*a*, 216*b* are moving documents towards the front end 206*a* of the input receptacle and/or towards the pair of stripping wheels 790. As such, efficiency of processing documents can be increased as compared with prior systems as the present disclosure provides systems and methods for processing documents continuously by the device 100 (e.g., being fed by the pair of stripping wheels 790) and continuously loading additional documents in the input receptacle 202 using, for example, one or more preloaded trays 800.

According to some alternative embodiments, a tray can have a length that is longer than the input receptacle 202 (e.g., longer than the floor 208). In such embodiments, the tail gate 290 of the input receptacle 202 can folded and/or moved from the closed position (FIG. 19) in the direction of arrow C to the open position (FIG. 20) such that the tray can be inserted into the input receptacle 202 and overhang and/or extend therefrom.

VII. Alternative Embodiments

Numerous references are made herein to many embodiments, and in the various other documents incorporated herein by reference. Those skilled in the art will recognize that many changes may be made to the described embodiments without departing from the spirit and scope of the present disclosure. Furthermore, those skilled in the art will also recognize that certain embodiments described for one device or system or method can be readily, or with slight modification, be included in the embodiments described for another device or system or method, without departing from the spirit and scope of the present disclosure.

By way of example, the following alternative embodiments are illustrative examples of the present disclosure.

Alternative Embodiment A. An apparatus for feeding a plurality of stacked currency bills into a currency handling device, the apparatus comprising: an input receptacle being configured to receive a plurality of stacked currency bills, the receptacle having a first side and a second opposing side, a front end and an opposing back end, and a floor; a feeder mechanism disposed adjacent the front end of the input receptacle, the feeder mechanism being configured to transfer the bills, one at a time, from the receptacle to the currency handling device; a first paddle rail disposed adjacent the first side; a second paddle rail disposed adjacent the second side; a first paddle assembly pivotally and slidably coupled to the first paddle rail, the first paddle assembly having a portion configured to contact a stack of a plurality of bills residing in the input receptacle; a second paddle assembly pivotally and slidably coupled to the second paddle rail, the second paddle assembly having a portion configured to contact a stack of a plurality of bills residing in the input receptacle; a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped; a second resilient member coupled to the second paddle assembly, the second resilient member being configured to bias the second paddle assembly towards the front end of the receptacle, the second resilient member being configured to cause the second paddle assembly to move in a direction toward the front end of the input receptacle at a second average rate of speed when unrestrained and undamped; a first damping mechanism configured to slow the unrestrained, average rate of speed the first paddle assembly from the first average rate of speed to a third average rate of speed which is less the first average rate of speed; and a second damping mechanism configured to slow the unrestrained, average rate of speed the second paddle assembly from the second average rate of speed to a fourth average rate of speed which is less the second average rate of speed.

Alternative Embodiment B. The apparatus of Alternative Embodiment A, wherein the first and second resilient members are springs.

Alternative Embodiment C. The apparatus of Alternative Embodiment A, wherein the first damping mechanism comprises at least one magnet coupled to the first paddle assembly in a manner that the at least one magnet remains adjacent to and spaced from the first paddle rail as the first paddle assembly moves along the first paddle rail and wherein the first paddle rail is made of non-ferrous, conductive material.

Alternative Embodiment D. The apparatus of Alternative Embodiment C, wherein the first paddle rail is made of aluminum.

Alternative Embodiment E. The apparatus of Alternative Embodiment C, wherein the at least one magnet is coupled to the first paddle assembly adjacent to where the first paddle assembly is engaged to the first paddle rail.

Alternative Embodiment F. The apparatus of Alternative Embodiment E, wherein when the first paddle assembly moves from a position near the back end of the input receptacle toward the front end of the input receptacle the at least one magnet moves substantially parallel the first paddle rail and wherein the first paddle rail interferes with a magnetic field generated by the at least one magnet and thereby slows the unrestrained, average rate of speed the first paddle assembly from the first average rate of speed to the third average rate of speed which is less the first average rate of speed.

Alternative Embodiment G. The apparatus of Alternative Embodiment A, further comprising: at least one track disposed adjacent the floor of the receptacle, the track having a width; at least one channel disposed in a bottom surface of the first paddle assembly, the width of the channel being slightly larger than the width of the track, the channel being adapted to fit around the track, the channel being adapted to slide along the track; and at least one channel disposed in a bottom surface of the second paddle assembly, the width of the channel being slightly larger than the width of the track, the channel being adapted to fit around the track, the channel being adapted to slide along the track.

Alternative Embodiment H. The apparatus of Alternative Embodiment A, wherein the first paddle assembly has a bottom surface, the apparatus further comprising a roller attached to the first paddle assembly, the roller extending slightly beyond the bottom surface of the of the first paddle assembly, the roller being adapted to roll along the floor of the receptacle as the first paddle assembly urges the stack of bills towards the feeder mechanism.

Alternative Embodiment I. The apparatus of Alternative Embodiment A, wherein the second paddle assembly has a bottom surface, the apparatus further comprising a roller attached to the second paddle assembly, the roller extending slightly beyond the bottom surface of the of the second paddle assembly, the roller being adapted to roll along the floor of the receptacle as the second paddle assembly urges the plurality of stacked bills towards the feeder mechanism.

Alternative Embodiment J. The apparatus of Alternative Embodiment A, wherein the receptacle and the feeder mechanism are adapted to accommodate bills ranging in size from about 4.39 inches long by about 2.40 inches wide to about 7.17 inches long by about 3.82 inches wide.

Alternative Embodiment K. The apparatus of Alternative Embodiment A, wherein the feeder mechanism comprises at least one stripping wheel.

Alternative Embodiment L. The apparatus of Alternative Embodiment K, wherein the at least one stripping wheel comprises two stripping wheels.

Alternative Embodiment M. An apparatus for feeding a plurality of stacked currency bills into a currency handling device, the apparatus comprising: an input receptacle being configured to receive a plurality of stacked currency bills, the receptacle having a first side and a second opposing side, a front end, and an opposing back end; a first paddle rail disposed adjacent the first side; a first paddle assembly slidably coupled to the first paddle rail, the first paddle assembly having a portion configured to contact a stack of a plurality of bills residing in the input receptacle; a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped; and a first damping mechanism configured to slow the unrestrained, average rate of speed the first paddle assembly from the first average rate of speed to a second average rate of speed which is less the first average rate of speed.

Alternative Embodiment N. The apparatus of Alternative Embodiment M, wherein the first resilient member is a spring.

Alternative Embodiment O. The apparatus of Alternative Embodiment M, wherein the first damping mechanism comprises at least one magnet coupled to the first paddle assembly in a manner that the at least one magnet remains adjacent to and spaced from the first paddle rail as the first paddle assembly moves along the first paddle rail and wherein the first paddle rail is made of non-ferrous, conductive material.

Alternative Embodiment P. The apparatus of Alternative Embodiment M, wherein the first paddle rail is made of aluminum.

Alternative Embodiment Q. The apparatus of Alternative Embodiment M, wherein the at least one magnet is coupled to the first paddle assembly adjacent to where the first paddle assembly is engaged to the first paddle rail.

Alternative Embodiment R. The apparatus of Alternative Embodiment Q, wherein when the first paddle assembly moves from a position near the back end of the input receptacle toward the front end of the input receptacle the at least one magnet moves substantially parallel the first paddle rail and wherein the first paddle rail interferes with a magnetic field generated by the at least one magnet and thereby slows the unrestrained, average rate of speed the first paddle assembly from the first average rate of speed to the second average rate of speed which is less the first average rate of speed.

Alternative Embodiment S. The apparatus of Alternative Embodiment M, further comprising: at least one track disposed adjacent a floor of the receptacle, the track having a width; at least one channel disposed in a bottom surface of the first paddle assembly, the width of the channel being slightly larger than the width of the track, the channel being adapted to fit around the track, the channel being adapted to slide along the track; and at least one channel disposed in a bottom surface of the second paddle assembly, the width of the channel being slightly larger than the width of the track, the channel being adapted to fit around the track, the channel being adapted to slide along the track.

Alternative Embodiment T. The apparatus of Alternative Embodiment M, wherein the first paddle assembly has a bottom surface, the apparatus further comprising a roller attached to the first paddle assembly, the roller extending slightly beyond the bottom surface of the of the first paddle assembly, the roller being adapted to roll along a floor of the input receptacle as the first paddle assembly urges the stack of bills towards the front end of the input receptacle.

Alternative Embodiment U. The apparatus of Alternative Embodiment M, wherein the input receptacle is adapted to accommodate bills ranging in size from about 4.39 inches long by about 2.40 inches wide to about 7.17 inches long by about 3.82 inches wide.

Alternative Embodiment V. The apparatus of Alternative Embodiment M, further comprising a feeder mechanism disposed adjacent the front end of the input receptacle, the feeder mechanism being configured to transfer the bills, one at a time, out of the input receptacle to a currency handling device, and wherein the feeder mechanism comprises at least one stripping wheel.

Alternative Embodiment W. The apparatus of Alternative Embodiment M, wherein the first paddle assembly comprises a first paddle, a first paddle arm, and a first paddle pivot assembly, wherein the first paddle arm extends from the first paddle and couples the first paddle to the first paddle pivot assembly.

Alternative Embodiment X. The apparatus of Alternative Embodiment W, wherein the first paddle pivot assembly comprises a pivot housing, a pivot axle, and a pivot axle holder and wherein the pivot housing is configured to pivot about the pivot axle and the pivot axle holder is configured to hold the pivot axle.

Alternative Embodiment Y. The apparatus of Alternative Embodiment X, further comprising a first paddle trolley slidably coupled to the first paddle rail and wherein the first pivot axle holder is coupled to the first paddle trolley.

Alternative Embodiment Z. The apparatus of Alternative Embodiment M, further comprising a first paddle trolley slidably coupled to the first paddle rail and wherein the first paddle assembly is coupled to the first paddle trolley.

Alternative Embodiment AA. The apparatus of Alternative Embodiment Z, wherein the first damping mechanism comprises at least one magnet coupled to the first paddle trolley in a manner that the at least one magnet remains adjacent to and spaced from the first paddle rail as the first paddle trolley moves along the first paddle rail and wherein the first paddle rail is made of non-ferrous, conductive material.

Alternative Embodiment AB. The apparatus of Alternative Embodiment AA, wherein the first paddle rail is made of aluminum.

Alternative Embodiment AC. The apparatus of Alternative Embodiment AB, wherein the first average rate of speed exceeds about 60 inches per second.

Alternative Embodiment AD. The apparatus of Alternative Embodiment AC, wherein the second average rate of speed is less than about 35 inches per second.

Alternative Embodiment AE. The apparatus of Alternative Embodiment AB, wherein the first average rate of speed is about 70 inches per second and the second average rate of speed is about 33 inches per second.

Alternative Embodiment AF. The apparatus of Alternative Embodiment AB, wherein the second average rate of speed is less than half the first average rate of speed.

Alternative Embodiment AG. The apparatus of Alternative Embodiment M, wherein the first paddle assembly comprises a first paddle, a first paddle arm, and a first pivot housing and wherein the first paddle arm extends from the first paddle and couples the first paddle to the first pivot housing.

Alternative Embodiment AH. The apparatus of Alternative Embodiment AG, wherein the first paddle rail is an elongated cylindrical bar and the first pivot housing has a circular aperture therein, wherein the first paddle rail extends through the aperture in the first pivot housing whereby the first pivot housing is slidably and pivotally coupled to the first paddle rail.

Alternative Embodiment AI. The apparatus of Alternative Embodiment AH, wherein the first damping mechanism comprises at least one donut-shaped magnet coupled within the first pivot housing, wherein the first paddle rail extends through the aperture in the first pivot housing and a central hole in the at least one donut-shaped magnet whereby the first pivot housing is slidably and pivotally coupled to the first paddle rail in a manner that the at least one magnet remains adjacent to and spaced from the first paddle rail as the first pivot housing moves along the first paddle rail and wherein the first paddle rail is made of non-ferrous, conductive material.

Alternative Embodiment AJ. The apparatus of Alternative Embodiment AI, wherein the first average rate of speed exceeds about 60 inches per second.

Alternative Embodiment AK. The apparatus of Alternative Embodiment AJ, wherein the second average rate of speed is less than about 35 inches per second.

Alternative Embodiment AL. The apparatus of Alternative Embodiment AI, wherein the first average rate of speed is about 70 inches per second and the second average rate of speed is about 33 inches per second.

Alternative Embodiment AM. The apparatus of Alternative Embodiment AI, wherein the second average rate of speed is less than half the first average rate of speed.

Alternative Embodiment AN. The apparatus of Alternative Embodiment AI, wherein the first paddle rail is made of aluminum.

Alternative Embodiment AO. The apparatus of Alternative Embodiment M, wherein the first paddle assembly is pivotally and slidably coupled to the first paddle rail and further comprising: a second paddle rail disposed adjacent the second side of the input receptacle; a second paddle assembly pivotally and slidably coupled to the second paddle rail, the second paddle assembly having a portion configured to contact a stack of a plurality of bills residing in the input receptacle; a second resilient member coupled to the second paddle assembly, the second resilient member being configured to bias the second paddle assembly towards the front end of the receptacle, the second resilient member being configured to cause the second paddle assembly to move in a direction toward the front end of the input receptacle at a third average rate of speed when unrestrained and undamped; and a second damping mechanism configured to slow the unrestrained, average rate of speed the second paddle from the third average rate of speed to a fourth average rate of speed which is less the third average rate of speed.

Alternative Embodiment AP. The apparatus of Alternative Embodiment AO, wherein the second resilient members is a spring.

Alternative Embodiment AQ. A method of feeding currency bills in a currency processing device, the currency processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer currency bills from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of: positioning a tray between the front end and the back end of the input receptacle, the tray being preloaded with a plurality of currency bills therein, the tray having a bottom, two opposing lateral sides, and a back side and an opposing front side, the front and back sides of the tray being generally perpendicular to the two opposing lateral sides of the tray, the front side of the tray being movable between a closed position and an open position, the tray being positioned within the input receptacle such that the two opposing lateral sides of the tray are generally parallel with the two opposing sides of the input receptacle; pivoting the first paddle assembly with respect to the first paddle rail such that a first paddle of the first paddle assembly is in an upward position; with the first paddle in the upward position, sliding the first paddle assembly with respect to the first paddle rail towards the back end of the input receptacle; pivoting the first paddle assembly with respect to the first paddle rail such that the first paddle of the first paddle assembly is in an operational position and is positioned at least partially within the tray; engaging the plurality of currency bills in the tray with a front side of the first paddle of the first paddle assembly such that the front side of the first paddle abuts the one of the currency bills in the tray that is closest to the back end of the input receptacle; and moving the front side of the tray from the closed position to the open position, wherein in response to the moving the front side of the tray, the first paddle of the first paddle assembly urges the currency bills in the tray in a feed direction towards the front end of the input receptacle such that the one of the currency bills in the tray that is closest to the front end of the input receptacle is moved out of the tray and engages the feeder mechanism.

Alternative Embodiment AR. A method of loading currency bills into an input receptacle of a currency processing device, the currency processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer currency bills from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of: positioning a first tray in the input receptacle, the first tray being preloaded with a first plurality of first currency bills therein, the first tray having a bottom, two opposing lateral sides, and a back side and an opposing front side, the front and back sides of the first tray being generally perpendicular to the two opposing lateral sides of the first tray, the front side of the first tray being movable between a closed position and an open position, the first tray being positioned within the input receptacle such that the two opposing lateral sides of the first tray are generally parallel with the two opposing sides of the input receptacle and the front side of the first tray is oriented towards the front end of the input receptacle, the first currency bill in the first tray positioned closest to the front side of the first tray being a leading first currency bill and the first currency bill in the first tray positioned closest to the back side of the first tray being a trailing first currency bill; positioning the first paddle assembly in an operational position within the first tray such that the first paddle assembly engages the first plurality of currency bills in the first tray with a front side of a first paddle of the first paddle assembly such that the front side of the first paddle abuts the trailing first currency bill; and moving the front side of the first tray from the closed position to the open position whereby the first paddle of the first paddle assembly moves the first currency bills in the first tray in a feed direction towards the front end of the input receptacle such that the leading first currency bill is moved out of the first tray and engages the feeder mechanism.

Alternative Embodiment AS. The method of Alternative Embodiment AR, further comprising the act of removing the first tray from the input receptacle after the first paddle has moved all the first currency bills out of the first tray and while the first paddle is still moving at least some of the first currency bills towards the front end of the input receptacle.

Alternative Embodiment AT. The method of Alternative Embodiment AS, further comprising the acts of, while the first paddle is still moving at least some of the first currency bills towards the front end of the input receptacle: positioning a second tray in the input receptacle, the second tray being preloaded with a second plurality of second currency bills therein, the second tray having a bottom, two opposing lateral sides, and a back side and an opposing front side, the front and back sides of the second tray being generally perpendicular to the two opposing lateral sides of the second tray, the front side of the second tray being movable between a closed position and an open position, the second tray being positioned within the input receptacle such that the two opposing lateral sides of the second tray are generally parallel with the two opposing sides of the input receptacle and the front side of the second tray is oriented towards the front end of the input receptacle, the second currency bill in the first tray positioned closest to the front side of the second tray being a leading second currency bill and the second currency bill in the second tray positioned closest to the back side of the second tray being a trailing second currency bill; positioning the second paddle assembly in an operational position within the second tray such that the second paddle assembly engages the second plurality of currency bills in the second tray with a front side of a second paddle of the second paddle assembly such that the front side of the second paddle abuts the trailing second bill; and moving the front side of the second tray from the closed position to the open position whereby the second paddle of the second paddle assembly moves the second currency bills in the second tray in the feed direction towards the front end of the input receptacle such that the leading second currency bill is moved out of the second tray and abuts the first paddle.

Alternative Embodiment AU. The method of Alternative Embodiment AT, further comprising the act of, after the leading second currency bills abuts the first paddle, pivoting the first paddle out of the input receptacle whereby the leading second currency bill abuts the trailing first currency bill.

Alternative Embodiment AV. The method of Alternative Embodiment AU, further comprising the acts of removing the second tray from the input receptacle after the second paddle has moved all the second currency bills out of the second tray and while the second paddle is still moving at least some of the second currency bills towards the front end of the input receptacle.

Alternative Embodiment AW. A method of feeding currency bills in a currency processing device, the currency processing device including an input receptacle and a paddle, the input receptacle having a first side and a second opposing side, a front end and an opposing back end, and a floor, the method comprising: positioning a tray between the front end and the back end of the input receptacle, the tray being preloaded with a plurality of currency bills therein, the tray having a bottom, two opposing lateral sides, and a back side and an opposing front side, the front side of the tray being movable between a closed position and an open position; engaging the plurality of currency bills in the tray with a front side of the paddle such that the front side of the paddle abuts the one of the currency bills in the tray that is closest to the back end of the input receptacle; and moving the front side of the tray from the closed position to the open position so that the paddle may urge the currency bills in the tray in a feed direction towards the front end of the input receptacle such that at least a portion of the currency bills in the tray is moved out of the tray.

Alternative Embodiment AX. The method of Alternative Embodiment AW, further comprising, prior to the engaging the plurality of currency bills in the tray with the front side of the paddle: pivoting the paddle into an upward position; with the paddle in the upward position, sliding the paddle towards the back end of the input receptacle; and pivoting the paddle into an operational position such that the paddle is positioned at least partially within the tray.

Alternative Embodiment AY. The method of Alternative Embodiment AW, wherein the engaging comprises pivoting the paddle into an operational position such that the paddle is positioned at least partially within the tray.

Alternative Embodiment AZ. The method of Alternative Embodiment AW, wherein the paddle is biased, via a biasing member, to slide towards the front end of the input receptacle.

Alternative Embodiment BA. The method of Alternative Embodiment AW, further comprising removing the tray from the input receptacle while the paddle urges the currency bills towards the front end of the input receptacle.

Alternative Embodiment BB. The method of Alternative Embodiment BA, further comprising positioning a second tray between the front end and the back end of the input receptacle while the paddle urges the currency bills towards the front end of the input receptacle, the second tray being preloaded with a second plurality of currency bills therein, the second tray having a bottom, two opposing lateral sides, and a back side and an opposing front side, the front side of the second tray being movable between a closed position and an open position.

Alternative Embodiment BC. The method of Alternative Embodiment BB, further comprising engaging the second plurality of currency bills in the second tray with a front side of a second paddle of the currency processing device such that the front side of the second paddle abuts the one of the second currency bills in the second tray that is closest to the back end of the input receptacle.

Alternative Embodiment BD. The method of Alternative Embodiment BC, wherein the engaging the second plurality of currency bills in the second tray comprises pivoting the second paddle into an operational position such that the second paddle is positioned at least partially within the second tray.

Alternative Embodiment BE. The method of Alternative Embodiment BC, wherein the second paddle is biased, via a second biasing member, to slide towards the front end of the input receptacle.

Alternative Embodiment BF. The method of Alternative Embodiment BC, further comprising moving the front side of the second tray from the closed position to the open position so that the second paddle may urge the second currency bills in the second tray in the feed direction towards the front end of the input receptacle such that at least a portion of the second currency bills in the second tray is moved out of the second tray.

Alternative Embodiment BG. The method of Alternative Embodiment BF, further comprising, prior to the engaging the second plurality of currency bills in the second tray with the front side of the second paddle: pivoting the second paddle into an upward position; with the second paddle in the upward position, sliding the second paddle towards the back end of the input receptacle; and pivoting the second paddle into an operational position such that the second paddle is positioned at least partially within the second tray.

Alternative Embodiment BH. The method of Alternative Embodiment AW, wherein the input receptacle includes a tail gate that is movable between a closed position and an open position.

Alternative Embodiment BI. The method of Alternative Embodiment BH, further comprising removing the tray from the input receptacle in a tray-removal direction while the paddle urges the currency bills towards the front end of the input receptacle, the tray-removal direction being opposite the feed direction.

Alternative Embodiment BJ. The method of Alternative Embodiment BI, wherein the removing the tray from the input receptacle causes the tray to engage the tail gate and cause the tail gate to move from the closed position to the open position.

Alternative Embodiment BK. The method of Alternative Embodiment BJ, wherein the tail gate is biased towards the closed position such that when the tray is completely removed from the input receptacle the tail gate automatically moves from the open position to the closed position.

Alternative Embodiment BL. A method of feeding currency bills in a currency processing device, the currency processing device including an input receptacle and a paddle, the input receptacle having a first side and a second opposing side, a front end and an opposing back end, and a floor, the method comprising: receiving a tray between the front end and the back end of the input receptacle, the tray being preloaded with a plurality of currency bills therein, the tray having a bottom, two opposing lateral sides, and a back side and an opposing front side, the front side of the tray being movable between a closed position and an open position; engaging the plurality of currency bills in the tray with a front side of the paddle such that the front side of the paddle abuts the one of the currency bills in the tray that is closest to the back end of the input receptacle; and wherein after the front side of the tray has been moved from the closed position to the open position, urging, via the paddle, the currency bills in the tray in a feed direction towards the front end of the input receptacle such that at least a portion of the currency bills in the tray is moved out of the tray.

Alternative Embodiment BM. The method of Alternative Embodiment BL, wherein the engaging comprises receiving at least a portion of the paddle in the tray in its operational position.

Alternative Embodiment BN. The method of Alternative Embodiment BL, further comprising biasing the paddle, via a biasing member, to slide towards the front end of the input receptacle.

Alternative Embodiment BO. The method of Alternative Embodiment BL, wherein the urging comprises urging all of the currency bills towards the front end of the input receptacle and out of the tray such that removal of the tray from the input receptacle is permitted.

Alternative Embodiment BP. The method of Alternative Embodiment BO, further comprising, wherein after the tray is removed from the input receptacle, receiving a second tray between the front end and the back end of the input receptacle while the paddle urges the currency bills towards the front end of the input receptacle, the second tray being preloaded with a second plurality of currency bills therein, the second tray having a bottom, two opposing lateral sides, and a back side and an opposing front side, the front side of the second tray being movable between a closed position and an open position.

Alternative Embodiment BQ. The method of Alternative Embodiment BP, further comprising engaging the second plurality of currency bills in the second tray with a front side of a second paddle of the currency processing device such that the front side of the second paddle abuts the one of the second currency bills in the second tray that is closest to the back end of the input receptacle.

Alternative Embodiment BR. The method of Alternative Embodiment BQ, wherein the engaging the second plurality of currency bills in the second tray comprises receiving at least a portion of the second paddle in the second tray in its operational position.

Alternative Embodiment BS. The method of Alternative Embodiment BQ, further comprising biasing the second paddle, via a second biasing member, to slide towards the front end of the input receptacle.

Alternative Embodiment BT. The method of Alternative Embodiment BQ, wherein after the front side of the second tray has been moved from the closed position to the open position, urging, via the second paddle, the second currency bills in the second tray in the feed direction towards the front end of the input receptacle such that at least a portion of second he currency bills in the second tray is moved out of the second tray.

Alternative Embodiment BU. The method of Alternative Embodiment BL, wherein the input receptacle includes a tail gate that is movable between a closed position and an open position.

Alternative Embodiment BV. The method of Alternative Embodiment BU, wherein removal of the tray from the input receptacle in a tray-removal direction causes the tray to engage the tail gate and cause the tail gate to move from the closed position to the open position.

Alternative Embodiment BW. The method of Alternative Embodiment BV, wherein the tail gate is biased towards the closed position such that when the tray is completely removed from the input receptacle the tail gate automatically moves from the open position to the closed position.

Alternative Embodiment BX. A method of feeding currency bills in a currency processing device, the currency processing device including an input receptacle and a paddle, the input receptacle having a first side and a second opposing side, a front end and an opposing back end, and a floor, the opposing back end of the input receptacle including a tail gate that is moveable between a closed position and an open position, the method comprising: positioning a tray between the front end and the tail gate of the input receptacle, the tray being preloaded with a plurality of currency bills therein, the tray having a bottom, two opposing lateral sides, and a back side and an opposing front side, the front side of the tray being movable between a closed position and an open position; moving the front side of the tray from the closed position to the open position; removing the tray from the input receptacle by sliding the tray in a tray-removal direction, wherein the removing the tray from the input receptacle by sliding the tray in the tray-removal direction causes the tray to engage the tail gate and cause the tail gate to move from the closed position to the open position.

Alternative Embodiment BY. The method of Alternative Embodiment BX, wherein the tail gate is biased towards the closed position such that when the tray is completely removed from the input receptacle the tail gate automatically moves from the open position to the closed position.

Alternative Embodiment BZ. The method of Alternative Embodiment BX, further comprising, prior to the removing, engaging the plurality of currency bills in the tray with a front side of the paddle such that the front side of the paddle abuts the one of the currency bills in the tray that is closest to the back end of the input receptacle.

Alternative Embodiment CA. The method of Alternative Embodiment BZ, wherein the moving the front side of the tray permits the paddle to urge the currency bills in the tray in a feed direction towards the front end of the input receptacle.

Alternative Embodiment CB. The method of Alternative Embodiment BX, wherein the removing the tray includes removing the tray such that the plurality of currency bills remains in the input receptacle.

Alternative Embodiment CC. An apparatus for feeding a plurality of stacked documents into a document handling device, the apparatus comprising: an input receptacle being configured to receive a plurality of stacked documents, the receptacle having a first side and a second opposing side, a front end and an opposing back end, and a floor; a feeder mechanism disposed adjacent the front end of the input receptacle, the feeder mechanism being configured to transfer the documents, one at a time, from the receptacle to the document handling device; a first paddle rail disposed adjacent the first side; a second paddle rail disposed adjacent the second side; a first paddle assembly pivotally and slidably coupled to the first paddle rail, the first paddle assembly having a portion configured to contact a stack of a plurality of documents residing in the input receptacle; a second paddle assembly pivotally and slidably coupled to the second paddle rail, the second paddle assembly having a portion configured to contact a stack of a plurality of documents residing in the input receptacle; a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped; a second resilient member coupled to the second paddle assembly, the second resilient member being configured to bias the second paddle assembly towards the front end of the receptacle, the second resilient member being configured to cause the second paddle assembly to move in a direction toward the front end of the input receptacle at a second average rate of speed when unrestrained and undamped; a first damping mechanism configured to slow the unrestrained, average rate of speed the first paddle assembly from the first average rate of speed to a third average rate of speed which is less the first average rate of speed; and a second damping mechanism configured to slow the unrestrained, average rate of speed the second paddle assembly from the second average rate of speed to a fourth average rate of speed which is less the second average rate of speed.

Alternative Embodiment CD. The apparatus of Alternative Embodiment CC, wherein the first and second resilient members are springs.

Alternative Embodiment CE. The apparatus of Alternative Embodiment CC, wherein the first damping mechanism comprises at least one magnet coupled to the first paddle assembly in a manner that the at least one magnet remains adjacent to and spaced from the first paddle rail as the first paddle assembly moves along the first paddle rail and wherein the first paddle rail is made of non-ferrous, conductive material.

Alternative Embodiment CF. The apparatus of Alternative Embodiment CE, wherein the first paddle rail is made of aluminum.

Alternative Embodiment CG. The apparatus of Alternative Embodiment CE, wherein the at least one magnet is coupled to the first paddle assembly adjacent to where the first paddle assembly is engaged to the first paddle rail.

Alternative Embodiment CH. The apparatus of Alternative Embodiment CG, wherein when the first paddle assembly moves from a position near the back end of the input receptacle toward the front end of the input receptacle the at least one magnet moves substantially parallel the first paddle rail and wherein the first paddle rail interferes with a magnetic field generated by the at least one magnet and thereby slows the unrestrained, average rate of speed the first paddle assembly from the first average rate of speed to the third average rate of speed which is less the first average rate of speed.

Alternative Embodiment CI. The apparatus of Alternative Embodiment CC, further comprising: at least one track disposed adjacent the floor of the receptacle, the track having a width; at least one channel disposed in a bottom surface of the first paddle assembly, the width of the channel being slightly larger than the width of the track, the channel being adapted to fit around the track, the channel being adapted to slide along the track; and at least one channel disposed in a bottom surface of the second paddle assembly, the width of the channel being slightly larger than the width of the track, the channel being adapted to fit around the track, the channel being adapted to slide along the track.

Alternative Embodiment CJ. The apparatus of Alternative Embodiment CC, wherein the first paddle assembly has a bottom surface, the apparatus further comprising a roller attached to the first paddle assembly, the roller extending slightly beyond the bottom surface of the of the first paddle assembly, the roller being adapted to roll along the floor of the receptacle as the first paddle assembly urges the stack of documents towards the feeder mechanism.

Alternative Embodiment CK. The apparatus of Alternative Embodiment CC, wherein the second paddle assembly has a bottom surface, the apparatus further comprising a roller attached to the second paddle assembly, the roller extending slightly beyond the bottom surface of the of the second paddle assembly, the roller being adapted to roll along the floor of the receptacle as the second paddle assembly urges the plurality of stacked documents towards the feeder mechanism.

Alternative Embodiment CL. The apparatus of Alternative Embodiment CC, wherein the receptacle and the feeder mechanism are adapted to accommodate documents ranging in size from about 4.39 inches long by about 2.40 inches wide to about 7.17 inches long by about 3.82 inches wide.

Alternative Embodiment CM. The apparatus of Alternative Embodiment CC, wherein the feeder mechanism comprises at least one stripping wheel.

Alternative Embodiment CN. The apparatus of Alternative Embodiment CM, wherein the at least one stripping wheel comprises two stripping wheels.

Alternative Embodiment CO. An apparatus for feeding a plurality of stacked documents into a document handling device, the apparatus comprising: an input receptacle being configured to receive a plurality of stacked documents, the receptacle having a first side and a second opposing side, a front end, and an opposing back end; a first paddle rail disposed adjacent the first side; a first paddle assembly slidably coupled to the first paddle rail, the first paddle assembly having a portion configured to contact a stack of a plurality of documents residing in the input receptacle; a first resilient member coupled to the first paddle assembly, the first resilient member being configured to bias the first paddle assembly towards the front end of the receptacle, the first resilient member being configured to cause the first paddle assembly to move in a direction toward the front end of the input receptacle at a first average rate of speed when unrestrained and undamped; and a first damping mechanism configured to slow the unrestrained, average rate of speed the first paddle assembly from the first average rate of speed to a second average rate of speed which is less the first average rate of speed.

Alternative Embodiment CP. The apparatus of Alternative Embodiment CO, wherein the first resilient member is a spring.

Alternative Embodiment CQ. The apparatus of Alternative Embodiment CO, wherein the first damping mechanism comprises at least one magnet coupled to the first paddle assembly in a manner that the at least one magnet remains adjacent to and spaced from the first paddle rail as the first paddle assembly moves along the first paddle rail and wherein the first paddle rail is made of non-ferrous, conductive material.

Alternative Embodiment CR. The apparatus of Alternative Embodiment CO, wherein the first paddle rail is made of aluminum.

Alternative Embodiment CS. The apparatus of Alternative Embodiment CO, wherein the at least one magnet is coupled to the first paddle assembly adjacent to where the first paddle assembly is engaged to the first paddle rail.

Alternative Embodiment CT. The apparatus of Alternative Embodiment CS, wherein when the first paddle assembly moves from a position near the back end of the input receptacle toward the front end of the input receptacle the at least one magnet moves substantially parallel the first paddle rail and wherein the first paddle rail interferes with a magnetic field generated by the at least one magnet and thereby slows the unrestrained, average rate of speed the first paddle assembly from the first average rate of speed to the second average rate of speed which is less the first average rate of speed.

Alternative Embodiment CU. The apparatus of Alternative Embodiment CO, further comprising: at least one track disposed adjacent a floor of the receptacle, the track having a width; at least one channel disposed in a bottom surface of the first paddle assembly, the width of the channel being slightly larger than the width of the track, the channel being adapted to fit around the track, the channel being adapted to slide along the track; and at least one channel disposed in a bottom surface of the second paddle assembly, the width of the channel being slightly larger than the width of the track, the channel being adapted to fit around the track, the channel being adapted to slide along the track.

Alternative Embodiment CV. The apparatus of Alternative Embodiment CO, wherein the first paddle assembly has a bottom surface, the apparatus further comprising a roller attached to the first paddle assembly, the roller extending slightly beyond the bottom surface of the of the first paddle assembly, the roller being adapted to roll along a floor of the input receptacle as the first paddle assembly urges the stack of documents towards the front end of the input receptacle.

Alternative Embodiment CW. The apparatus of Alternative Embodiment CO, wherein the input receptacle is adapted to accommodate documents ranging in size from about 4.39 inches long by about 2.40 inches wide to about 7.17 inches long by about 3.82 inches wide.

Alternative Embodiment CX. The apparatus of Alternative Embodiment CO, further comprising a feeder mechanism disposed adjacent the front end of the input receptacle, the feeder mechanism being configured to transfer the documents, one at a time, out of the input receptacle to a document handling device, and wherein the feeder mechanism comprises at least one stripping wheel.

Alternative Embodiment CY. The apparatus of Alternative Embodiment CO, wherein the first paddle assembly comprises a first paddle, a first paddle arm, and a first paddle pivot assembly, wherein the first paddle arm extends from the first paddle and couples the first paddle to the first paddle pivot assembly.

Alternative Embodiment CZ. The apparatus of Alternative Embodiment CY, wherein the first paddle pivot assembly comprises a pivot housing, a pivot axle, and a pivot axle holder and wherein the pivot housing is configured to pivot about the pivot axle and the pivot axle holder is configured to hold the pivot axle.

Alternative Embodiment DA. The apparatus of Alternative Embodiment CZ, further comprising a first paddle trolley slidably coupled to the first paddle rail and wherein the first pivot axle holder is coupled to the first paddle trolley.

Alternative Embodiment DB. The apparatus of Alternative Embodiment CO, further comprising a first paddle trolley slidably coupled to the first paddle rail and wherein the first paddle assembly is coupled to the first paddle trolley.

Alternative Embodiment DC. The apparatus of Alternative Embodiment DB, wherein the first damping mechanism comprises at least one magnet coupled to the first paddle trolley in a manner that the at least one magnet remains adjacent to and spaced from the first paddle rail as the first paddle trolley moves along the first paddle rail and wherein the first paddle rail is made of non-ferrous, conductive material.

Alternative Embodiment DD. The apparatus of Alternative Embodiment DC, wherein the first paddle rail is made of aluminum.

Alternative Embodiment DE. The apparatus of Alternative Embodiment DD, wherein the first average rate of speed exceeds about 60 inches per second.

Alternative Embodiment DF. The apparatus of Alternative Embodiment DE, wherein the second average rate of speed is less than about 35 inches per second.

Alternative Embodiment DG. The apparatus of Alternative Embodiment DD, wherein the first average rate of speed is about 70 inches per second and the second average rate of speed is about 33 inches per second.

Alternative Embodiment DH. The apparatus of Alternative Embodiment DD, wherein the second average rate of speed is less than half the first average rate of speed.

Alternative Embodiment DI. The apparatus of Alternative Embodiment CO, wherein the first paddle assembly comprises a first paddle, a first paddle arm, and a first pivot housing and wherein the first paddle arm extends from the first paddle and couples the first paddle to the first pivot housing.

Alternative Embodiment DJ. The apparatus of Alternative Embodiment DI, wherein the first paddle rail is an elongated cylindrical bar and the first pivot housing has a circular aperture therein, wherein the first paddle rail extends through the aperture in the first pivot housing whereby the first pivot housing is slidably and pivotally coupled to the first paddle rail.

Alternative Embodiment DK. The apparatus of Alternative Embodiment DJ, wherein the first damping mechanism comprises at least one donut-shaped magnet coupled within the first pivot housing, wherein the first paddle rail extends through the aperture in the first pivot housing and a central hole in the at least one donut-shaped magnet whereby the first pivot housing is slidably and pivotally coupled to the first paddle rail in a manner that the at least one magnet remains adjacent to and spaced from the first paddle rail as the first pivot housing moves along the first paddle rail and wherein the first paddle rail is made of non-ferrous, conductive material.

Alternative Embodiment DL. The apparatus of Alternative Embodiment DK, wherein the first average rate of speed exceeds about 60 inches per second.

Alternative Embodiment DM. The apparatus of Alternative Embodiment DL, wherein the second average rate of speed is less than about 35 inches per second.

Alternative Embodiment DN. The apparatus of Alternative Embodiment DK, wherein the first average rate of speed is about 70 inches per second and the second average rate of speed is about 33 inches per second.

Alternative Embodiment DO. The apparatus of Alternative Embodiment DK, wherein the second average rate of speed is less than half the first average rate of speed.

Alternative Embodiment DP. The apparatus of Alternative Embodiment DK, wherein the first paddle rail is made of aluminum.

Alternative Embodiment DQ. The apparatus of Alternative Embodiment CO, wherein the first paddle assembly is pivotally and slidably coupled to the first paddle rail and further comprising: a second paddle rail disposed adjacent the second side of the input receptacle; a second paddle assembly pivotally and slidably coupled to the second paddle rail, the second paddle assembly having a portion configured to contact a stack of a plurality of documents residing in the input receptacle; a second resilient member coupled to the second paddle assembly, the second resilient member being configured to bias the second paddle assembly towards the front end of the receptacle, the second resilient member being configured to cause the second paddle assembly to move in a direction toward the front end of the input receptacle at a third average rate of speed when unrestrained and undamped; and a second damping mechanism configured to slow the unrestrained, average rate of speed the second paddle from the third average rate of speed to a fourth average rate of speed which is less the third average rate of speed.

Alternative Embodiment DR. The apparatus of Alternative Embodiment DQ, wherein the second resilient members is a spring.

Alternative Embodiment DS. A method of feeding documents in a document processing device, the document processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer documents from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of: positioning a tray between the front end and the back end of the input receptacle, the tray being preloaded with a plurality of documents therein, the tray having a bottom, two opposing lateral sides, and a back side and an opposing front side, the front and back sides of the tray being generally perpendicular to the two opposing lateral sides of the tray, the front side of the tray being movable between a closed position and an open position, the tray being positioned within the input receptacle such that the two opposing lateral sides of the tray are generally parallel with the two opposing sides of the input receptacle; pivoting the first paddle assembly with respect to the first paddle rail such that a first paddle of the first paddle assembly is in an upward position; with the first paddle in the upward position, sliding the first paddle assembly with respect to the first paddle rail towards the back end of the input receptacle; pivoting the first paddle assembly with respect to the first paddle rail such that the first paddle of the first paddle assembly is in an operational position and is positioned at least partially within the tray; engaging the plurality of documents in the tray with a front side of the first paddle of the first paddle assembly such that the front side of the first paddle abuts the one of the documents in the tray that is closest to the back end of the input receptacle; and moving the front side of the tray from the closed position to the open position, wherein in response to the moving the front side of the tray, the first paddle of the first paddle assembly urges the documents in the tray in a feed direction towards the front end of the input receptacle such that the one of the documents in the tray that is closest to the front end of the input receptacle is moved out of the tray and engages the feeder mechanism.

Alternative Embodiment DT. A method of loading documents into an input receptacle of a document processing device, the document processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer documents from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of: positioning a first tray in the input receptacle, the first tray being preloaded with a first plurality of first documents therein, the first tray having a bottom, two opposing lateral sides, and a back side and an opposing front side, the front and back sides of the first tray being generally perpendicular to the two opposing lateral sides of the first tray, the front side of the first tray being movable between a closed position and an open position, the first tray being positioned within the input receptacle such that the two opposing lateral sides of the first tray are generally parallel with the two opposing sides of the input receptacle and the front side of the first tray is oriented towards the front end of the input receptacle, the first document in the first tray positioned closest to the front side of the first tray being a leading first document and the first document in the first tray positioned closest to the back side of the first tray being a trailing first document; positioning the first paddle assembly in an operational position within the first tray such that the first paddle assembly engages the first plurality of documents in the first tray with a front side of a first paddle of the first paddle assembly such that the front side of the first paddle abuts the trailing first document; and moving the front side of the first tray from the closed position to the open position whereby the first paddle of the first paddle assembly moves the first documents in the first tray in a feed direction towards the front end of the input receptacle such that the leading first document is moved out of the first tray and engages the feeder mechanism.

Alternative Embodiment DU. The method of Alternative Embodiment DT, further comprising the act of removing the first tray from the input receptacle after the first paddle has moved all the first documents out of the first tray and while the first paddle is still moving at least some of the first documents towards the front end of the input receptacle.

Alternative Embodiment DV. The method of Alternative Embodiment DU, further comprising the acts of, while the first paddle is still moving at least some of the first documents towards the front end of the input receptacle: positioning a second tray in the input receptacle, the second tray being preloaded with a second plurality of second documents therein, the second tray having a bottom, two opposing lateral sides, and a back side and an opposing front side, the front and back sides of the second tray being generally perpendicular to the two opposing lateral sides of the second tray, the front side of the second tray being movable between a closed position and an open position, the second tray being positioned within the input receptacle such that the two opposing lateral sides of the second tray are generally parallel with the two opposing sides of the input receptacle and the front side of the second tray is oriented towards the front end of the input receptacle, the second document in the first tray positioned closest to the front side of the second tray being a leading second document and the second document in the second tray positioned closest to the back side of the second tray being a trailing second document; positioning the second paddle assembly in an operational position within the second tray such that the second paddle assembly engages the second plurality of documents in the second tray with a front side of a second paddle of the second paddle assembly such that the front side of the second paddle abuts the trailing second document; and moving the front side of the second tray from the closed position to the open position whereby the second paddle of the second paddle assembly moves the second documents in the second tray in the feed direction towards the front end of the input receptacle such that the leading second document is moved out of the second tray and abuts the first paddle.

Alternative Embodiment DW. The method of Alternative Embodiment DV, further comprising the act of, after the leading second documents abuts the first paddle, pivoting the first paddle out of the input receptacle whereby the leading second document abuts the trailing first document.

Alternative Embodiment DX. The method of Alternative Embodiment DW, further comprising the acts of removing the second tray from the input receptacle after the second paddle has moved all the second documents out of the second tray and while the second paddle is still moving at least some of the second documents towards the front end of the input receptacle.

Alternative Embodiment DY. A method of feeding documents in a document processing device, the document processing device including an input receptacle and a paddle, the input receptacle having a first side and a second opposing side, a front end and an opposing back end, and a floor, the method comprising: positioning a tray between the front end and the back end of the input receptacle, the tray being preloaded with a plurality of documents therein, the tray having a bottom, two opposing lateral sides, and a back side and an opposing front side, the front side of the tray being movable between a closed position and an open position; engaging the plurality of documents in the tray with a front side of the paddle such that the front side of the paddle abuts the one of the documents in the tray that is closest to the back end of the input receptacle; and moving the front side of the tray from the closed position to the open position so that the paddle may urge the documents in the tray in a feed direction towards the front end of the input receptacle such that at least a portion of the documents in the tray is moved out of the tray.

Alternative Embodiment DZ. The method of Alternative Embodiment DY, further comprising, prior to the engaging the plurality of documents in the tray with the front side of the paddle: pivoting the paddle into an upward position; with the paddle in the upward position, sliding the paddle towards the back end of the input receptacle; and pivoting the paddle into an operational position such that the paddle is positioned at least partially within the tray.

Alternative Embodiment EA. The method of Alternative Embodiment DY, wherein the engaging comprises pivoting the paddle into an operational position such that the paddle is positioned at least partially within the tray.

Alternative Embodiment EB. The method of Alternative Embodiment DY, wherein the paddle is biased, via a biasing member, to slide towards the front end of the input receptacle.

Alternative Embodiment EC. The method of Alternative Embodiment DY, further comprising removing the tray from the input receptacle while the paddle urges the documents towards the front end of the input receptacle.

Alternative Embodiment ED. The method of Alternative Embodiment EC, further comprising positioning a second tray between the front end and the back end of the input receptacle while the paddle urges the documents towards the front end of the input receptacle, the second tray being preloaded with a second plurality of documents therein, the second tray having a bottom, two opposing lateral sides, and a back side and an opposing front side, the front side of the second tray being movable between a closed position and an open position.

Alternative Embodiment EE. The method of Alternative Embodiment ED, further comprising engaging the second plurality of documents in the second tray with a front side of a second paddle of the document processing device such that the front side of the second paddle abuts the one of the second documents in the second tray that is closest to the back end of the input receptacle.

Alternative Embodiment EF. The method of Alternative Embodiment EE, wherein the engaging the second plurality of documents in the second tray comprises pivoting the second paddle into an operational position such that the second paddle is positioned at least partially within the second tray.

Alternative Embodiment EG. The method of Alternative Embodiment EE, wherein the second paddle is biased, via a second biasing member, to slide towards the front end of the input receptacle.

Alternative Embodiment EH. The method of Alternative Embodiment EE, further comprising moving the front side of the second tray from the closed position to the open position so that the second paddle may urge the second documents in the second tray in the feed direction towards the front end of the input receptacle such that at least a portion of the second documents in the second tray is moved out of the second tray.

Alternative Embodiment EI. The method of Alternative Embodiment EH, further comprising, prior to the engaging the second plurality of documents in the second tray with the front side of the second paddle: pivoting the second paddle into an upward position; with the second paddle in the upward position, sliding the second paddle towards the back end of the input receptacle; and pivoting the second paddle into an operational position such that the second paddle is positioned at least partially within the second tray.

Alternative Embodiment EJ. The method of Alternative Embodiment DY, wherein the input receptacle includes a tail gate that is movable between a closed position and an open position.

Alternative Embodiment EK. The method of Alternative Embodiment EJ, further comprising removing the tray from the input receptacle in a tray-removal direction while the paddle urges the documents towards the front end of the input receptacle, the tray-removal direction being opposite the feed direction.

Alternative Embodiment EL. The method of Alternative Embodiment EK, wherein the removing the tray from the input receptacle causes the tray to engage the tail gate and cause the tail gate to move from the closed position to the open position.

Alternative Embodiment EM. The method of Alternative Embodiment EL, wherein the tail gate is biased towards the closed position such that when the tray is completely removed from the input receptacle the tail gate automatically moves from the open position to the closed position.

Alternative Embodiment EN. A method of feeding documents in a document processing device, the document processing device including an input receptacle and a paddle, the input receptacle having a first side and a second opposing side, a front end and an opposing back end, and a floor, the method comprising: receiving a tray between the front end and the back end of the input receptacle, the tray being preloaded with a plurality of documents therein, the tray having a bottom, two opposing lateral sides, and a back side and an opposing front side, the front side of the tray being movable between a closed position and an open position; engaging the plurality of documents in the tray with a front side of the paddle such that the front side of the paddle abuts the one of the documents in the tray that is closest to the back end of the input receptacle; and wherein after the front side of the tray has been moved from the closed position to the open position, urging, via the paddle, the documents in the tray in a feed direction towards the front end of the input receptacle such that at least a portion of the documents in the tray is moved out of the tray.

Alternative Embodiment EO. The method of Alternative Embodiment EN, wherein the engaging comprises receiving at least a portion of the paddle in the tray in its operational position.

Alternative Embodiment EP. The method of Alternative Embodiment EN, further comprising biasing the paddle, via a biasing member, to slide towards the front end of the input receptacle.

Alternative Embodiment EQ. The method of Alternative Embodiment EN, wherein the urging comprises urging all of the documents towards the front end of the input receptacle and out of the tray such that removal of the tray from the input receptacle is permitted.

Alternative Embodiment ER. The method of Alternative Embodiment EQ, further comprising, wherein after the tray is removed from the input receptacle, receiving a second tray between the front end and the back end of the input receptacle while the paddle urges the documents towards the front end of the input receptacle, the second tray being preloaded with a second plurality of documents therein, the second tray having a bottom, two opposing lateral sides, and a back side and an opposing front side, the front side of the second tray being movable between a closed position and an open position.

Alternative Embodiment ES. The method of Alternative Embodiment ER, further comprising engaging the second plurality of documents in the second tray with a front side of a second paddle of the document processing device such that the front side of the second paddle abuts the one of the second documents in the second tray that is closest to the back end of the input receptacle.

Alternative Embodiment ET. The method of Alternative Embodiment ES, wherein the engaging the second plurality of documents in the second tray comprises receiving at least a portion of the second paddle in the second tray in its operational position.

Alternative Embodiment EU. The method of Alternative Embodiment ES, further comprising biasing the second paddle, via a second biasing member, to slide towards the front end of the input receptacle.

Alternative Embodiment EV. The method of Alternative Embodiment ES, wherein after the front side of the second tray has been moved from the closed position to the open position, urging, via the second paddle, the second documents in the second tray in the feed direction towards the front end of the input receptacle such that at least a portion of second he documents in the second tray is moved out of the second tray.

Alternative Embodiment EW. The method of Alternative Embodiment EN, wherein the input receptacle includes a tail gate that is movable between a closed position and an open position.

Alternative Embodiment EX. The method of Alternative Embodiment EW, wherein removal of the tray from the input receptacle in a tray-removal direction causes the tray to engage the tail gate and cause the tail gate to move from the closed position to the open position.

Alternative Embodiment EY. The method of Alternative Embodiment EX, wherein the tail gate is biased towards the closed position such that when the tray is completely removed from the input receptacle the tail gate automatically moves from the open position to the closed position.

Alternative Embodiment EZ. A method of feeding documents in a document processing device, the document processing device including an input receptacle and a paddle, the input receptacle having a first side and a second opposing side, a front end and an opposing back end, and a floor, the opposing back end of the input receptacle including a tail gate that is moveable between a closed position and an open position, the method comprising: positioning a tray between the front end and the tail gate of the input receptacle, the tray being preloaded with a plurality of documents therein, the tray having a bottom, two opposing lateral sides, and a back side and an opposing front side, the front side of the tray being movable between a closed position and an open position; moving the front side of the tray from the closed position to the open position; removing the tray from the input receptacle by sliding the tray in a tray-removal direction, wherein the removing the tray from the input receptacle by sliding the tray in the tray-removal direction causes the tray to engage the tail gate and cause the tail gate to move from the closed position to the open position.

Alternative Embodiment FA. The method of Alternative Embodiment EZ, wherein the tail gate is biased towards the closed position such that when the tray is completely removed from the input receptacle the tail gate automatically moves from the open position to the closed position.

Alternative Embodiment FB. The method of Alternative Embodiment EZ, further comprising, prior to the removing, engaging the plurality of documents in the tray with a front side of the paddle such that the front side of the paddle abuts the one of the documents in the tray that is closest to the back end of the input receptacle.

Alternative Embodiment FC. The method of Alternative Embodiment FB, wherein the moving the front side of the tray permits the paddle to urge the documents in the tray in a feed direction towards the front end of the input receptacle.

Alternative Embodiment FD. The method of Alternative Embodiment EZ, wherein the removing the tray includes removing the tray such that the plurality of documents remains in the input receptacle.

Alternative Embodiment FE. Any of the Alternative Embodiments CC to FD, wherein the documents are currency bills and deposit slips.

Alternative Embodiment FF. Any of the Alternative Embodiments CC to FD, wherein the documents are currency bills and trailer cards.

Alternative Embodiment FG. Any of the Alternative Embodiments CC to FD, wherein the documents are currency bills and separator slips.

Alternative Embodiment FH. Any of the Alternative Embodiments CC to FD, wherein the documents are currency bills and casino cash-out tickets.

Alternative Embodiment FI. Any of the Alternative Embodiments CC to FD, wherein the documents are currency bills and substitute currency media.

Alternative Embodiment FJ. Any of the Alternative Embodiments CC to FD, wherein the documents are currency bills and checks.

Alternative Embodiment FK. Any of the Alternative Embodiments CC to FD, wherein the documents are currency bills and barcoded tickets.

Alternative Embodiment FL. Any of the Alternative Embodiments CC to FD, wherein the documents are currency bills and header cards.

It is contemplated that any of the methods from above-recited alternative embodiments may be combined and such combinations are contemplated to fall within the scope of the present disclosure. It is further contemplated than any of the apparatuses from above-recited alternative embodiments may be combined and such combinations are also contemplated to fall within the scope of the present disclosure.

What is claimed is:

1. A method of feeding currency bills in a currency processing device, the currency processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer currency bills from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of:

positioning a tray between the front end and the back end of the input receptacle, the tray being preloaded with a plurality of currency bills therein, the tray having a bottom, two opposing lateral sides, and a back side and an opposing front side, the front and back sides of the tray being generally perpendicular to the two opposing lateral sides of the tray, the front side of the tray being movable between a closed position and an open position, the tray being positioned within the input receptacle such that the two opposing lateral sides of the tray are generally parallel with the two opposing sides of the input receptacle;

pivoting the first paddle assembly with respect to the first paddle rail such that a first paddle of the first paddle assembly is in an upward position;

with the first paddle in the upward position, sliding the first paddle assembly with respect to the first paddle rail towards the back end of the input receptacle;

pivoting the first paddle assembly with respect to the first paddle rail such that the first paddle of the first paddle assembly is in an operational position and is positioned at least partially within the tray;

engaging the plurality of currency bills in the tray with a front side of the first paddle of the first paddle assembly such that the front side of the first paddle abuts the one of the currency bills in the tray that is closest to the back end of the input receptacle; and moving the front side of the tray from the closed position to the open position, wherein in response to the moving the front side of the tray, the first paddle of the first paddle assembly urges the currency bills in the tray in a feed direction towards the front end of the input receptacle such that the one of the currency bills in the tray that is closest to the front end of the input receptacle is moved out of the tray and engages the feeder mechanism.

2. A method of loading currency bills into an input receptacle of a currency processing device, the currency processing device including an input receptacle, a feeder mechanism, a first paddle rail, a second paddle rail, a first paddle assembly, a second paddle assembly, a first resilient member, and a second resilient member, the input receptacle having a first side and a second opposing side, a front end and an opposing back end, and a floor, the feeder mechanism being disposed adjacent the front end of the input receptacle and being configured to transfer currency bills from the input receptacle, the first paddle rail being disposed adjacent to the first side of the input receptacle, the second paddle rail being disposed adjacent to the second side of the input receptacle, the first paddle assembly being pivotally and slidably coupled to the first paddle rail, the second paddle assembly being pivotally and slidably coupled to the second paddle rail, the first resilient member being coupled to the first paddle assembly and being configured to bias the first paddle assembly towards the front end of the input receptacle, the second resilient member being coupled to the second paddle assembly and being configured to bias the second paddle assembly towards the front end of the input receptacle, the method comprising the acts of:

positioning a first tray in the input receptacle, the first tray being preloaded with a first plurality of first currency bills therein, the first tray having a bottom, two opposing lateral sides, and a back side and an opposing front side, the front and back sides of the first tray being generally perpendicular to the two opposing lateral sides of the first tray, the front side of the first tray being movable between a closed position and an open position, the first tray being positioned within the input receptacle such that the two opposing lateral sides of the first tray are generally parallel with the two opposing sides of the input receptacle and the front side of the first tray is oriented towards the front end of the input receptacle, the first currency bill in the first tray positioned closest to the front side of the first tray being a leading first currency bill and the first currency bill in the first tray positioned closest to the back side of the first tray being a trailing first currency bill;

positioning the first paddle assembly in an operational position within the first tray such that the first paddle assembly engages the first plurality of currency bills in the first tray with a front side of a first paddle of the first paddle assembly such that the front side of the first paddle abuts the trailing first currency bill; and moving the front side of the first tray from the closed position to the open position whereby the first paddle of the first paddle assembly moves, via the first resilient member, the first currency bills in the first tray in a feed direction towards the front end of the input receptacle such that the leading first currency bill is moved out of the first tray and engages the feeder mechanism.

3. The method of claim 2, further comprising the act of removing the first tray from the input receptacle after the first paddle has moved all the first currency bills out of the first tray and while the first paddle is still moving, via the first resilient member, at least some of the first currency bills towards the front end of the input receptacle.

4. The method of claim 3, further comprising the acts of, while the first paddle is still moving, via the first resilient member, at least some of the first currency bills towards the front end of the input receptacle:

positioning a second tray in the input receptacle, the second tray being preloaded with a second plurality of second currency bills therein, the second tray having a bottom, two opposing lateral sides, and a back side and an opposing front side, the front and back sides of the second tray being generally perpendicular to the two opposing lateral sides of the second tray, the front side of the second tray being movable between a closed position and an open position, the second tray being positioned within the input receptacle such that the two opposing lateral sides of the second tray are generally parallel with the two opposing sides of the input receptacle and the front side of the second tray is oriented towards the front end of the input receptacle, the second currency bill in the first tray positioned closest to the front side of the second tray being a leading second currency bill and the second currency bill in the second tray positioned closest to the back side of the second tray being a trailing second currency bill;

positioning the second paddle assembly in an operational position within the second tray such that the second paddle assembly engages the second plurality of currency bills in the second tray with a front side of a second paddle of the second paddle assembly such that the front side of the second paddle abuts the trailing second bill; and moving the front side of the second tray from the closed position to the open position whereby the second paddle of the second paddle assembly moves, via the second resilient member, the second currency bills in the second tray in the feed direction towards the front end of the input receptacle such that the leading second currency bill is moved out of the second tray and abuts the first paddle.

5. The method of claim 4, further comprising the acts of:

after the leading second currency bills abuts the first paddle, pivoting the first paddle out of the input receptacle whereby the leading second currency bill abuts the trailing first currency bill; and removing the second tray from the input receptacle after the second paddle has moved all the second currency bills out of the second tray and while the second paddle is still moving, via the second resilient member, at least some of the second currency bills towards the front end of the input receptacle.

6. The method of claim 2, wherein the input receptacle includes a tail gate that is moveable between a closed position and an open position and the method further comprises removing the first tray from the input receptacle such that at least a portion of the first plurality of first currency bills remains in the input receptacle.

7. The method of claim 6, wherein at least a portion of the first plurality of first currency bills are in the first tray when the removing begins and wherein none of the first plurality of first currency bills remain in the first tray when first tray is completely removed from the input receptacle.

8. A method of feeding currency bills in a currency processing device, the currency processing device including an input receptacle and a paddle, the input receptacle having a first side and a second opposing side, a front end and an opposing back end, and a floor, the opposing back end of the input receptacle including a tail gate that is moveable between a closed position and an open position, the method comprising:

positioning a tray between the front end and the tail gate of the input receptacle, the tray being preloaded with a plurality of currency bills therein, the tray having a bottom, two opposing lateral sides, and a back side and an opposing front side, the front side of the tray being movable between a closed position and an open position;

moving the front side of the tray from the closed position to the open position;

removing the tray from the input receptacle by sliding the tray in a tray-removal direction, wherein the removing the tray from the input receptacle by sliding the tray in the tray-removal direction causes the tray to engage the tail gate and cause the tail gate to move from the closed position to the open position.

9. The method of claim 8, wherein the tail gate is biased towards the closed position such that when the tray is completely removed from the input receptacle the tail gate automatically moves from the open position to the closed position.

10. The method of claim 8, further comprising, prior to the removing, engaging the plurality of currency bills in the tray with a front side of the paddle such that the front side of the paddle abuts the one of the currency bills in the tray that is closest to the back end of the input receptacle, wherein the moving the front side of the tray permits the paddle to urge the currency bills in the tray in a feed direction towards the front end of the input receptacle.

11. A method of continuously processing currency bills in a currency processing device, the method comprising:

positioning a first tray preloaded with a first plurality of currency bills in an input receptacle;

positioning a first paddle in an operational position within the first tray such that the first paddle engages a trailing one of the first plurality of currency bills in the first tray, the first paddle being biased, via a first resilient member of the currency processing device, towards a front end of the input receptacle of the currency processing device;

moving a front side of the first tray from a closed position to an open position whereby the first paddle moves, via the first resilient member, the first plurality of currency bills in the first tray in a feed direction towards the front end of the input receptacle such that at least a leading one of the first plurality of currency bills in the first tray is moved out of the first tray and engages a feeder mechanism of the currency processing device;

removing the first tray from the input receptacle such that at least a portion of the first plurality of currency bills remains in the input receptacle;

positioning a second tray preloaded with a second plurality of currency bills in the input receptacle;

positioning a second paddle in an operational position within the second tray such that the second paddle engages a trailing one of the second plurality of currency bills in the second tray, the second paddle being biased, via a second resilient member of the currency processing device, towards the front end of the input receptacle of the currency processing device; and moving a front side of the second tray from a closed position to an open position whereby the second paddle moves, via the second resilient member, the second plurality of currency bills in the second tray in the feed direction towards the front end of the input receptacle such that a leading one of the second plurality currency bills in the second tray is moved out of the second tray and engages the first paddle of the first paddle assembly.

12. The method of claim 11, wherein the input receptacle includes a tail gate that is moveable between a closed position and an open position.

13. The method of claim 11, wherein the removing includes removing the first tray from the input receptacle by sliding the first tray in a tray-removal direction, thereby causing the first tray to engage a tail gate of the input receptacle and cause the tail gate to move from a closed position to an open position.

14. The method of claim 11, wherein at least a portion of the first plurality of currency bills are in the first tray when the removing begins.

15. The method of claim 14, wherein none of the first plurality of currency bills remain in the first tray when first tray is completely removed from the input receptacle.

16. A currency processing device for continuously processing currency bills, the device comprising:

an input receptacle to receive, one at a time, a plurality of preloaded trays of currency bills;

a feeder mechanism to feed currency bills from the input receptacle into the device for processing;

a first paddle assembly having an operational position where a first paddle of the first paddle assembly is positioned within a first one of the plurality of preloaded trays received in the input receptacle such that the first paddle engages a trailing one of a first plurality of currency bills in the first preloaded tray;

a first resilient member that biases the first paddle assembly towards a front end of the input receptacle, wherein in response to (i) the first paddle being in the operational position and (ii) a front side of the first preloaded tray being moved from a closed position to an open position, the first resilient member causes the first paddle to move the first plurality of currency bills in the first preloaded tray in a feed direction towards the front end of the input receptacle such that at least a leading one of the first plurality of currency bills in the first preloaded tray is moved out of the first preloaded tray and engages the feeder mechanism;

a second paddle assembly having an operational position where a second paddle of the second paddle assembly is positioned within a second one of the plurality of preloaded trays received in the input receptacle after the first preloaded tray is removed therefrom such that the second paddle engages a trailing one of a second plurality of currency bills in the second preloaded tray; and a second resilient member that biases the second paddle assembly towards the front end of the input receptacle, wherein in response to (i) the second paddle being in the operational position and (ii) a front side of the second preloaded tray being moved from a closed position to an open position, the second resilient member causes the second paddle to move the second plurality of currency bills in the second preloaded tray in the feed direction towards the front end of the input receptacle such that at least a leading one of the second plurality of currency bills in the second preloaded tray is moved out of the second preloaded tray and engages the first paddle of the first paddle assembly.

17. The device of claim 16, wherein the input receptacle includes a tail gate that is moveable between a closed position and an open position.

18. The device of claim 17, wherein the tail gate aids in the removal of the first preloaded tray from the input receptacle by permitting the first preloaded tray to slide in a tray-removal direction, thereby causing the first preloaded tray to engage the tail gate and cause the tail gate to move from the closed position to the open position.

* * * * *